United States Patent
Iversen et al.

(10) Patent No.: US 11,459,510 B2
(45) Date of Patent: Oct. 4, 2022

(54) PROCESS FOR PRODUCING LOW SULPHUR OXYGEN CONTAINING RENEWABLE OIL

(71) Applicants: STEEPER ENERGY APS, Hørsholm (DK); STEEPER ENERGY CANADA LTD., Calgary (CA)

(72) Inventors: Steen B. Iversen, Vedbæk (DK); Göran Olofsson, Punkeflostrand (SE); Sergios Karatzos, Calgary (CA); Claus Uhrenholt Jensen, Aalborg (DK); Julie Katerine Rodríguez Guerrero, Calgary (CA)

(73) Assignees: STEEPER ENERGY APS, Hørsholm (DK); STEEPER ENERGY CANADA LTD., Calgary (CA)

( * ) Notice: Subject to any disclaimer, the term of this patent is extended or adjusted under 35 U.S.C. 154(b) by 827 days.

(21) Appl. No.: 16/316,983

(22) PCT Filed: Jul. 10, 2017

(86) PCT No.: PCT/EP2017/067264
§ 371 (c)(1),
(2) Date: Jan. 10, 2019

(87) PCT Pub. No.: WO2018/011139
PCT Pub. Date: Jan. 18, 2018

(65) Prior Publication Data
US 2021/0284916 A1    Sep. 16, 2021

(30) Foreign Application Priority Data
Jul. 11, 2016  (CA) ........................ 2935825

(51) Int. Cl.
*C10G 3/00*     (2006.01)
*C10G 1/06*     (2006.01)
(Continued)

(52) U.S. Cl.
CPC .............. *C10G 3/50* (2013.01); *C10G 1/065* (2013.01); *C10G 3/44* (2013.01); *C10G 3/47* (2013.01);
(Continued)

(58) Field of Classification Search
CPC .............. C10G 3/44; C10G 3/47; C10G 3/50; C10G 1/065; C10G 2300/1014; C10G 2300/202;
(Continued)

(56) References Cited

U.S. PATENT DOCUMENTS 3,254,017 A * 5/1966 Arey, Jr. ................ C10G 65/10
                                                    208/59
4,133,745 A * 1/1979 Wunderlich ........... C10G 1/002
                                                    208/254 H
(Continued)

FOREIGN PATENT DOCUMENTS

CA  2 807 887 A1  12/2012
CA  2 879 856 A1  12/2012
(Continued)

OTHER PUBLICATIONS

International Search Report for PCT/EP2017/067264 (PCT/ISA/210) dated Oct. 6, 2017.
(Continued)

*Primary Examiner* — In K C Bullock
*Assistant Examiner* — Jason Y Chong
(74) *Attorney, Agent, or Firm* — Birch, Stewart, Kolasch & Birch, LLP

(57) ABSTRACT

The invention relates to a process for producing an upgraded renewable oil from renewable carbonaceous material(-s) comprising providing a low sulphur oxygen containing renewable crude oil having a sulphur content of less than 0.5 wt % and an oxygen content from about 2.0 wt to about 20 wt %, pressurising the low sulphur oxygen containing
(Continued)

renewable crude oil to an operational pressure in the range 20 to 200 bar, adding and mixing hydrogen to the pressurized low sulphur oxygen containing crude oil, heating the oil to an operational temperature in the range 180-410° C. in one or more steps, contacting said oil with at least one heterogeneous catalyst contained in a first reaction zone, contacting the effluent from said first reaction zone with at least one heterogeneous catalyst contained in a second reaction zone, where in at least one of the heterogeneous catalysts in the first reaction zone and/or the second reaction zone is on a non-sulphided form.

19 Claims, 17 Drawing Sheets

(52) U.S. Cl.
CPC .............. *C10G 2300/1014* (2013.01); *C10G 2300/202* (2013.01); *C10G 2300/302* (2013.01); *C10G 2300/304* (2013.01); *C10G 2300/308* (2013.01); *C10G 2300/4006* (2013.01); *C10G 2300/4012* (2013.01); *C10G 2300/4018* (2013.01); *C10G 2400/04* (2013.01)

(58) Field of Classification Search
CPC ........ C10G 2300/302; C10G 2300/304; C10G 2300/308; C10G 2300/4006; C10G 2300/4012; C10G 2300/4018; C10G 2400/04
See application file for complete search history.

(56) References Cited

U.S. PATENT DOCUMENTS

| | | | |
|---|---|---|---|
| 4,266,083 A | | 5/1981 | Huang |
| 4,935,567 A | | 6/1990 | Yokoyama et al. |
| 5,340,466 A | * | 8/1994 | Dai .................. C10G 45/08 208/216 PP |
| 7,262,331 B2 | | 8/2007 | van de Beld et al. |
| 7,678,163 B2 | | 3/2010 | Brummerstedt Iversen et al. |
| 9,212,317 B2 | | 12/2015 | Iversen |
| 2009/0253948 A1 | * | 10/2009 | McCall .................. C10G 3/50 585/240 |
| 2011/0174681 A1 | * | 7/2011 | Milam .................. C10G 47/00 208/14 |
| 2013/0174475 A1 | | 7/2013 | Kim et al. |
| 2013/0184505 A1 | | 7/2013 | Maxwell |
| 2014/0092220 A1 | | 4/2014 | Kawamura et al. |
| 2014/0128646 A1 | * | 5/2014 | Iversen .................. C10G 1/042 585/240 |
| 2014/0221706 A1 | | 8/2014 | Kim et al. |
| 2014/0261715 A1 | * | 9/2014 | Abhari .................... C10G 3/47 137/12 |
| 2014/0288338 A1 | | 9/2014 | Radlein et al. |

FOREIGN PATENT DOCUMENTS

| | | |
|---|---|---|
| CA | 2 882 608 A1 | 3/2014 |
| CA | 2 911 975 A1 | 11/2014 |
| EP | 0 204 354 A1 | 12/1986 |
| WO | WO 2009/015409 A1 | 2/2009 |
| WO | WO 2010/143980 A1 | 12/2010 |
| WO | WO 2012/092644 A1 | 7/2012 |
| WO | WO 2012/169318 A1 | 12/2012 |
| WO | WO 2013/184317 A1 | 12/2013 |
| WO | WO 2014/181283 A1 | 11/2014 |
| WO | WO 2014/197928 A1 | 12/2014 |
| WO | WO 2015/092773 A1 | 6/2015 |
| WO | WO 2015/169319 A1 | 11/2015 |

OTHER PUBLICATIONS

Written Opinion of the International Searching Authority for PCT/EP2017/067264 (PCT/ISA/237) dated Oct. 6, 2017.

\* cited by examiner

PROCESS FOR PRODUCING LOW SULPHUR OXYGEN CONTAINING RENEWABLE OIL

FIELD OF THE INVENTION

The present invention relates to the field of producing renewable liquid hydrocarbons from carbonaceous materials such as biomass. In particular, it relates to an improved process and apparatus for producing compatible renewable blendstock and finished transportation fuels in an efficient, economical and environmentally sustainable way.

BACKGROUND OF THE INVENTION

Climate change and depletion of convention fossil oil reserves are driving huge interest for transportation fuels, lubricants and fine chemicals produced from renewable sources.

New technologies for production of renewable oils produced from biomass such as lignocellulosics (e.g. plant material and residues such as wood, grasses, etc.) are being developed. An attractive pathway for effective production of such renewable oils is the conversion of the biomass under so called hydrothermal or solvothermal (HTL; STL) conditions i.e. the conversion of the biomass in high pressure water or solvent with or without the presence of catalysts. Examples of the production of such green oils are given in e.g. Iversen (CA 2,807,887, CA 2,879,856, CA 2,882,608, WO2015/169319 (A1), WO2015/092773 (A1), CA2911975A1, WO2014/181283, WO2012/169318A1, U.S. Pat. No. 7,678,163B2, U.S. Pat. No. 9,212,317), Annee (EP 0,204,354), Van de Beld (U.S. Pat. No. 7,262,331), Yokoyama (U.S. Pat. No. 4,935,567), Huang (U.S. Pat. No. 4,266,083), Humfreys (WO2009/015409), Maschmayer (WO2012/092644A1, 2014/197928A1), and Elliott (WO2013/184317A1) hereby included herein by reference.

Hydrothermal/solvothermal liquefactions oils have many similarities to their hydrocarbon cousins and are of significantly higher quality than pyrolysis oils. However, they are different from fossil oils. Typically, they are characterized by having a low sulphur content e.g. in the range 0.0001 up to about 0.5 wt % and an oxygen content in the range 2.0-20.0 wt %. Further such oil may contain more or less unsaturated compounds and/or more or less aromatics and/or a high viscosity and/or a high boiling point and/or a lower density and/or a lower molecular weight or other parameters that limit their direct use as blendstock or finished products. Hence, it is desirable to optimize such parameters by upgrading the oil e.g. by reacting the oil with hydrogen over a suitable heterogeneous catalyst.

The current practice in the art is to adapt upgrading catalysts and upgrading processes developed for hydrodeoxygenation (HDO) and/or hydrodesulphurization (HDS) and/or hydrodenitrification (HDN) of fossil oils rather than developing upgrading catalysts and upgrading processes for special characteristics of the oils. Examples of such approaches are e.g., Iversen (CA U.S. Pat. No. 2,879,856), Maxwell (WO2010/143980A1, US2013/0184505A1), Elliott (WO2013/184317A1). Such prior art catalysts and processes are typically based on supported sulphided catalysts e.g. NiMo*S, CoMo*S, etc.

Whereas such methodologies work fine for sulphur containing oils e.g. oils having sulphur content of 1 wt % oil or higher, the present inventors have found that during prolonged operation such sulphided catalysts are not stable and lose their activity over time. Further $H_2S$ is typically present on a percentage level in the off-gas from the upgrading unit thereby requiring significant and expensive gas cleaning. Hence, there is a need for improved, more efficient and economical upgrading processes for low sulphur, oxygen containing renewable oils.

Accordingly, it is an objective of the present invention to provide an improved process, improved catalysts, and an improved apparatus for upgrading low sulphur oxygen containing renewable oils partly or wholly remedying the problems and disadvantages as described above and further providing a process being more effective for example by requiring less external hydrogen than the prior art and/or in being simpler and/or more economical and/or having less downtime and/or resulting higher yields of desired products and/or higher quality of the oil products than in the prior art.

SUMMARY OF THE INVENTION

According to the invention, the objective(s) have been achieved by a process for producing an upgraded low sulphur renewable oil from renewable carbonaceous material(-s) comprising:

Providing a low sulphur oxygen containing renewable crude oil having a sulphur content of less than 0.5 wt % and an oxygen content of about 2.0 wt to about 20 wt %:

Pressurising the low sulphur oxygen containing renewable crude oil to an operational pressure in the range 20 to 200 bar;

Adding and mixing hydrogen to the pressurized low sulphur oxygen containing renewable crude oil;

Heating the oil to an operational temperature in the range 180-410° C. in one or more steps;

Contacting said low sulphur oxygen containing renewable crude oil with at least one heterogeneous catalyst contained in a first reaction zone;

Contacting the partially upgraded renewable oil from said first reaction zone with at least one heterogeneous catalyst contained in a second reaction zone;

wherein at least one of the heterogeneous catalyst(-s) in the first reaction zone and/or in the second reaction zone is on a non-sulphided form.

A further preferred embodiment of a process according to the present invention is a process for producing an upgraded renewable oil from renewable carbonaceous materials comprising:

Providing a low sulphur oxygen containing renewable crude oil by:
  a. Providing a carbonaceous material in the form of biomass contained in one or more feedstock;
  b. Providing a feed mixture by slurring the carbonaceous material in one or more fluids, at least one of which comprises water;
Pressurizing the feed mixture to a pressure in the range 150 to 400 bar;
Heating the pressurized feed to a temperature in the range from about 300° C. to about 450° C.
Maintaining the pressurized and heated feed mixture in a conversion zone for a conversion time in the range 3 to 30 minutes;
thereby causing the carbonaceous material to be converted; and
Cooling the converted feed mixture to a temperature in the range from about 25° C. to about 200° C.;
Expanding the converted feed mixture to a pressure in the range 1-120 bar, and separating the converted feed mixture into at least a low sulphur oxygen containing renewable crude oil, a gas phase and a water phase comprising water-soluble organics and dissolved salts;
thereby providing a low sulphur oxygen containing renewable crude oil having a sulphur content of less than 2.0 wt % and an oxygen content in the range from about 2.0 wt % to about 20.0 wt %; and
Pressurising the separated low sulphur oxygen containing renewable oil to an operational pressure in the range 20 to 200 bar;
Adding and mixing hydrogen to the pressurized low sulphur oxygen containing renewable crude oil;
Heating the low sulphur oxygen containing renewable crude oil to an operational temperature in the range 180-410° C. in one or more steps;
Contacting said low sulphur oxygen containing renewable crude oil with at least one heterogeneous catalyst contained in a first reaction zone;
Contacting the partially upgraded oil from said first reaction zone with at least one heterogeneous catalyst contained in a second reaction zone;
wherein at least one of the heterogeneous catalyst(-s) in the first reaction zone and/or in the second reaction zone is on a non-sulphided form.

Thereby significantly more stable heterogeneous catalysts, and a significantly more efficient and economical process is provided.

According to preferred embodiments of the invention the carbonaceous material in the form of biomass may comprise a lignocellulosic material such as wood.

An advantageous embodiment is where the hydrogen added is at least partly produced in and extracted from said process of producing an upgraded renewable oil e.g. is extracted from the step of providing the low sulphur oxygen containing renewable crude oil and/or extracted from gas exiting the upgrading process. Often the amount of hydrogen extracted from said process of producing an upgraded renewable oil comprises at least 50% of the total hydrogen consumed by the upgrading process such as substantially all of hydrogen added to the upgrading process is produced by the process.

Thereby significantly a significantly simpler process, requiring less external hydrogen than prior art processes and hence being more effective and economical and environmentally sustainable than prior art processes is provided.

Typically the heterogeneous catalyst(-s) in the first reaction zone and/or second reaction zone comprises one or more hydro-treating, hydro-processing, hydrocracking, hydrogenation, hydrodearomatization, hydrodemetallization and/or hydro-isomerization catalysts.

A preferred embodiment of the process according to the invention is where both the catalyst(-s) in the first reaction zone and in the second reaction zone is on a non-sulphided form.

Preferred non-sulphided forms of the heterogeneous catalyst(-s) according to many aspects of the present invention include heterogenous catalyst(-s) on a reduced form and/or in a carbide form and/or in a carbonate and/or in a nitride form and/or in a phosphide form and/or in a phosphate and/or in a boride form and/or in a oxide form and/or in a hydroxide form and/or a sulphate form or a combination thereof.

A preferred embodiment of the invention is where the heterogeneous catalyst in the first reaction zone and/or second reaction zone comprises one or more elements selected from the group of Fe, Ni, Co, Mo, Cr, W, Ce, Ru, Rh, Pd, Pt, V, Cu, Au, Zr, Ti, B, Bi, Nb, Na, K supported on a supporting structure.

A further preferred embodiment of the invention is where the heterogeneous catalyst(-s) in the first reaction zone and/or second reaction zone according to the present invention is/are a bi-metallic or tri-metallic catalyst supported on a supporting structure.

An advantageous embodiment of the invention is where the bi-metallic or tri-metallic heterogeneous catalyst(-s) and/or catalyst elements in the first reaction zone and/or second reaction zone comprises a. one or two metals selected from group VIIIB of the periodic table such as one or two metals selected from the group of Fe, Co, Ni, Ru supported on a supporting structure, and b. one or more elements selected from group VIB of the periodic table such as one or two metals selected from the group of Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

In a preferred embodiment according to the present invention the heterogeneous catalyst in the first reaction zone may further comprise one or more elements selected from Ce, Ti, Zr, B, Bi, Cu, Na, K, Mg.

It is generally preferred that acidity of said supporting structure is low to moderate in order to minimize undesired reactions such coke formation and/or polymerization reactions. In some applications of the present invention the number of acidic sites on the catalyst support may be reduced by reacting the acidic sites with a suitable base such as sodium hydroxide or potassium hydroxide prior to drying.

Advantageous embodiments of the present invention include supporting structures comprising Ce. It has been found that presence of ceria in the support contribute to the reduction of coke formation on the catalyst surface and increase the thermal resistance of the catalyst support, and enables higher loadings and better dispersion of active metals.

Particularly preferred support for used in said first reaction zone according to the present invention include alumina such as γ-alumina or δ-alumina, silica, stabilized alumina, silicate and alumosilicate such as MCM-41, silicoaluminophosphates (SAPO), aerogirine, ceria, zirconia, titania, activated carbon and hydrotalcite supports and combinations thereof.

Further, some of the compounds of the low sulphur oxygen containing renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the support structure for the heterogeneous catalyst has few micropores with pore size less than 20 Angstrom, a large amount of mesopores in the range 20 to 500 Angstrom and some macro pores with a pore size larger than 500 Angstrom.

A preferred embodiment of the present invention comprises a support structure for the heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a support structure for the heterogeneous catalyst having a BET surface as measured by $N_2$ adsorption at 77K in the range 20 to about 500 $m^2/g$ such as in the range 20 to 250 $m^2/g$, preferably the support has a surface area (BET) in the range in the range 30 to 150 $m^2/g$ such as in the range 40 to 120 $m^2/g$, even more preferably the support have a surface area (BET) in the range 60 to 120 $m^2/g$ such as in the range 60 to 100 $m^2/g$.

The pore density of the support structure for the heterogeneous catalyst in as measured by $N_2$ adsorption at 77K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

The heterogeneous catalyst(-s) in the first and the second reaction zone may according to many aspects of the invention comprise substantially the same heterogeneous catalyst (-s) operating a different operating conditions (e.g. different temperature and/or pressure). However, in many aspects of invention the heterogeneous catalysts in the first and second reaction zone comprise different heterogeneous catalysts.

The temperature, pressure, catalyst and liquid hourly space velocity of the first reaction zone is often selected so as to substantially reduce the oxygen content of the low sulphur oxygen containing renewable crude oil, while reducing other parameters such as the amount of residue (e.g. compounds having a boiling point above 550° C., the boiling point curve and/or the total acid number (TAN) and/or the viscosity and/or the density and/or the amount of unsaturated compounds such as olefins and/or the amount of aromatics, while avoiding turning too much of the lower boiling compounds into an undesired gas products that reduces the yield of desired liquid hydrocarbon products such as upgraded hydrocarbons having a boiling point in the jet fuel and diesel range.

The operating pressure in the first reaction zone may be at least 20 bar such as an operating pressure in the first reaction zone of at least 50 bar; Preferably the operating pressure in the first reaction zone is at least 60 bar such as an operating pressure in the first reaction zone of at least 80 bar; Advantageously the operating pressure of the first reaction zone is at least 100 bar such as an operating pressure of at least 110 bar.

Further according to a preferred embodiment of the invention the operating pressure in the first reaction zone may be below 200 bar such as an operating pressure in the first reaction zone below 180 bar; Preferably the operating pressure of the first and/or second reaction zone is below 150 bar such as below 120 bar.

Depending on the specific configuration of the step of providing the low sulphur oxygen containing renewable crude oil, such oil may comprise more or less reactive species such as aldehydes and/or ketones and/or other oxygenates and/or unsaturated and/or aromatic compounds and/or ash compounds or metals including K, Na, Ca, Mg, P, Si, Fe, Ni, Co, Cr, Al. Such reactive species may react such as by polymerization and/or by coking and/or inorganic elements may foul heat exchangers and/or poison and/or plug the pores the catalyst in the downstream reactors, and shorten the lifespan and reduce the cost effectiveness of catalysts. Hence, in certain preferred embodiments of the present invention, it is desirable to remove and/or reduce such reactive species and inorganic elements prior to the further subsequent catalytic reactors.

Hence, an advantageous embodiment of the present invention is where the first reaction zone comprises a stabilization zone for reducing and/or eliminating the amount of reactive species such as aldehydes and/or ketones and/or other oxygenates and/or unsaturated compounds and/or aromatic compounds and/or inorganic elements such as metal compounds thereby reducing polymerization and/or coking and/or fouling during heat up and thereby protecting down stream catalysts from clogging and poisoning. Thereby the down time is reduced, and catalyst lifetime extended, and hence a more effective and economical process is provided.

In many aspects of the invention the stabilization zone may be the first part of the first reaction zone. The stabilization zone may be the entrance zone in a first reactor in the first reaction zone, but may according to a preferred embodiment the present invention also comprise a separate reactor and/or comprise all of first reaction zone.

The temperature at the inlet of the first reaction zone is depending on the specific catalyst(-s) and hydrogen pressure used in the first reaction zone. The lower limit of the inlet temperature to the first reaction zone is generally selected for the desired reactions to proceed with a reasonable rate without depleting the hydrogen on the surface, which may lead to coking, whereas the upper limit is selected so as to avoid excessive coking.

The upper limit of the inlet temperature to said first reactor of reaction zone 1 is typically selected to avoid excessive coking. Hence in many embodiments the inlet temperature to the first reaction zone is below 410° C. such as below 400° C., preferably below 390° C. such as below 380° C. Even more preferably the inlet temperature to the first reaction zone is below 370° C. such as below 360° C. Advantageously the inlet temperature to the first reaction zone may below 350° C. such as below 340° C. Further according to other preferred embodiments the inlet temperature to the first reaction zone is below 320° C. such as below 300° C.

The lower limit for the inlet temperature to said first reactor of reaction zone 1 may according to the invention be above 180° C. such as an inlet temperature to the first reaction zone 1 of at least 220° C.; preferably the inlet temperature to the first reaction zone is at least 250° C. such as an inlet temperature to the first reaction zone in the range 250 to 320° C.

The heterogeneous catalyst for said stabilization zone in the first reaction zone is often selected to have an open pore structure e.g. a high pore volume with many pores in the macro and mesoporous size range to ensure accessibility of the oil composition along with a large metal and metalloid storage capacity.

The hydrogenation reactions occurring during said upgrading are highly exothermic i.e. heat is generated by said reactions. Hence, the outlet temperature from the reactors is higher than the inlet temperature, and at least part of the heat for heating of the low sulphur renewable oil to the desired reaction temperatures in reaction zone 1 is generated by the reactions in the stabilization reactor.

Often the low sulphur oxygen containing renewable crude oil in the first reaction zone often is very reactive due to the relatively high oxygen content. Too high activity of heterogeneous catalyst in the first reaction zone is typically also not desired as the surface of the catalyst may be depleted and may lead to deposits. Further too high activity of the heterogeneous catalyst in the first reactive zone may lead to deactivation of the catalyst/loss of surface area due to generation of hot spots from the exothermic reaction occurring during said upgrading process in the first reaction zone.

Hence, according to aspects of the present invention the activity of the heterogeneous catalysts in the first reaction zone are selected so as to have a relatively low activity initially in the stabilization zone and gradually be increased through the first reaction zone. Hereby, the control of reaction rate and temperature profile is improved and hot spots are avoided.

Hence, the catalyst in the stabilization zone is often selected to be less active than in the subsequent catalytic reactor so as to obtain a controlled pre-reaction and temperature profiles.

In a preferred embodiment the heterogeneous catalyst the stabilization zone of first reaction zone is a spent catalyst from the more active catalysts in the subsequent reactors in the first and/or second reaction zone.

In another preferred embodiment a lower activity may be obtained by diluting the catalyst with an inert material such as carborundum.

The average reactor temperature in the first reactor of reaction zone 1 is according to the invention typically below 410° C. such as below 390° C., preferably below 380° C. such as below 370° C. Even more preferably the average temperature to the first reactor in reaction zone 1 is below 360° C. such as below 350° C. Advantageously the inlet temperature to the first reaction zone may below 340° C. such as below 330° C. Further according to other preferred embodiments the inlet temperature to the first reaction zone is below 320° C. such as below 300° C. in the stabilization zone.

The liquid hourly space velocity (LHSV) in said stabilization zone is according to many aspects of the invention in the range 0.5 to 3 hours$^{-1}$ such as 0.5 to 2.5 hours$^{-1}$. Preferably the liquid hourly space velocity (LHSV) in the stabilization zone is in the range from about 0.7 to 2 hours$^{-1}$.

Typically the oxygen content of the low sulphur oxygen containing renewable crude oil is reduced by 20 to 60% such as 25 to 50% during the passage of said stabilization zone.

Further in preferred embodiments of the present invention the aromatic content of the low sulphur oxygen containing renewable crude oil is reduced during the passage of the stabilization zone of the first reaction zone. According to many aspects of the invention the aromatic content is reduced by 20 to 75% during the passage of said stabilization zone of the first reaction zone such as a reduction of the aromatic content of 30 to 60% during the passage of the first reaction zone.

In an advantageous embodiment of the invention, the first reaction zone comprises two or more reactors. Hence, according to such advantageous embodiments of the invention, the effluent from the stabilization zone or the stabilization reactor of the first reaction zone enters into a second reactor of the first reaction zone typically having a higher average reactor temperature and more active catalyst than used in the stabilization zone.

The effluent from the stabilization zone of the first reaction zone may according to preferred embodiments of the invention be fed to a second reactor of the first reaction zone at the substantially the same temperature as the outlet temperature from the stabilization zone or may be further heated prior to entering the second reactor of the first reaction zone. Advantageously the inlet temperature to the second reactor is selected so as to obtain a desired average temperature in the second reactor of the first reaction zone.

The inlet temperature to the second reactor of the first reaction zone is according a preferred embodiment of the present invention of the inlet temperature below 380° C. such as below 370° C., preferably the inlet temperature to the second reactor of the first reaction zone is below 360° C. such as below 350° C. Even more preferably the inlet temperature to the second reactor of the first reaction zone is below 340° C. such as below 330° C. Advantageously the inlet temperature to the second reactor of the first reaction zone first is below 320° C. such as below 300° C. Further according to other advantageous embodiments the inlet temperature to second reactor of the first reaction zone is in the range from about 280° C. to about 320° C.

In many aspects of the present invention the pre-reacted low sulphur renewable oil from the stabilization zone of the first reaction zone is not fully mixable with the partially upgraded oil from reaction zone 1, and conventional temperature control by for example cooling and recycling of the partially upgraded oil from the first reaction zone to the inlet of the second reactor of the first reaction zone is in such embodiments not possible. Hence, in an advantageous embodiment of the invention the second reactor subsequent the stabilization zone may divided in multiple reactors such as two or more with intercooling of the oil in between so as to control the maximum temperature in the individual reactors.

In an advantageous embodiment the average temperature in the subsequent reactors of the first reaction zone is controlled to be in the range 320 to about 410° C. such as an average temperature in the range 330 to 400° C. Preferably the average temperature in the subsequent reactors in the first reaction zone is in the range 340 to about 390° C. such as an average temperature in the subsequent reactors of the first reaction zone in the range 350 to 380° C. In advantageous embodiment the liquid hourly space velocity (LHSV) in the individual subsequent reactors of the first reaction zone is selected so as to obtain a specific conversion and temperature increase in the individual subsequent reactors in the first reaction zone. In an advantageous embodiment according to the invention the liquid hourly space velocity in the individual subsequent reactors in the first reaction zone is in the range 0.05 to 5 hours$^{-1}$ such as a liquid hourly space velocity in the individual subsequent reactors in the first reaction zone is in the range 0.1 to 3 hours$^{-1}$. Preferably the liquid hourly space velocity in the individual subsequent reactors in the first reaction zone is in the range 0.2 to 2 hours$^{-1}$ such as in the range 0.5 to 1.5 hours$^{-1}$.

The weight based space velocity (WHSV) in the individual subsequent reactors in first reaction zone is according to a preferred embodiment in the range 0.05 to 5 hours$^{-1}$ such as in the range 0.1 to 3.0 hours$^{-1}$, preferably the weight based hourly space velocity (WHSV) in the individual subsequent reactors in first reaction zone is in the range 0.2 to 2 hours$^{-1}$ such as in the range 0.5 to 1.5 hours$^{-1}$.

The average reactor temperature in the first reactor of reaction zone 1 is according to the invention typically below 410° C. such as below 400° C., preferably below 390° C. such as below 380° C. Even more preferably the average temperature to the first reactor in reaction zone 1 is below 370° C. such as below 360° C. Advantageously the inlet temperature to the first reaction zone may below 350° C. such as below 340° C. Further according to other preferred embodiments the inlet temperature to the first reaction zone is below 320° C. such as below 300° C.

In many aspects of the invention, the heterogeneous catalyst(-s) and process conditions in the second reaction zone is selected so as to perform hydrogenation reactions such as de-aromatization by saturation of aromatics and/or saturation of double bonds of the partially upgraded low sulphur oxygen containing renewable crude oil from the first reaction zone. Hereby the density of the low sulphur renewable oil is also significantly reduced.

The heterogeneous catalyst(-s) in the second reaction zone may comprise one or more heterogeneous catalyst(-s) and may in many applications of the invention be substantially the same as used in said first reaction zone, but operating at a lower temperature to obtain a favourable equilibrium for de-aromatization.

Hence, a preferred embodiment of the invention is where the inlet temperature to the second reaction zone is selected to be lower than in the first reaction zone and the product effluent from the first reaction zone is cooled in a heat exchanger before entering the second reaction zone. Advantageously the temperature of the partially upgraded renewable oil at the inlet to the second reaction zone is controlled to be in the range 250-350° C., such as a temperature of the partially upgrade in the range 250-320° C. such as in the range 250-300° C.

Advantageous embodiments include further adding and mixing hydrogen with the low sulphur oxygen containing renewable crude oil between the first reaction zone and the second reaction zone.

The liquid hourly space velocity in said second reaction zone may according to an embodiment of the present invention be in the range 0.05 to 5 hours$^{-1}$ such as in the range 0.2 to 3.0 hours$^{-1}$, preferably the liquid hourly space velocity in said second reaction zone is in the range 0.5 to 2.0 hours$^{-1}$ such as in the range 0.5 to 1.5 hours$^{-1}$.

The weight based space velocity may according to an embodiment of the present invention be in the range in the range 0.05 to 5 hours$^{-1}$ such as in the range 0.2 to 3.0 hours$^{-1}$, preferably the liquid hourly space velocity in said second reaction zone is in the range 0.5 to 2.0 hours$^{-1}$ such as in the range 0.5 to 1.5 hours$^{-1}$.

The effluent from the first reaction zone comprises a partially upgraded oil as well as gas and water. According to a preferred embodiment of the invention the partially upgraded oil is separated from the gas and water prior to entering the second reaction zone.

An advantageous embodiment of the present invention is where steam is injected into the partially upgraded oil after it is separated from the gas and water and prior to entering the second reaction zone, and where the second reaction zone comprises a reactor containing a heterogeneous catalyst comprises a water splitting functionality for performing a catalytic steam conversion and/or catalytic steam cracking of said partially upgraded low sulphur renewable oil. The catalytic steam conversion and/or catalytic steam cracking use steam as source of hydrogen, and generates excess hydrogen which may be recovered, compressed and recycled to the first reaction zone after separation from the low sulphur upgraded oil. Without wishing to be bound to a specific theory it is believed that said catalytic steam conversion and/or catalytic steam cracking is due to oxygen deficiencies and/or vacancies at the surface of the heterogeneous catalyst(-s). The partially upgraded low sulphur oxygen containing renewable crude oil may be adsorbed to the surface of the heterogeneous catalyst and may react with oxygen on the surface of the heterogeneous catalyst thereby forming $CO_2$. Water may be adsorbed and dissociated to/at the oxygen vacancy at the surface of the heterogeneous catalyst thereby renewing the oxygen on the surface, while producing hydrogen. Depending on the specific catalyst and operating conditions the hydrogen may further react with the low sulphur oxygen containing crude oil or may be recovered from said gas phase after separation and introduced for the reactions in the first reaction zone, thereby reducing the amount of external hydrogen required for the process and thereby resulting in a more efficient and economic process with a lower carbon footprint than the prior art.

The amount of water or steam added or mixed with the low sulphur oxygen containing renewable oil is often in the range 5.0 to 35% by weight of the low sulphur oxygen containing renewable oil such as in the range 5.0 to 30% by weight of the low sulphur oxygen containing renewable oil, preferably the amount of water or steam added or mixed with the low sulphur oxygen containing renewable oil is in the range 5.0 to 25% by weight of the low sulphur oxygen containing renewable oil such as in the range 5.0 to 20% by weight of the low sulphur oxygen containing renewable oil. Even more preferably the amount of water or steam added or mixed with the low sulphur oxygen containing renewable oil is in the range 5.0 to 15% by weight of the low sulphur oxygen containing renewable oil such as in the range 5.0 to 10% by weight of the low sulphur oxygen containing renewable oil.

The heterogeneous catalyst for performing a catalytic steam conversion and/or catalytic steam cracking of said partially upgraded low sulphur renewable oil in the second reaction zone is according to a particularly preferred embodiment of the present invention a bimetallic or trimetallic catalyst supported on a supporting structure, and where said catalyst and/or catalyst elements comprises a. One or two transition metals selected from the group VIIIB of the periodic table of elements such as one or two metals selected from Fe, Co, Ni, Ru, Rh, Pd, Os, Ir, Pt.

b. One or more catalyst(-s) or catalyst(-s) selected from the group VIB of the periodic table of elements such as an element selected from Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

A further preferred embodiment of the heterogeneous catalyst for performing a catalytic steam conversion and/or catalytic steam cracking in the second reaction zone according to the present invention, is where said heterogeneous catalyst in the second reaction zone comprises or further comprises one or more elements selected from the group of Ce, Ti; Zr, B, Ga, Cu, B, Bi, Na, K, Mg.

According to many embodiments of the present invention said one or more elements or further elements may be present in a concentration from about to about such a concentration of said element in the range 1.0 wt % to about 25.0 wt % such as a concentration of said further catalyst element(s) is in the range from about 2.0 wt % to about 25.0 wt %. Preferably, said element or further element(-s) is present in the range from about 5 wt % to about 20 wt % such as in the range from about 10 wt % to about 20 wt %.

In other embodiments according to the present invention, the concentration of said one or more elements or further element(-s) may be in the range from about 0.5 wt % to about 10 wt % such as in the range from about 1.0 to about 7.0 wt %. Preferably, said further element(-s) is in the range from about 1.5 wt 20% to about 5 wt %.

Advantageously said supporting oxide or hydroxide structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mn and/or Cr and/or Al and/or Fe and/or Ce or a combination thereof.

A particularly preferred embodiment according to the present invention is where said heterogeneous catalyst and/or supporting structure has the empirical formula $M(II)_6M(III)_2(OH)_{16}.CO_3.4H_2O$, where M(II) is a divalent metal ion comprising one or two elements selected from the group of Mg, Ca, Ni, Co, Cu, Mn, Zn, Fe and M(III) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16}.CO_3.4H_2O$, where x: 1.0-2.0, y: 4.0-5.0, z: 0.0-1.0, w: 0.0-1.0, q: 1.0-2.0 such as $Mg_{4.3} Ni_{1.70} CeAl(OH)_{16}.CO_3.4H_2O$.

A further preferred embodiment according to the invention is where the heterogeneous catalyst and/or supporting structure comprises $Mg_{4.3} Ni_{1.70} CeAl(OH)_{16}.CO_3.4H_2O$.

According to a preferred embodiment said bimetallic or trimetallic catalyst is preferably on a nonsulphide form such as on a carbide, a carbonate, a phosphide, a phosphate, a nitride, a boride form, an oxide form, and/or a hydroxide form and/or a combination of these.

The temperature at the inlet to the second reaction zone for performing a catalytic steam conversion and/or catalytic steam cracking according to the invention is in many applications of the present invention in the range 300° C. to 410° C., such as in the range 320° C. to 410° C.; preferably the temperature at the inlet of said further catalytic reactor is in the range 350° C. to 400° C., such as in the range 360° C. to 390° C.

The operating pressure in the second reaction zone may be at least 20 bar such as an operating pressure in the first reaction zone of at least 50 bar; Preferably the operating pressure in the second reaction zone is at least 60 bar such as an operating pressure in the second reaction zone of at least 80 bar;

Advantageously the operating pressure of the second reaction zone is at least 100 bar such as an operating pressure of at least 110 bar.

Further according to a preferred embodiment of the invention the operating pressure in the second reaction zone may be below 200 bar such as an operating pressure in the second reaction zone below 180 bar; Preferably the operating pressure of the second reaction zone is below 150 bar such as below 120 bar.

The liquid hourly space velocity in the reactor(-s) in the second reaction zone is typically in the range 0.1 to 5 hours$^{-1}$ such as in the range 0.2 to 3.0 hours$^{-1}$, preferably the liquid hourly space velocity in said further catalytic reactor upstream the first reaction zone is in the range 0.2 to 2.0 hours$^{-1}$ such as in the range 0.5 to 1.5 hours$^{-1}$.

The amount of hydrogen consumed by the upgrading process may correspond to 0.01 to 10.0 wt % of the low sulphur renewable oil such as 0.05 to 8.0 wt 15%, preferably the amount of hydrogen consumed by the upgrading process corresponds to 0.5 to 5.0 wt % of the low sulphur renewable oil such as 1.0 to 4.5 wt %. Even more preferably the amount of hydrogen consumed by the upgrading process corresponds to 2.0 to 4.0 wt % of the low sulphur renewable oil such as 2.5 to 3.5 wt %.

The hydrogen is in many embodiments added in excess of the stoichiometric amount of hydrogen required for the upgrading process. Hence, the amount of hydrogen added and mixed with the low sulphur oxygen containing renewable oil is often up to 10 times higher than the amount of hydrogen consumed by the upgrading process such as up to 5 times higher than the amount of hydrogen consumed by the upgrading process, preferably the amount of hydrogen added and mixed with the low sulphur oxygen containing renewable oil is the range 1.5 to 5 times higher than the amount of hydrogen consumed by the upgrading process such as in the range 2 to 5 higher than the amount of hydrogen consumed by the upgrading process.

The oxygen content of the low sulphur oxygen containing renewable crude oil is generally below about 20 wt % such as below about 17 wt %, preferably the oxygen content of the low sulphur oxygen containing renewable crude oil is below about 16 wt %, such below about 12 wt %. Often the oxygen content of the low sulphur oxygen containing renewable crude oil is below 11 wt % such as below about 10 wt %.

The oxygen content of the low sulphur oxygen containing renewable crude oil is generally in the range from about 3 wt % to about 17 wt % such as in the range 4-15 wt %. Often the oxygen content of the low sulphur oxygen containing renewable crude oil is in the range 5 to 13 wt % such as 5 to 11 wt 10%.

The sulphur content of the low sulphur oxygen containing renewable crude oil according to the present invention is generally less than or equal to 0.5 wt % such as below 0.3 wt %. In many embodiments according to the present invention the sulphur content of the oxygen containing renewable oil is less than or equal to 0.2 wt % such as below 0.1 wt %. Further preferred embodiments include low sulphur oxygen containing renewable crude oil, where the sulphur content is less than 0.05 wt % such as less than 0.01 wt %.

Further embodiments and advantageous effects of the present invention are presented in the following description of preferred embodiments of the invention.

Throughout this document the terms "comprising" or "comprises" do not exclude other possible elements or steps. Also, the mentioning of references such as "a" or "an" etc. should not be construed as excluding a plurality.

DESCRIPTION OF FIGURES

Figure 1:
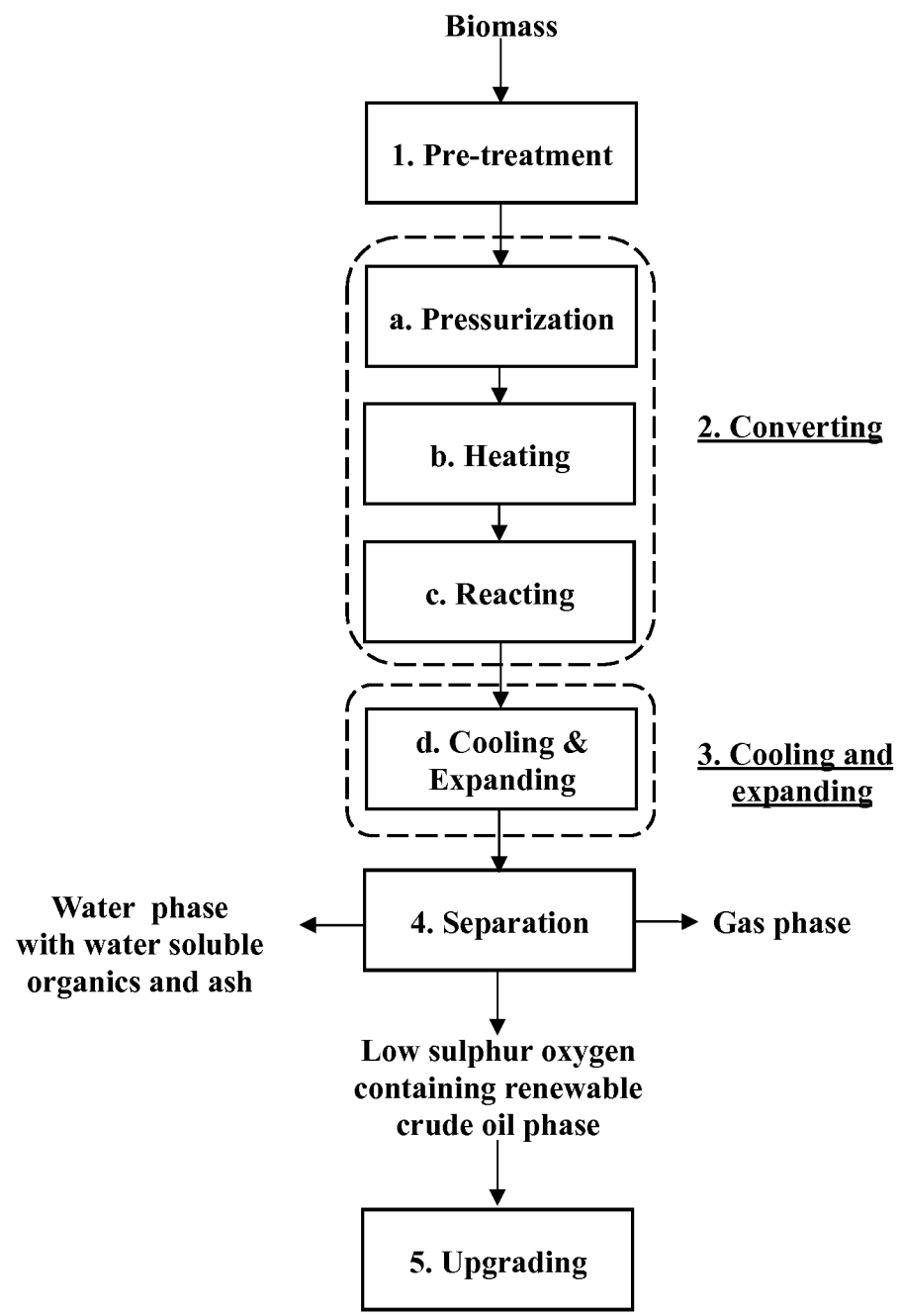
FIG. 1 shows an embodiment of a continuous process for production of low sulphur oxygen containing renewable crude oil from organic materials according to the present invention.

FIG. 1 shows an embodiment of a continuous production process for producing a low sulphur oxygen containing renewable crude oil produced from carbonaceous materials such as biomass.

As shown on FIG. 1, the carbonaceous material is first subjected to a pre-treatment step. The pre-treatment is designed to convert the carbonaceous material into a pumpable feed mixture and generally includes means for size reduction of the carbonaceous and slurrying the carbonaceous material with other ingredients such as water, catalysts and other additives such as organics in the feed mixture.

The feed mixture is pressurized to a pressure of at least 150 bar and up to about 400 bar before it is heated to a temperature from about 300 to 450° C. The feed mixture is generally maintained at these conditions for sufficient time for conversion of the carbonaceous material e.g. for a period of 5 to 30 minutes, before it is cooled and expanded to ambient.

The converted feed mixture is further separated into at least a gas phase, a low sulphur oxygen containing a renewable crude oil phase, a water phase with water-soluble organic compounds as well as dissolved salts such as homogeneous catalysts and eventually suspended particles. The separation may be performed by gravimetric phase separation or other suitable means such as centrifugation.

The low sulphur oxygen containing renewable crude oil enters the upgrading part of the process where it is pressurized to a pressure in the range from about 20 bar to about 200 bar before being heated to a temperature in the range 180 to 410° C. in one or more steps and contacted with heterogeneous catalyst(s) contained in at least two reaction zones.

Figure 2:
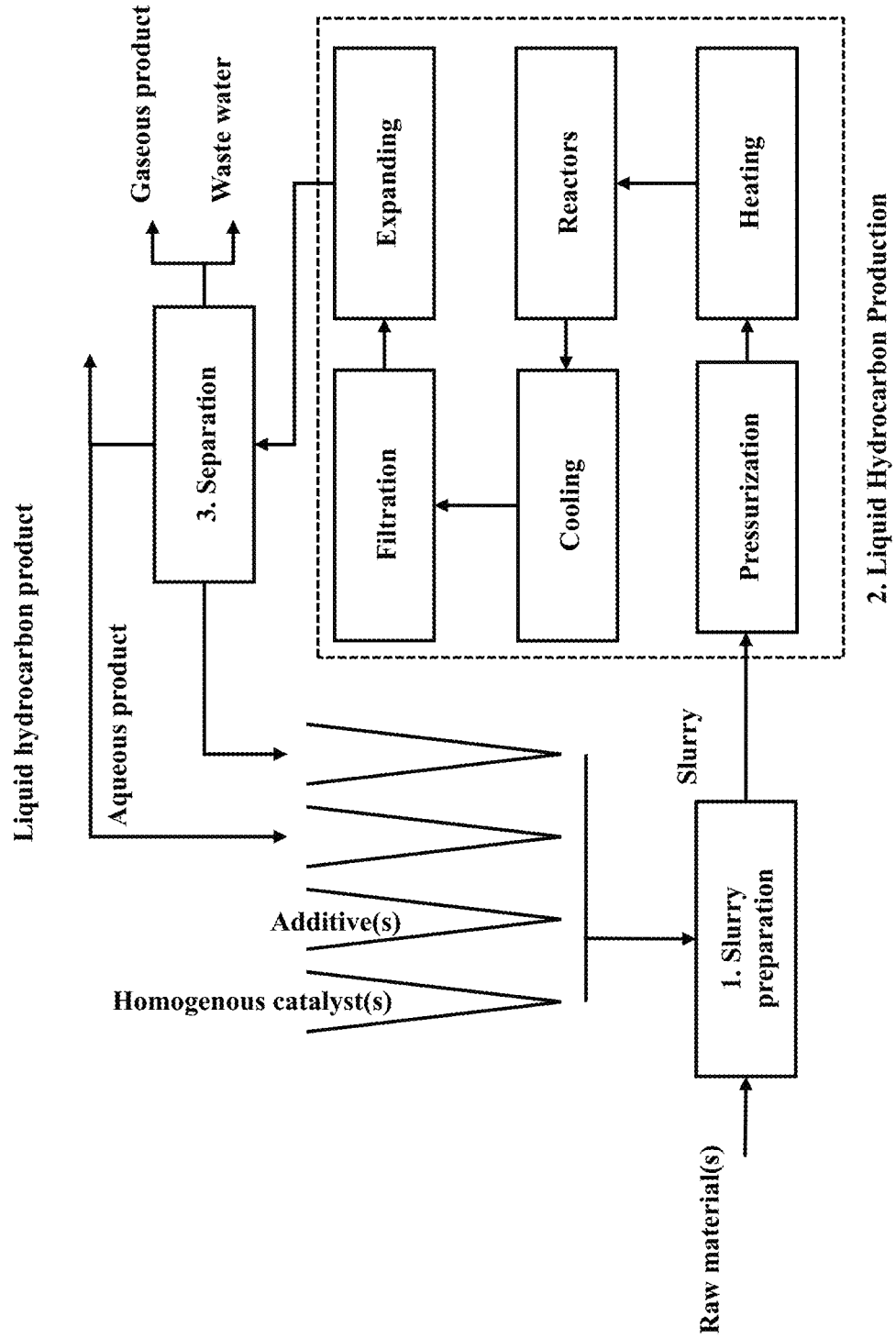
FIG. 2 shows a flow diagram of the continuous plant used for production of renewable crude oil from organic materials according to the present invention.

FIG. 2 shows a flow diagram of the continuous pilot plant used to provide low sulphur oxygen containing renewable crude oil in the examples below. Carbonaceous material such as biomass is pre-treated. The first part of the pre-treatment includes a size reduction in a hammermill to a maximum particle size of about 2 mm. The milled carbonaceous material is subsequently processed into a feed mixture in the slurry by mixing with other ingredients such as recycled water phase, recycled oil phase, makeup catalyst, and sodium hydroxide (to adjust pH). The feed mixture is then pressurized to a pressure range of 300-350 bar by the feed pump, heated to 370-420° C. in two electric heaters before entering the reactors. The reactors comprise two top fed cylindrical reactors connected in series. Depending on the specific flow rate used the retention/residence time in the reactors is in the range 4 to 25 minutes. The product mixture from the reactors is cooled to 80-120° C. by a water cooler. The product mixture continues through a 250 μm filter for separation of solid particles and dependent on the filtration temperature eventually high boiling liquid hydrocarbon compounds. Pressure let down is carried out through a series of 1.75 mm ID capillaries with a length of 200-400 m. The depressurized product mixture is further cooled to a temperature of 20-80° C., and proceeds to a flash tank for separation of the products. The gaseous product is separated from the liquid phase comprising liquid hydrocarbons (oil) and water with water-soluble organics, dissolved salts and eventually suspended particles. A low sulphur oxygen containing renewable crude oil is gravimetrically separated from the aqueous products.

DESCRIPTION OF AN ADVANTAGEOUS EMBODIMENT OF THE INVENTION

Figure 3:
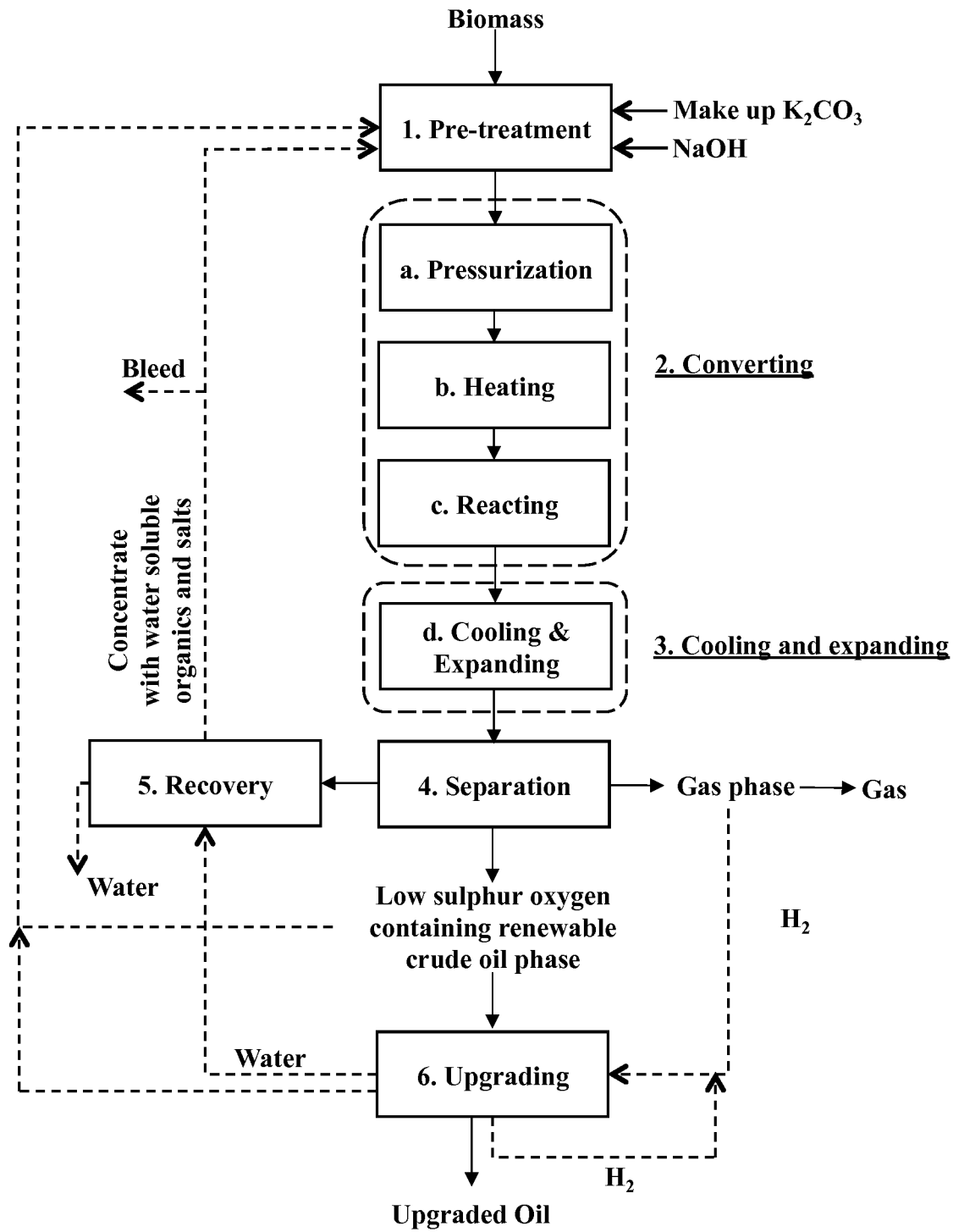
FIG. 3 shows an advantageous embodiment of the step of providing a low sulphur oxygen containing renewable crude oil from carbonaceous materials to said upgrading process according to the present invention.

FIG. 3 shows an advantageous embodiment of the step of providing a low sulphur oxygen containing renewable crude oil from carbonaceous materials to said upgrading process according to the present invention.

1. Pre-Treatment

Carbonaceous materials such as biomass contained in one or more raw material input streams are introduced into a pre-treatment step in pre-treatment device, where they are transformed into a homogeneous, pumpable feed mixture in the form of a slurry and/or paste.

This may be advantageously be performed e.g. by introducing in situ produced liquid organic compounds such as a recycle stream of a liquid hydrocarbon product produced by the process or a fraction of the same as indicated by the fluid stream from the first separation and into the pre-treatment device and/or recovered liquid organic compounds produced by the process and/or homogeneous catalysts from the water phase into the pre-treatment device.

The liquid hydrocarbons produced in said step of providing a low sulphur oxygen containing renewable crude oil typically contains oxygen in a concentration from about 1 wt % and up to about 20 wt %. In many embodiments according to the present invention the oxygen content of said liquid hydrocarbons have an oxygen content in the range 2 wt % to about 17 wt % such a an oxygen content in the range 4 wt % to about 15 wt %, and in further embodiments the oxygen content of liquid hydrocarbons is in the range 5-12 wt % such as 6 to 11 wt %.

The liquid hydrocarbons produced in said step often contain hundreds of different compounds such as alkanes, phenols, alkylated phenols, alkoxylated phenols ketones such as pentanones and pentenones, alkylated pentanones, alkylated pentenones, hexanones, indanones, carboxylic acids, fatty acids, monocycloparaffines, dicycloparaffines, alkylbenzenes, naphthenebenzenes, naphthalenes, naphthenols, etc.

It should be noted that the oil produced by the process behaves differently (has a different affinity to oxygenated carbonaceous feedstocks such as lignocellulosic such as wood) than mineral oils and that the full effects stated below may not be obtained using e.g. mineral oils. Whereas such mineral oils are good solvents for less polar materials such as coal they are generally not fully mixable with the oxygen containing oil produced by the process. It should further be noticed that the liquid hydrocarbons recycled may be part of the whole oil or it may be one or more fractions of the liquid hydrocarbons e.g. a high boiling fraction of the produced oil e.g., a high boiling fraction before or after upgrading. By recycling such high boiling fraction of the liquid hydrocarbons produced the yield of lower boiling compounds may be increased.

Advantageously said liquid hydrocarbons produced by the process is introduced into said pre-treatment step in a dry ash-free weight ratio to the carbonaceous material of 0.5 to 1.5 such as in a dry ash-free weight ratio to the wood in the range 0.8 to 1.2.

The concentration of said liquid hydrocarbons produced by process in the feed mixture may according to an embodiment of the present invention be at least 10 wt % such as at least 12.5 wt %. Preferably the concentration of said liquid hydrocarbons produced by process in the feed mixture is at least 15 wt % such as at least 20 wt %. Even more preferably the concentration of said liquid hydrocarbons produced by process in the feed mixture is at least 22.5 wt % such as at least about 25 wt %. At lower concentrations the full benefits of the addition of the in situ produced liquid hydrocarbon further described below is not obtained.

Further, the concentration of said liquid hydrocarbons produced by process in the feed mixture may according to an embodiment of the present invention be below about 40 wt % such as below about 35 wt %. Preferably the concentration of said liquid hydrocarbons produced by process in the feed mixture is below about 30 wt % such as a concentration of said liquid hydrocarbons produced by process in the feed mixture below about 25 wt %. At higher concentrations of said in situ produced liquid hydrocarbons there is not sufficient space for other required ingredients such as water, homogeneous catalysts and water-soluble organics for the conversion reactions to proceed as desired.

Water-soluble organics produced by the process are preferably recovered in the recovery unit and recycled to the feed preparation step in a concentrated form.

It should be understood that the water-soluble organics comprises a complex mixture of hundreds of different compounds. The water-soluble organics may also comprise emulsified liquid hydrocarbon product produced by the process.

The water-soluble organics may according to an embodiment of the present invention comprise one or more components selected from 1. Ketones such as acetone, propanones, butanones, penthanones, penthenones, cyclopentanones such as 2.5 dimethyl cyclopentanone, cyclopentenones, hexanones and cyclohexanones such as 3-methyl hexanone, qionones etc.

2. Alcohols and polyalcohols such as methanol, ethanol, propane's (incl isopropanol), butanols, pentanols, hexanols, heptanols, octanols such as 2-butyl-1-octanol, hydroquinones, etc 3. Phenols, alkylated phenols, poly-phenols, monomeric and oligomeric phenols, creosol, thymol, alkoxy phenols, p-coumaryl alcohol, coniferyl alcohol, sinapyl alcohol, flavenols, catechols 4. Carboxylic acids such as formic acid, acetic acid and phenolic acids like ferric acid, benzoic acids, coumarin acid, cinnamic acid, abietic acid, oleic acid, linoleic acid, palmetic acid, stearic acid 5. Furans such as tetrahydrofuran, etc 6. Alkanes, alkenenes, toluene, cumene, etc. and combinations thereof.

In general the water-soluble organics constitute a complex mixture of the above and the feed mixture may comprise such water-soluble organics in a concentration from about 1 wt % to about 10 wt % such as in the range from about 2 wt % to about 5 wt %. Further no individual component in the recycled water-soluble organics is generally in a concentration of more than corresponding to about 1 wt % in the feed slurry unless specific liquid organics compounds are added to the feed mixture in addition to the liquid hydrocarbons and water-soluble organics.

Typically the weight ratio of said recycled stream(-s) comprising liquid organic compounds relative to said input streams being introduced into said feed handling according to the present invention is in the range 0.01 to 5.0, such as in the range 0.1 to 2.0, preferably in the range 0.15 to 1.0 such as in the range 0.10 to 0.5, and even more preferably in the range 0.2-0.4. Besides introducing process advantages from a conversion point of view, the recovery and recycle of in situ produced liquid organic compounds to the pre-treatment 1 enables preparation of a feed mixture comprising homogeneous pumpable slurry or paste F from the input streams as received and/or preparation of a feed mixture comprising a pumpable slurry or paste having a higher dry matter content as no or less water and/or other solvent needs to be added to said pre-treatment 1. It has further been found that presence of said liquid organic compounds during said pre-treatment 1 introduces a stabilizing and/or dissolution effect that assists in homogenizing the feed mixture F e.g. by decreasing the viscosity of said feed mixture at a given dry solid content and temperature or allows for operation at a higher maximum particle size and/or at higher dry matter contents and thereby results in an overall more economical and effective process e.g. less parasitic energy losses and more oil produced.

The presence of the liquid organic compounds in the feed mixture has multifunctional effects and benefits including:
Liquid organic compounds in the pre-treatment/feed slurry preparation act as stabilizers and/or dispersants assisting in homogenizing the feed mixture e.g. decreasing sedimentation/precipitation and thereby allowing production of pumpable feed mixtures with a higher dry matter content thereby a higher output of liquid hydrocarbons from a given plant design is obtained;

Liquid organic compounds produced by the process assists in softening the lignocellulosic e.g. by improving wetting and/or dissolving part of the lignocellulosic material thereby a more homogeneous and pumpable feed slurry at high dry matter contents is obtained i.e. a more energy efficient and economical process is provided;

Liquid organic compounds in the form of water-soluble organics assists in homogenizing the feed slurry by solvolysis, which is believed to result in a softening/dissolution/pulping of the lignocellulosic structure at a lower temperature and thereby improving the rheological properties of the feed mixture e.g by lowering the viscosity and/or increasing the dry matter content i.e a more energy efficient and economical process is provided;

Liquid organic compounds in the form of oxygen containing species (both the oil and the water-soluble organics) introduce a parallel dissolution mechanism that enhances the conversion to desired products. The oxygen containing species are more similar to the lignocellulosic material and therefore have a stronger affinity to the material and are further believed to be more powerful solvents for such material (one can imagine the rule "like dissolves like").

The presence of liquid organic compounds in the feed mixture reduces the energy required to heat the feed mixture to the desired reaction temperature due to a lower heat capacity compared to water. For example, at a pressure in the range 300 to 320 bar and a temperature of about 400° C., the amount of energy required to heat the feed mixture to the desired reaction temperature is about 30-40% lower than for water, thereby a more energy efficient and economical process is provided.

The substantial recovery and recycling of the water-soluble organics results in higher yields than prior art processes. By recirculation of the water-soluble organics the concentration in water phase reaches a steady state where little or no further water-soluble organics are formed and the energy contained in the water-soluble organics is redistributed between the oil and gas product i.e. thereby a more efficient and economical process is provided.

Liquid organic compounds in the form of water-soluble organics increase thein situ production of hydrogen; thereby a more efficient and economical process is provided.

Liquid organic compounds act as radical scavengers suppressing polymerization reactions such as tar and char formation and may also be involved in the conversion process as a reactant, thereby a higher quality product, a more stable, efficient and economical process is obtained.

Depending on the concentration of the homogeneous catalysts such as potassium and/or sodium in the input stream(-s) makeup catalysts may also be introduced to adjust the homogeneous catalyst concentration to the concentration according to the present invention. The homogeneous catalyst concentration in the form of potassium and/or sodium may according to the present invention be at least about 0.5% by weight of the input stream such as at least 1.0% by weight. Preferably the homogeneous catalyst concentration in the form of potassium and/or sodium may according to the present invention be at least about 1.5% by weight such as at least 2.0%. More preferably the concentration of the homogeneous catalyst in the form of potassium and/or sodium may according to the present invention be at least about 2.5% by weight such as at least 3.0% by weight. Even more preferably the homogeneous catalyst concentration in the form of potassium and/or sodium according to the present invention be at least about 3.5% by weight such as at least 4.0% by weight.

A major part of said homogeneous catalyst in the form of potassium and/or sodium is according to an advantageous embodiment of the present invention recovered from the process water phase simultaneously with said water-soluble organics described above and introduced into the feed mixture together with the process water phase containing water-soluble organics and water.

Said homogeneous catalyst may according to a preferred embodiment of the present invention be added as a salt or be dissolved in a liquid e.g. water. Often said make-up catalyst(s) according to the present invention will be in an alkaline form such as in a hydroxide or carbonate form, and may besides make up of the homogeneous catalyst concentration further serve as a pH adjustment of the feed mixture so as to obtain a pH of at least 7 during or after said conversion, preferably a pH in the range 8-12 and more preferably a pH in the range 8-11.

In many embodiments according to the present invention, the pH of the feed mixture during and/or after said conversion of carbonaceous material contained in said feed mixture is controlled by measuring the pH during and/or after said conversion and adjusting the pH in said feed handling by addition of make-up catalyst and/or alternatively adding another base to the feed handling.

Carbonaceous materials are in the present context used as raw material(-s) for production of a low sulphur oxygen containing renewable crude oil according to the present invention are generally renewable materials such as plant materials such as biomass. The carbonaceous material may be in a solid form or may have a solid appearance, but may also be in the form of a sludge or a liquid. Further, the raw material(-s) may be contained in one or more input streams.

Non limiting examples of carbonaceous feedstock according to the present invention include biomass such as woody biomass and residues such as wood chips, sawdust, forestry thinnings, road cuttings, bark, branches, garden and park wastes & weeds, energy crops like coppice, willow, miscanthus, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like miscanthus, switch grass, sorghum, jatropha; aquatic biomass such as macroalgae, microalgae, cyanobacteria; animal beddings and manures such as the fibre fraction from livestock production; municipal and industrial waste streams such as black liquor, paper sludges, off-specification fibres from paper production; residues and byproducts from food production such as juice or wine production; vegetable oil production, sorted municipal solid waste, source sorted house wastes, restaurant wastes, slaughterhouse waste, sewage sludge and combinations thereof.

Many carbonaceous materials according to the present invention are related to lignocellulosic materials such as woody biomass and agricultural residues. Such carbonaceous materials generally comprise lignin, cellulose, and hemicellulose.

An embodiment of the present invention includes a carbonaceous material having a lignin content in the range 1.0 to 60 wt % such as lignin content in the range 10 to 55 wt %. Preferably the lignin content of the carbonaceous material is in the range 15 to 40 wt % such as 20-40 wt %.

The cellulose content of the carbonaceous material is preferably in the range 10 to 60 wt % such as cellulose content in the range 15 to 45 wt %. Preferably the cellulose content of the carbonaceous material is in the range 20 to 40 wt % such as 30-40 wt %.

The hemicellulose content of the carbonaceous material is preferably in the range 10 to 60 wt % such as cellulose content in the range 15 to 45 wt %. Preferably the cellulose content of the carbonaceous material is in the range 20 to 40 wt % such as 30-40 wt %.

The pre-treatment 1 may according to a preferred embodiment of the present invention further comprise providing a feed mixture with a particle size of maximum 30 mm such as a particle size of maximum 15 mm, preferably said feed mixture provided has a particle size of maximum 5 mm such as a particle size of maximum 2 mm, more preferably the maximum particle size in said feed mixture is in the range 0.01 to 1.5 mm such as 0.1 to 1.0 mm. Said providing may comprise controlling the maximum particle size of the input materials e.g. by dividing said input materials by a sieving operation and/or one or more crushing and/or grinding and/or milling and/or cutting operations (not shown) and/or by dividing said feed mixture before being withdrawn from said pre-treatment to the pressurization step.

The pre-treatment 1 according to a preferred embodiment according to the present invention further comprises means for thoroughly mixing and transforming said input stream(-s) and fluid streams into a homogeneous slurry or paste. Said mixer may according to the present invention be a stirred vessel equipped with means for efficiently mixing and homogenizing viscous materials such as a planetary mixer, Kneader or Banbury mixer. Other preferred means for thoroughly mixing and homogenizing said input and fluid streams to a feed mixture according to the present invention include inline mixers. Such inline mixers may further introduce a cutting and/or scissoring and/or self-cleaning action. The mixer is preferably further equipped with means for heating said feed mixture to a temperature in the range 80 to 250° C., preferably in the range 130 to 200° C. and more preferably in the range 150 to 180° C. at sufficient pressure to avoid boiling such as a pressure in the range 1-30 bar, preferably in the range 5-20 bar. Preferred means for heating said feed mixture during the pre-treatment according to the present invention include a heating jacket not shown). In a preferred embodiment the heat for preheating said feed mixture in the pre-treatment 1 is obtained from the cooling of the converted carbonaceous material comprising liquid hydrocarbon product e.g. by heat exchange with this process stream. Hereby the energy efficiency of the process may be further enhanced.

According a preferred embodiment of the present invention, the mixer may further be equipped with a recirculation loop, where material is withdrawn from said mixer and at least partly recirculated in an internal or external loop and re-introduced into said pre-treatment so as to control the residence time in said pre-treatment or feed handling to a predefined time.

Said external loop may further comprise one or more size reduction and/or homogenization device(-s) such as a macerator and/or a colloidal mill and/or a cone mill or a combination thereof. Preferred residence times in said pre-treatment step 1 are according to the present invention in the range 1 minute to 24 hours such as in the range 5 minutes to 12 hours. Preferably the residence time is in the range 5 minutes to 6 hours, more preferably in the range 5 minutes to 3 hours such as in the range 10 minutes to 2 hours.

Typically, the dry matter content according to the present invention is in the range 15 to 70% by weight, preferably in the range 20 to 60% and more preferably in the range 25 to 50% by weight.

The process according to the present invention requires water to be present in said feed mixture. Typically, the water content in said feed mixture is at least 30% by weight in the range 30 to 80% by weight and preferably in the range 40 to 60%.

The process according to the invention may further comprise introducing a texturing agent to the feed mixture, where the texturing agent serves the purpose of preventing the feed mixture from separating and maintaining the feed mixture homogeneous and pumpable. Further the texturing agent should possess the capability of being converted or degraded during the process. The texturing agent is according to an aspect of the present invention being adapted to stabilize the feed mixture to prevent separation and further to maintain the feed mixture as a homogeneous mixture during a pressurization and where the texturing agent is adapted to be converted or degraded during the hydrocarbon production process, where the texturing agent is chosen among the following: A pulp produced from part of the carbonaceous material being processed, microalgae, peat, vinasse, molasses, glycerine such as crude glycerine from biodiesel production, palm oil manufacturers effluent ("POME"), tall oil, black liquor from paper production, hydrocolloids, polysaccharides, carboxymethylcellulose (CMC), methylcellulose, hydroxypropyl methylcellulose, microcrystalline cellulose (MCC), nanocrystalline cellulose (NCC), polyanionic cellulose (PAC), pectin, hydrocolloids such saccharides such as carrageenan, pullulan, konjac and alginate, agar-agar, cassia gum, gellan gum, guar gum, locust beangum and xanthan gum and combinations thereof.

In a preferred embodiment, according to the present invention, the texturing agent comprises a cellulosic material or a derivative of a cellulosic material such as where the texturing agent is selected from carboxymethyl cellulose (CMC), methyl cellulose, hydroxypropyl methylcellulose, microcrystalline cellulose, nanocrystalline cellulose, polyanionic cellulose and combination thereof.

The texturing agent comprising such cellulosic materials may according to an aspect of the present invention be added in a concentration of 0.01 to 10% by weight of the incoming feed stream, preferably in the range 0.02-5% by weight, more preferably 0.05 to 2 by weight, most preferably in the range 0.1 to 1% by weight.

A particularly preferred texturing according to many aspects of the present invention is where the texturing agent is carboxymethyl cellulose having a molecular weight in the range 10000 to 1000000, preferably in the range 50000 to 750000, and where the degree of polymerization is in the range 100 to 5000, and the degree of substitution is in the range 0.5-1.5, preferably in the range 0.60-1.0.

In an advantageous embodiment the texturing agent added to said feed mixture in the pre-treatment is produced by pulping part of the carbonaceous material being processed in said step of providing a low sulphur, low oxygen containing oil. Hence, an advantageous embodiment of the present invention is where the texturing agent is produced by a process for preparing a feed mixture for use in a process for producing hydrocarbon, comprising:
a. Producing a texturing agent in the form of pulp by
i. Providing at least one feedstock of carbonaceous material;
ii. Providing a desired water content;

iii. Providing a desired content of homogeneous catalyst in the form of a compound of potassium and/or sodium;
iv. Providing a desired content of liquid hydrocarbon product
v. Providing a desired amount of water-soluble organics
vi. Mixing the ingredients i. to v.;
vii. Adjusting the pH of the mixture to a pH in the range 10-14, preferably in the range 11-12.5 by addition of base;
viii. Heating said pH adjusted mixture to a temperature in the range 150-230° C. under stirring to produce a texturing agent in the form of a pulp;
b. Providing at least one feedstock of carbonaceous material;
c. Providing a desired amount of water;
d. Providing a desired content of homogeneous catalyst in the form of a compound of potassium and/or sodium;
e. Providing a desired content of liquid organic product
f. Providing a desired amount of water-soluble organics
g. Mixing the ingredients a) to f) for a time sufficient to provide a homogeneous feed mixture.

The mechanical and/or thermal and/or chemical pulping of the input materials obtained in the pre-treatment 1 according to a preferred embodiment of the present invention enables the production of a homogeneous pumpable feed mixture premixed with additives for performing a process according to the present invention and having a high dry matter content at a viscosity processable by a process according to the present invention. The feed mixture according to the present invention results in a more effective and economical process than in the prior art e.g. less parasitic energy losses, higher oil yields, increased capacity, higher on-stream factor and/or higher quality of the oil.

2. Conversion

The feed mixture is being withdrawn from said pre-treatment and transferred to the pressurization step a. The pre-pressurization pump of the pressurization step is preferably a positive displacement pump such as a progressive cavity pump, lobe pump, rotary gear pump, auger pump or screw pump. According to the present invention said pressurization to the desired reaction pressure is essentially performed before heating from entry temperature from the pre-treatment 1 to the reaction temperature is initiated. Suitable pumps for said pressurization according to the present invention include rotary lobe pumps in a series arrangement, piston pumps, hose diaphragm piston pumps.

The pressurization is preferably performed prior to heating and the feed mixture is generally pressurized to a sufficiently high pressure to maintain the feed mixture and/or converted feed mixture in a liquid and/or supercritical state during said heating and conversion i.e. the feed mixture is pressurized to a pressure of at least the boiling point and/or saturation pressure at the prevailing temperature in the process (and above the critical pressure at temperatures above the critical temperature).

Typically the feed mixture may be pressurized to an operating pressure during said heating and conversion of at least 150 bar such as 180 bar, preferably said operating pressure is at least 221 bar such as at least 250 bar and more preferably said operating pressure during conversion is at least 300 bar. Even more preferably the operating pressure is in the range of 300-400 bar such as in the range 300-350 bar.

The pressurized feed mixture is subsequently heated to a reaction temperature in the range 300 to 450° C. such as in the range 350 to 430° C., preferably in the range 370 to 430° C. such as in the range 390 to 430° C., more preferred in the range 400 to 420° C. such as in the range 405 to 415° C.

By maintaining the operating pressure above 300 bar such as above 320 bar, preferably in the range from about 300 bar to 400 bar such in the range 310 to 350 bar it is obtained that energy required to heat the feed mixture to the desired operating temperature is reduced. Further the combination of operating pressure and operating temperature results in a density of the feed mixture at the maximum temperature which are in the range 250-500 kg/m$^3$ such as in the range 300-450 kg/m$^3$. Preferably the density is in the range 350 to 450 kg/m$^3$ such as in the range 375-425 kg/m$^3$. Maintaining the operating pressure and operating temperature so as to obtain a density in this range results in a smaller reactor volume required to obtain a desired reaction time. Further important properties for the conversion such as the dielectric constant and ionic product of water are a unique function of the density and only indirectly of pressure and temperature.

According to a preferred embodiment of the present invention said heating is performed in one or more heat exchangers. Preferably said heating is at least partly performed by recovery of heat from one or more process streams. In the preferred embodiment shown in the figure, heat is recovered from the hot product stream, from the reaction zone c. and transferred to the pressurized feed mixture by direct heat exchange in the first heat exchanger(-s). Typically, the feed mixture is heated from entry temperature to a temperature in the 180-250° C. in the first heat exchanger, and to a temperature in the range 300-375° C. in the second heat exchanger. In an advantageous embodiment the heat recovery is performed by indirect heat exchange with a heat transfer medium such as superheated steam, supercritical water, hot oil or a molten salt. Particularly preferred heat transfer medium for indirect heat transfer according to the invention are supercritical water. By use of such heat transfer medium, it is obtained that both the feed mixture and the product mixture may flow inside tubes thereby allowing for easier cleaning and further the external heat can be supplied on a clean well defined fluid rather than the process fluid thereby enabling improved control of said heat addition.

By said heat recovery it is obtained that the process becomes very energy efficient as most of the heat required is recovered. In many embodiments of the present invention at least 40% of the energy required to heat the feed mixture to the desired reaction temperature is being recovered such as at least 50% of the energy required to heat the feed mixture to the desired reaction temperature is being recovered. Preferably, at least 60% required to heat the feed mixture to the desired reaction temperature is recovered such as at least 70% of the energy required being recovered.

The heat exchangers may optionally be combined into one heat exchanger. However, as the properties of the feed mixture e.g. the viscosity changes significantly during said heating, it is typically preferred to divide said heating into two or more heat exchangers. This further has the advantage that different materials of construction may be used in the heat exchangers e.g. a lower alloyed material may be used in the first heat exchanger. Further according to a preferred embodiment of the present invention said heat exchangers are designed to provide a relatively high heating rate in the temperature range up to 300° C. or thereabout. Typically, the heating rate in the range from 140 to 300° C. is at least 50° C./min, preferably 75° C./min, more preferred 100° C./min and even more preferred 150° C./min. In combination with the characteristics of the feed mixture according to the present invention it is hereby obtained that undesired side reactions to char and tar are minimized, and that the yield of desired liquid hydrocarbon product is maximized.

The feed mixture is further heated to reaction temperature in the heat exchanger. Said heater may be a fired heater e.g. a heater fuelled by e.g. natural gas, oil or other suitable fuel. Preferably said fired heater is at least partly fueled by a product produced by the process according to the present invention such as gas produced by the process as shown in the figure. Other potential products produced by the process for at least partly fuelling said fired heater may include char and liquid hydrocarbon product. By at least partly fuelling said fired heater by a product produced by the process the parasitic energy loss is reduced and the energy efficiency is increased. Hereby a process that uses less consumables are more economical, more energy efficient and have a smaller environmental and/or $CO_2$ footprint is obtained.

Alternative embodiments of the further heating to the reaction temperature according to the present invention include a fired heater with indirect heating e.g. where heat from the combustion fuel(-s) in said furnace or burner is first transferred to another heat transfer medium such as supercritical water, hot oil or molten salt before heat exchange with said partly heated feed stream.

In advantageous embodiment of the present invention the operating temperature for said conversion process are selected so as produce sufficient gas the process to be self-sustaining in energy i.e. the energy required in said fired heater is supplied by products produced by the process such as the process gas.

The flow velocity of the feed mixture and/or the product mixture is maintained at least at a level so as to avoid sedimentation of any particles in the feed- or product mixture. Hence, according to an advantageous embodiment of the present invention, the flow velocity of the feed mixture and/or the product mixture is maintained at a velocity of at least 0.1 m/s such as at least 0.2 m/s. Particularly the flow velocity of the feed mixture and/or the product mixture is maintained at a velocity of at least 0.4 m/s such as at least 0.6 m/s. Preferably the flow velocity of the feed mixture and/or the product mixture is maintained at a velocity of at least 0.8 m/s such as at least 1.0 m/s. Even more preferably the flow velocity of the feed mixture and/or the product mixture is maintained at a velocity of at least 1.0 m/s such as at least 1.5 m/s. Hereby a more efficient process with a higher on stream factor and/or more efficient heat transfer is obtained.

Subsequent to heating to reaction temperature said pressurized and heated feed mixture is maintained at the desired pressure and temperature in a reaction zone c. for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 2 to 45 minutes, preferably said predefined time in said reaction zone is in the range 3 to 30 minutes such as in the range 3 to 25 minutes, more preferred in the range 4 to 20 minutes such as 5 to 15 minutes.

The residence time in the reaction zone c. may be obtained in long tubular reactor(-s) or in shorter larger diameter reactor(-s). As the wall thickness of the reactor(-s) increases with the diameter of the reactor(-s) it is generally preferred to use reactor(-s) with diameters within standard high pressure tubes e.g. inner diameters of individual reactors up to about 0.8 m. Preferably the reactor(-s) is/are vertically oriented and the feed mixture is fed to the top of said reactor(-s) and flows in same direction as the gravity and withdrawn from the bottom. Preferably said conversion reactors further comprise a conically shaped inlet for introducing said feed mixture in the top and a conically shaped outlet for withdrawing said converted feed mixture in the bottom. In many embodiments said conically shaped inlet and outlet has an angle of the walls of said conically shaped inlet and/or outlet to the centre line of said reactor below 300 such as an angle of the walls of said conically shaped inlet and/or outlet to the centerline of said reactor below 25°. Advantageously said conically shaped inlet and outlet has an angle of the walls of said conically shaped inlet and/or outlet to the centerline of said reactor below 22.5° such as an angle of the walls of said conically shaped inlet and/or outlet to the centerline of said reactor below 20°.

Further the diameter of inlet and outlet of reactor c. to the maximum diameter of the reactor are preferably selected so as to obtain a minimum ratio of the maximum average velocity in inlet/outlet to the minimum average velocity in the reactor of at least 25, preferably the ratio of the maximum average velocity in the inlet/outlet to the minimum average velocity in the reactor are selected so as to obtain a ratio of velocities at least 50, more preferred the maximum average velocity in the inlet/outlet to the minimum average velocity in the reactor are selected so as to obtain a velocity ratio of at least 75 such as a velocity ratio of at least 100.

Hereby an advantageous reactor system is provided that is less sensitive to clogging due to sedimentation of suspended particles, and is more compact and economically attractive than in the prior art. Further the controlled decrease and increase of velocities in the inlet and outlet may allow for a more efficient use of the reactor volume.

Figure 4:
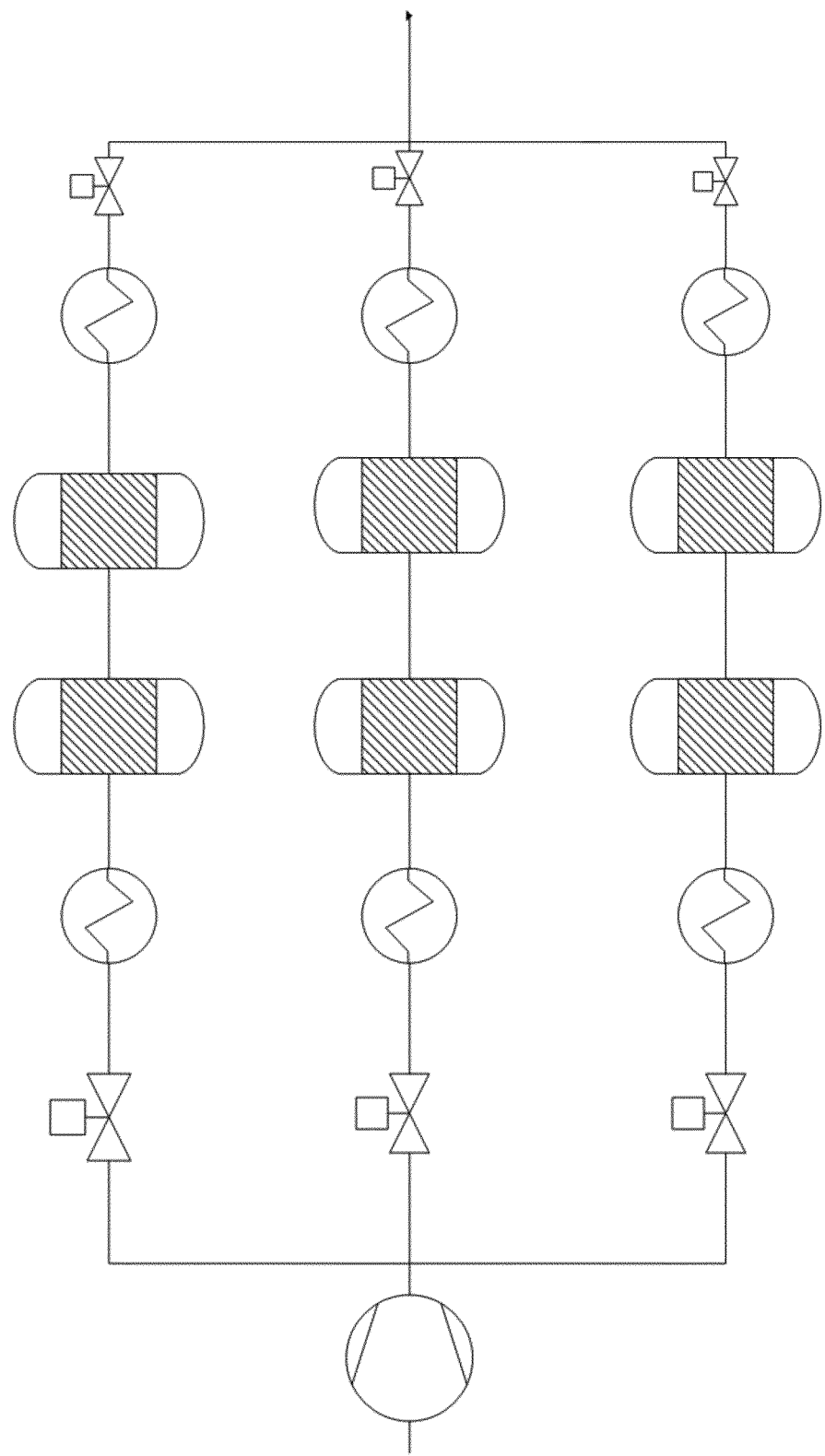
FIG. 4 shows a preferred embodiment according to the present invention comprising multiple parallel heat exchanger and reactor trains.

A reaction zone c. according to the present invention advantageously comprises two or more reactors in a series and/or in a parallel arrangement. A particularly preferred embodiment is shown in further details in FIG. 4. The embodiment comprises a dividing manifold with shutoff valves after the pressurization pump where the feed mixture is divided and passes through two or more parallel heating steps, and further through two or more parallel conversion steps each may comprise two or more reactors in series, and further through one or more cooling steps before the converted feed mixture before the converted feed mixture is being reassembled in another manifold with shut off valves.

Hereby an efficient and economical process design comprising multiple reactor, heating and cooling trains are provided, which further has the advantage that the diameters of high pressure shells of the heat exchangers and the reactors don't get excessive big and the wall thicknesses can therefore be kept at a reasonable level. Further the manifolds and shut off valves are located in relative cold positions and allows for shut off of reactor lines without that the valve gets excessively expensive.

3. Cooling & Expanding

The outlet stream from the reactor c. comprising liquid hydrocarbon product from said converted carbonaceous material is subsequently cooled to a temperature in the range 150 to 300° C. such as in the range 200 to 250° C. by heat exchange with the incoming feed mixture in the heat exchangers. Said heat exchange with the incoming feed mixture may be performed by direct heat exchange between the incoming feed mixture and the outgoing product mixture comprising the hydrocarbon product. However, a preferred embodiment of the present invention is where said heat exchange is performed by indirect heat transfer via a heat transfer medium such as superheated steam, supercritical water, hot oil or molten salt. By use of such indirect heat transfer via a heat transfer medium it is obtained that both the feed mixture and the product mixture can flow inside tubes thereby allowing for easier cleaning. The heat transfer medium may optionally be further heated and/or be further cooled so as to allow for added controllability and flexibility of the heating and cooling. Said heat transfer medium may also be used for transfer of heat to/from other unit operations of the process such as e.g. the pre-treatment 1 and/or the upgrading part of a process according to the present invention. The product mixture is often further cooled to a temperature in the range 60 to 250° C. in the heat exchanger before expanding said product mixture such as cooling to a temperature in the range 100 to 175° C. before expanding said product mixture. In particular, the product mixture is further cooled in a further cooler 10 to a temperature of 110 to 160° C. before expanding said product mixture, such as cooling to a temperature in the range 120 to 150° C. before expanding said product mixture.

During said cooling, the temperature and flow of the cooling medium are controlled so that the surface temperature of the heat transfer surface in contact with the product medium is maintained at a temperature above about 50° C. such as at a temperature above about 70° C. Preferably the surface temperature of the heat transfer surface in contact with the product medium is maintained at a temperature above about 80° C. such as at a temperature above about 90° C. Hereby fouling of the heat transfer surfaces in the cooler by high boiling compounds in said liquid hydrocarbon product is reduced.

Pressure let down of the product mixture may be performed in one or more expansion steps. Suitable means for pressure let-down include valves including control orifices, tubular elements, turbines and pumps operated in a reverse mode e.g. as a brake with or without recovery of the pressure energy.

4. Separation

The mixture from said expanding containing liquid hydrocarbon product is subsequently lead to separation. Said separation may according to the present invention comprise means for separating gas from said mixture as shown in the figure. Said separation means may comprise a flash separator or degasser, wherein gas is withdrawn from the top. According to an embodiment of the present invention said gas may be used to produce heat for heating in the process to the process. The gas may optionally be cooled to condense compounds such as e.g. water prior to said use to produce heat for heating in the process.

A particularly preferred embodiment according to the present invention includes a system where the converted feed mixture/product mixture is first cooled to a temperature of 60 to 250° C., expanded to a pressure in the range from about 50 to about 150 bar such as in the range from about 60 to about 120 bar and led to a phase separator/degasser for separation of the product mixture into at least a gas phase and residual phase. Preferably the gas phase is first cooled to a temperature in the range 70 to about 200° C., expanded to a pressure in the range 60 to 110 bar such as in the range 70 to 100 bar and led to a phase separator/degasser for separation of the converted feed mixture/product mixture into at least a gas phase and a residual phase.

As further exemplified below, the gas phase often comprises carbon dioxide, hydrogen, carbon monoxide, methane, ethane, ethane, propane, iso-propane, butane, iso-butane, water, methanol, ethanol, acetone.

An advantageous embodiment of the present invention includes extracting/separating hydrogen from said separated gas phase and introducing it into said process for upgrading low sulphur, low oxygen containing renewable oil according to the present invention after the pressurization of the oil as further illustrated in the figure.

One aspect of the present invention comprises extracting/separating hydrogen from the separated gas phase by a membrane gas separation technique. Another aspect of the present invention comprises extracting/separating hydrogen using a pressure swing adsorption technique. A further aspect of the present invention comprises extracting/separating hydrogen from said separated gas phase by the steps of:

Separating the converted feed mixture/product mixture into a gas phase and a residual phase Cooling the separated gas to a temperature in the range from about 31 to 50° C. and separating the cooled gas phase into a condensed phase substantially free of hydrogen and a residual gas phase enriched in hydrogen and carbon dioxide in a phase separator, Further cooling the separated gas phase to a temperature in the range from about 10 up to about 31° C. and separating the cooled residual gas phase into a liquid phase comprising $CO_2$ and a residual gas phase enriched in hydrogen in a separator.

Introducing the hydrogen enriched gas in the upgrading process after the pressurization step.

The amount of hydrogen in said separated gas phase depends on the specific operating conditions for said conversion process according to the present invention such as operating pressure, operating temperature, concentration and type of liquid organic compounds, homogeneous catalyst(-s) type and concentration, pH, etc.

A preferred embodiment comprises selecting the operating conditions for said conversion process so as to produce a substantial part of the hydrogen required in the upgrading process according to the present invention.

Often the amount of hydrogen is produced in the step of providing the low sulphur oxygen containing renewable crude oil and introduced into the process of upgrading comprises at least 20% of the hydrogen consumed in the upgrading process such as at least 25% of the hydrogen consumed in the upgrading process, preferably the hydrogen produced in the step of providing the low sulphur oxygen containing renewable crude oil and introduced into the process of upgrading comprises at least 30% of the hydrogen consumed in the upgrading process such as at least 40% of the hydrogen consumed in the upgrading process, more preferably the hydrogen produced in the step of providing the low sulphur oxygen containing renewable crude oil and introduced into the process of upgrading comprises at least 50% of the hydrogen consumed in the upgrading process such as at least 60% of the hydrogen consumed in the upgrading process. Even more preferably the hydrogen produced in the step of providing the low sulphur oxygen containing renewable crude oil and introduced into the process of upgrading comprises at least 70% of the hydrogen consumed in the upgrading process such as at least 75% of the hydrogen consumed in the upgrading process.

The gas separating means may further provide at least a coarse separation of the degassed mixture into a liquid hydrocarbon rich stream and residual water rich stream e.g. by gravimetric separation in a 3-phase separator.

The water rich stream comprising water-soluble organics suspended particles and dissolved salts may be at least partly withdrawn from said gravimetric separator, and fed to a recovery unit, optionally after further separation by gravimetric means filtering and/or centrifugation (not shown) to remove suspended particles.

The degassed mixture or optionally the liquid hydrocarbon rich stream, is withdrawn from said gas separating means, and may be further separated e.g. the liquid hydrocarbon rich stream may be required to be efficiently dehydrated and/or desalted/deashed before being introduced into the upgrading part of the process according to the present invention as the low sulphur oxygen containing renewable crude oil.

In many aspects of the present invention said further separation comprises one or more gravimetric separation step(-s) optionally equipped with means for coalescing oil or water droplets such as one or more electrostatic coalescing steps. In other aspects of the present invention said further separation may include separation in one or more centrifugation step(-s) such as separation in one or more 3-phase centrifuges such as one or more high speed disc bowl centrifuges and/or one or more decanter centrifuges.

Often the operating temperature of the further separation is selected so as to obtain a dynamic viscosity of the liquid hydrocarbon product in the range from about 1 to about 30 centipoises during said further separation such as in the range from about 1 to about 25 centipoises during said further separation, preferably the temperature of the separation is selected so as to obtain a dynamic viscosity in the range from about 1 to about 20 centipoises such as in the range 5 to 15 centipoise.

The operating temperature of said further separation may according to an embodiment of the present invention be in the range 80 to 250° C. such as in the range 100 to 175° C., preferably at least the first of said further separation is operating at a temperature in the range 110 to 160° C. such as a temperature in the range 120-150° C.

The operating pressure of said further separation may according to an aspect of the present invention be in the range 1 to 100 bar, such as in the range 2-74 bar, preferably said further separation is operating at a pressure in the range 15 to 50 bar, such as in the range 15-35 bar.

Many aspects of the present invention relates to the use of one or more phase separators, where the residence time in each of the phase separators is in the range 1-60 minutes such as in the range 1 to 30 minutes, preferably the residence time in each of the separators are in the range 2 to 20 minutes.

In a further aspect of the present invention a viscosity reducing agent may be added to the converted feed mixture before and/or during the further separation. The viscosity reducing agent may often be an organic solvent having a boiling point below 200° C. such as below 150° C., preferably below 140° C. such as below 130° C.

The weight ratio of the viscosity reducing agent added to the amount of low sulphur oxygen containing renewable oil may according to many embodiments of the present invention be in the range 0.01 to 2 such as in the range 0.05 to 1, preferably the weight ratio of the viscosity reducing agent added to the amount of low sulphur oxygen containing renewable oil is in the range 0.1 to 0.5 such as in the range 0.1 to 0.4. More preferably the weight ratio of the viscosity reducing agent added to the amount of low sulphur oxygen containing renewable oil is in the range 0.2 to 0.4 such as in the range 0.2 to 0.35.

A particularly preferred embodiment is where the viscosity reducing agent comprises at least one ketone such as Methyl Ethyl Ketone (MEK) and/or 2-heptanone and/or 2.5 dimethyl-cyclo-pentanone or a combination thereof. In a further preferred embodiment the viscosity reducing agent comprise or further comprises toluene.

Advantageously the viscosity reducing agent comprises a fraction of the low sulphur oxygen containing renewable crude oil and is recovered downstream of said further separation step and prior to providing the low sulphur oxygen containing renewable crude oil to said upgrading step. The viscosity reducing agent according to the present invention may have multiple functions e.g. the viscosity reducing agent may besides reducing the viscosity of the oil act as de-emulsifying agent or assist in the dehydration and/or de-ashing of the oil.

According to a preferred embodiment of the present invention the viscosity reducing agent is recovered in an evaporation step operating at a temperature in the range 100-200° C. such as in the range 100-160° C., preferably the viscosity reducing agent is recovered in an evaporation step operating at a temperature in the range 100-150° C. such as in the range 100-130° C.

A particular preferred embodiment of the present invention is where the viscosity reducing agent is substantially recovered in one or more flash distillation step(-s) producing a low sulphur oxygen containing renewable crude oil phase and a distillate phase, and where the flash temperature is in the range 100-200° C. such as in the range 100-160° C., preferably the viscosity reducing agent is recovered in the flash distillation step producing a low sulphur containing crude oil phase and a distillate phase, where the flash temperature is in the range 100-150° C. such as in the range 100-130° C.

A washing agent comprising water may according to another aspect of the present invention be added to the liquid hydrocarbon product before or during said further phase separation step in order to further control the salt/ash content of said low sulphur oxygen containing renewable crude oil before being introduced to the upgrading step according to the present invention. The washing agent comprising water may according to the present invention be introduced in several steps.

The weight ratio of the washing agent comprising water to the low suphur oxygen containing renewable oil may advantageously be in the range 0.05 to 5.0 such as a weight ratio of the washing agent comprising water to the low suphur oxygen containing renewable oil is in the range 0.05 to 3.0, preferably the of the washing agent comprising water to the low suphur oxygen containing renewable oil is in the range 0.1 to 2.0 such as a weight ratio in the range 0.1-1.0.

The washing agent comprising water may according to an embodiment further comprise an acidification agent such as acetic acid or citric acid or $CO_2$. A particularly preferred acidification agent is $CO_2$, and advantageously said $CO_2$ is obtained by contacting the gas from the degassing The acidification agent may be added so as to obtain a pH of the water phase after separation of the washing agent comprising water in the range 2 to 7 such as a pH in the range 2.5 to 6.5, preferably the acidification agent is added so as to obtain a pH of the water phase after separation of the washing agent comprising water in the range 2.75 to 6 such as a pH in the range 3 to 5.5.

The further separation may according to an embodiment of the present invention further comprise one or more filtration step(-s) of the liquid hydrocarbon product. The filtration step may according to some preferred aspects of the present invention comprise the first step of the further separation and/or the filtration step may be the final step before introducing the low sulphur oxygen containing renewable crude oil to the upgrading process according to the present invention.

4. Recovery

The water phases from the gas separating means, and further separation means are fed to a recovery device, where liquid organic compounds in the form of water-soluble organics and/or homogeneous catalysts are recovered in a concentrated form, and recycled to into the pre-treatment device 1. Further separated water from 6. Upgrading may according to many aspects of the invention also be fed to the recovery unit as shown on the figure. As mentioned above under 1. Pre-treatment the water-soluble organics present in said water phase comprise a complex mixture of hundreds of different compounds including one or more compounds of ketones, alcohols and polyalcohols, phenols and alkylated phenols, carboxylic acids, furans, alkanes, alkenes, toluene, cumene, etc.

Preferably said recovery device, comprises one or more evaporation and or distillation step(-s), wherein water is evaporated from said combined water phases, and thereby providing a distillate and a concentrate. The degree of concentrating is selected so as to provide a distillate amount that corresponds to the amount of water added to the carbonaceous material, homogeneous catalyst and makeup base in the pre-treatment. Typically, the ratio of concentrate to the combined water phases entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention, the ratio of concentrate to the combined water phases entering the recovery unit is typically in the range from about 0.25 to about 0.6 such as in the range 0.3 to 0.6.

The combined water phases may be preheated to a temperature of e.g. 70-130° C. such as a temperature in the range 80 to 115° C. before entering into said evaporator and/or distillation step. The heat for said preheating is preferably provided by heat recovery from a process stream and/or from the outgoing distillate stream before entering into the evaporator. In the evaporator, water is evaporated from said mixture comprising water-soluble organics and dissolved salts at a temperature from about 100 to about 115° C. In these cases, the heat recovery from said process stream may be performed via a heat transfer medium such as a hot oil or steam e.g. transferring heat from the cooling of the product stream.

The pH of the combined water phase entering the recovery is according to the present invention preferably maintained at alkaline conditions such as in the range 7 to 14 such as a pH in the range 8 to 12, preferably the pH of the water phase to the recovery unit is maintained in the range 8 to 11. Operating at such inlet pH to the recovery unit has the advantage of reducing the amount of phenolics in the distillate.

An embodiment of said recovery step according to the present invention is where the recovery step comprises one or more flash step(-s).

A preferred embodiment of said recovery step according to the present invention is where the recovery step comprises evaporation in two or more steps operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer an absorber, where the evaporated fraction is contacted with an absorbent. Said absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled in a cooler to a temperature suitable for discharge. Hereby, it is obtained that said evaporator and/or distillation column and/or besides recovering said liquid organic compounds and/or homogenous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber such as activated carbon and/or a coalescing step and/or a membrane system such as reverse osmosis and/or a nanofiltration step and/or an ultrafiltration step and/or a pervaporation step and/or a biological treatment system such as a bioreactor.

A further preferred embodiment of the invention is where the recovery unit comprises one or more distillation columns or strippers, where a first distillation column or stripper provides a first fraction being enriched in compounds having a boiling point lower than water and water, and being depleted in compounds having a such as being substantially free of components having a boiling point higher than water ("the distillate"), and a second fraction being depleted in compounds having a boiling point lower than water and being enriched in components having a boiling point higher than water ("the concentrate"). The "distillate" enters a second distillation column where it is separated into a fraction enriched in compounds having a boiling point lower than water and a fraction and a fraction comprising a water phase that can be discharged to recipient.

The fraction being concentrated with compounds having a boiling point lower than water may according to a preferred embodiment be mixed with the concentrate from said evaporator, and recycled to the pre-treatment step 1.

In many applications according to the present invention a bleed or purge stream is withdrawn from said concentrated water phase prior to recycling to the pre-treatment step 1 to prevent build up of compounds such as chloride. The bleed stream may according to an embodiment of the present invention comprise up to about 40% by weight of the concentrated water phase from the recovery unit such as up to about 25% by weight of the concentrated water phase from the recovery unit. Preferably the bleed stream comprises up to about 20% by weight of the concentrated water phase from the recovery unit such as up to about 15% by weight of the concentrated water phase from the recovery unit. More preferably the bleed stream comprises up to about 10% by weight of the concentrated water phase from the recovery unit such as up to about 5% by weight of the concentrated water phase from the recovery unit. The bleed stream may be disposed off. However, in many applications according to the present invention, the bleed stream is further treated.

The concentrated water phase from the recovery unit typically has a positive heating value.

A preferred application according to the present invention comprises further treating the bleed stream by combustion and/or co-combustion in a boiler or incinerator. Optionally the bleed stream is further concentrated prior to said combustion and/or co-combustion.

A particularly preferred embodiment of the present invention comprises further treating the bleed stream in an ion exchange step. The concentrated water phase from the recovery unit may be filtered to remove eventual solids prior to entering said ion exchange step according to the present invention.

The ion exchange step may according to a preferred embodiment of the present invention comprise one or more ion exchange steps such as one or more ion exchange resin(-s) contained in one or more fixed beds. Said one or more ion exchange steps may be arranged with one or more fixed bed(-s) in parallel and/or one or more fixed bed(-s) in series.

An advantageous embodiment of the present invention comprises further treating the bleed stream comprises at least two fixed bed(-s), each containing a chloride selective ion exchange resin capable of selectively adsorbing chloride from said concentrated water phase from said recovery unit and arranged valves in a parallel arrangement so that at least one ion exchange bed is online and at least one ion exchange bed is offline. Hereby continuous operation is ensured and chloride removal can be continued in the ion exchange bed(-s) being online while ion exchange bed(-s) being offline can be cleaned. Said cleaning may according to an embodiment of the present invention be performed by a backflow or back flushing of the ion exchange bed(-s) by demineralized water such as distillate water from the recovery unit. The present invention includes a valve arrangement and/or control system allowing for such cleaning or regeneration by backflow or back flush with demineralized water.

Typically, the chloride removal in said ion exchange step according to the present invention is at least 50% of the chlorides in the concentrated water phase entering said ion exchange step such as a chloride removal of at least 60%. In many embodiments according to the present invention the chloride removal in said ion exchange step according to the present invention is at least 70% of the chlorides in the concentrated water phase entering said ion exchange step such as at least 80%. The chloride depleted stream from said chloride ion exchange step is preferably recycled to said pre-treatment step 1.

Further, in many embodiments according to the present invention the amount of homogeneous catalyst(-s) in the form of potassium and/or sodium such as being retained in said chloride depleted outlet stream from said chloride ion exchange step is at least 70% by weight of the amount entering said chloride ion exchange step such as at least 80% by weight. Preferably, the amount of homogeneous catalyst(-s) in the form of potassium and/or sodium such as being retained in said chloride depleted outlet stream from said chloride ion exchange step is at least 90% by weight of the amount entering said chloride ion exchange step such as at least 95% by weight. Hereby, less make up homogeneous catalyst is required to be added in the pre-treatment step 1, and a more economical process is obtained for providing said low sulphur oxygen containing renewable crude oil to the upgrading process according to the present invention, and thereby an overall more efficient and economical process is obtained.

6. Upgrading

Figure 5:
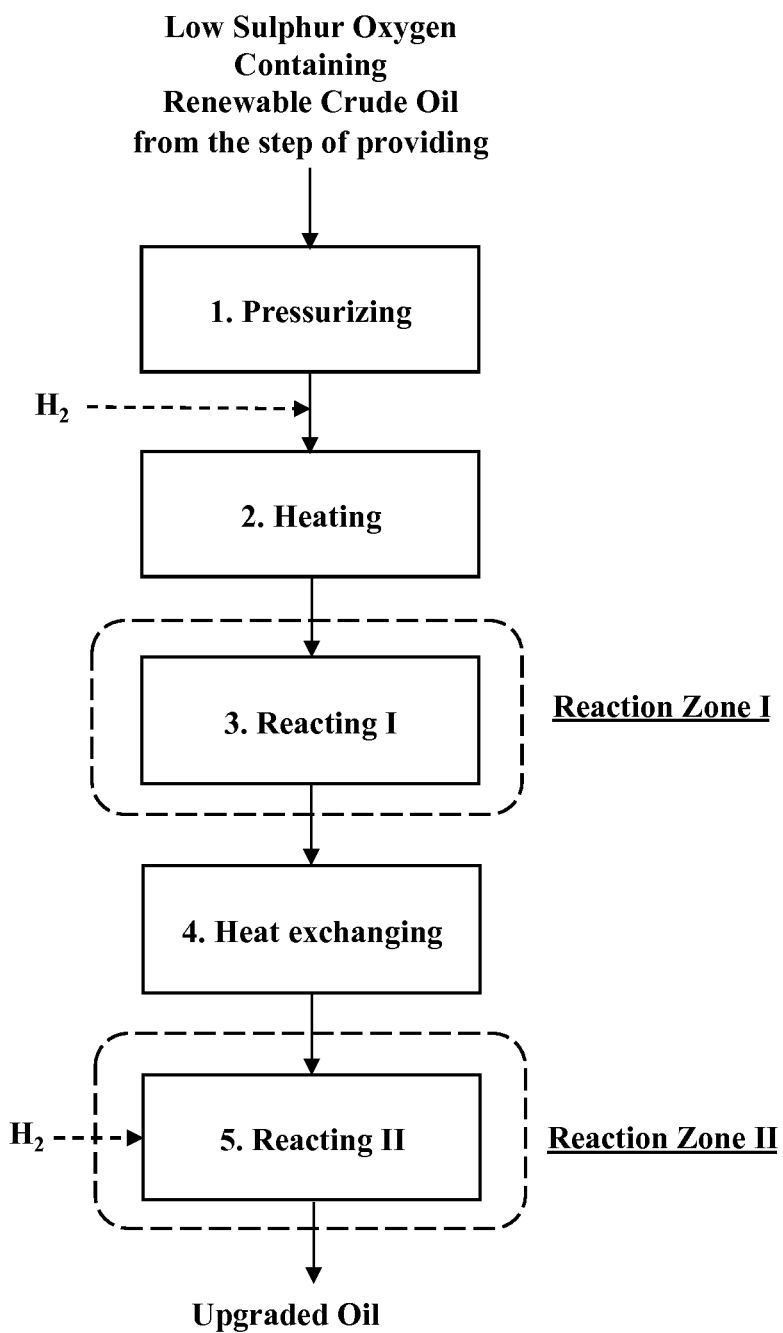
FIG. 5 shows an embodiment of an upgrading process according to the present invention comprising at least two reaction zones.

FIG. 5 shows an embodiment of an upgrading process according to the present invention having at least two reaction zones. The low sulphur oxygen containing renewable crude oil is first pressurized to a pressure in the range from about 20 bar to about 200 bar in the pressurization step 1 such as a pressure in the range from about 60 bar to about 150 bar. Preferably, the low sulphur oxygen containing renewable crude oil is pressurized to a pressure in the range from about 80 bar to about 150 bar in the pressurization step 1 such as a pressure in the range from about 100 bar to about 120 bar after said pressurization step 1.

The sulphur content of the low sulphur oxygen containing renewable crude oil may according to the present invention have a sulphur content of less than 0.5 wt % such as below 0.3 wt %. In some applications The sulphur content of the low sulphur oxygen containing renewable crude oil may be less than 0.2 wt % such as a sulphur content of less than 0.1 wt %. In further applications the sulphur content of the low sulphur oxygen containing renewable crude oil is less than 0.05 wt % such as a sulphur content of less than 0.01 wt %.

The oxygen content of the low sulphur oxygen containing renewable crude oil may according to the present invention have an oxygen content in the range from about 2 wt % to about 20 wt % such as an oxygen content in the range from about 3 wt % to about 17 wt %. Often the oxygen content is in the range from about 4 wt % to about 15 wt % such as an oxygen content in the range from about 5 wt % to about 12 wt %.

Hydrogen is according to an advantageous embodiment of the invention added and mixed with the low sulphur oxygen containing renewable crude oil after pressurization and prior to heating and entry into the first reaction zone. Hydrogen may further be added and mixed with the low sulphur oxygen containing renewable crude oil between the first reaction zone and the second reaction zone. The presence of hydrogen during said heating reduce fouling of heat exchangers during said heating.

The partial pressure of hydrogen at the inlet of the first reactor may according to an embodiment of the present invention be in the range 20 to 200 bar such as in the range 60 to 150 bar, preferably the partial pressure of hydrogen at the inlet of the of the first reactor is in the range 80 to 140 bar such as in the range 100 to 120 bar.

Further, the partial pressure of hydrogen at the inlet of the first reaction zone is at least 20 bar such as at least 50 bar, preferably the partial pressure of hydrogen at the inlet of the first reaction zone is at least 60 bar such as at least 80 bar, even more preferably the partial pressure of hydrogen at the inlet of the first reaction zone is at least 100 bar such as at least 110 bar.

The hydrogen is added in excess of the stoichiometric amount of hydrogen required for the upgrading process, where the amount of hydrogen added and mixed with the low sulphur oxygen containing renewable oil is up to 10 times higher than the amount of hydrogen consumed by the upgrading process such as up to 5 times higher than the amount of hydrogen consumed by the upgrading process, preferably the the amount of hydrogen added and mixed with the low sulphur oxygen containing renewable oil is the range 1.5 to 5 times higher than the amount of hydrogen consumed by the upgrading process such as in the range 2 to 5 times higher than the amount of hydrogen consumed by the upgrading process.

The pressurized gas stream comprising hydrogen is according to a preferred embodiment of the present invention at least partly produced by the process e.g. in the step of providing said low sulphur oxygen containing renewable crude oil and/or from the upgrading process itself as indicated in figure.

The pressurized low sulphur oxygen containing renewable crude oil is according to an embodiment of the present invention subsequently heated to a temperature from about 180° C. to about 410° C. before entering the first reaction zone such as a temperature in the range from about 220 to about 350° C. before entering the first reaction zone. Preferably, the low sulphur oxygen containing renewable crude oil is subsequently heated to a temperature from about 250° C. to about 330° C. before entering the first reaction zone such as a temperature in the range from about 280° C. to about 320° C. before entering the first reaction zone.

The heating to the desired reaction temperature at the inlet of reaction zone 1 may be performed in one or more heat exchangers. Advantageously at least part of the heat used for said heating is recovered from other parts of the process such as from cooling of the upgraded oil and/or from the step of providing the low sulphur oxygen containing renewable crude oil being upgraded. The heat recovery may be performed by direct heat exchange between the hot upgraded oil and the cold incoming low sulphur oxygen containing crude oil to be upgraded. However, a preferred embodiment comprises recovery of heat by indirect heat exchange using one or more heat transfer media such as hot oil, molten salt or steam or a combination thereof as heat transfer media to transfer heat from a hot stream to a colder stream.

In addition to said heating by heat recovery, the low sulphur oxygen containing renewable crude oil may be further heated to the desired temperature at the inlet of reaction zone 1. Said heating may according to an embodiment of the present invention be performed in a fired heater e.g. fuelled by e.g. natural gas, LPG, oil, or other suitable fuel. Preferably said further heater is at least partly fuelled by one or more byproducts produced by the process according to the present invention such as a combustible gas and/or oil such as a high boiling fraction of the oil. By at least partly fuelling said fired heater by a by product produced by the process the parasitic energy loss is reduced and the overall energy efficiency increased. Hereby a process that uses less consumables, is more economical, and has a smaller environmental and/or a lower carbon footprint is obtained.

The low sulphur oxygen containing renewable crude oil heated to the desired temperature at the inlet of reaction zone 1, enters reaction zone 1 where it is contacted with at least one heterogeneous catalyst. Said reaction zone 1 may be divided into one or more reactors, each containing one or more catalyst(-s). A preferred embodiment of the process according to the invention is where both the catalyst(-s) in the first reaction zone and in the second reaction zone is on a non-sulphided form.

Preferred non-sulphided forms of the heterogeneous catalyst(-s) according to many aspects of the present invention include heterogenous catalyst(-s) on a reduced form and/or in a carbide form and/or in a carbonate and/or in a nitride form and/or in a phosphide form and/or in a phosphate and/or in a boride form and/or in a borate form and/or in a oxide form and/or in a hydroxide form and/or in a sulphate form or a combination thereof.

A preferred embodiment of the invention is where the heterogeneous catalyst in the first reaction zone and/or second reaction zone comprises one or more elements selected from the group of Fe, Ni, Co, Mo, Cr, W, Ce, Ru, Rh, Pd, Pt, V, Cu, Au, Zr, Ti, B, Bi, Nb, Na, K supported on a supporting structure.

A further preferred embodiment of the invention is where the heterogeneous catalyst(-s) in the first reaction zone and/or second reaction zone according to the present invention is/are a bi-metallic or tri-metallic catalyst supported on a supporting structure.

An advantageous embodiment of the invention is where the bi-metallic or tri-metallic heterogeneous catalyst(-s) and/or catalyst elements in the first reaction zone and/or second reaction zone comprises a. one or two metals selected from group VIIIB of the periodic table such as one or two metals selected from the group of Fe, Co, Ni, Ru supported on a supporting structure, and b. one or more elements selected from group VIB of the periodic table such as one or two metals selected from the group of Cr, Mo, W c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

In a preferred embodiment according to the present invention the heterogeneous catalyst in the first reaction zone may further comprise one or more elements selected from Ce, Ti, Zr, B, Bi, Cu, Na, K, Mg.

It is generally preferred that acidity of said supporting structure is low to moderate in order to minimize undesired reactions such coke formation and/or polymerization reactions. In some applications of the present invention the number of acidic sites on the catalyst support may be reduced by reacting the acidic sites with a suitable base such as sodium hydroxide or potassium hydroxide prior to drying.

Advantageous embodiments of the present invention include supporting structures comprising Ce. It has been found that the presence of ceria in the supporting structure contribute to the reduction of coke formation on the catalysts surface and increase the thermal resistance of the supporting structure, and enables higher loadings and dispersion of active metals.

Particularly preferred support for used in said first reaction zone according to the present invention include alumina such as γ-alumina or δ-alumina, silica, stabilized alumina, silicate and alumosilicate such as MCM-41, silicoaluminophosphates (SAPO), aerogirine, ceria, zirconia, titania, activated carbon and hydrotalcite supports and combinations thereof.

Further, some of the compounds of the low sulphur oxygen containing renewable crude oil comprises relative large molecules so as in the range up to 50-100 nm. Such molecules are too big to penetrate the smallest pores of some high surface area catalyst supports commercially available, and may lead to deactivation of the catalyst due to pore plugging. In addition too many small pores leads to too much gas production from lighter compounds and therefore reduces the yield of desired products.

Hence, according to an embodiment of the present invention the support structure for the heterogeneous catalyst has few micropores with pore size less than 20 Angstrom, a large amount of mesopores in the range 20 to 500 Angstrom and some macro pores with a pore size larger than 500 Angstrom.

A preferred embodiment of the present invention comprises a support structure for the heterogeneous catalyst having an average pore size as measured by Hg porosimetry and/or $N_2$ adsorption at 77 K in the range from about 20 to about 10000 Angstrom such as in the range from about 30 to about 1000 Angstrom, preferably said average pore size of the support structure of heterogeneous catalyst in the first reaction zone is in the range from about 30 to about 500 Angstrom such as in the range from about 50 to about 500 Angstrom.

A further preferred embodiment of the present invention comprises a support structure for the heterogeneous catalyst having a BET surface as measured by $N_2$ adsorption at 77K in the range 20 to about 500 $m^2/g$ such as in the range 20 to 250 $m^2/g$, preferably the support has a surface area (BET) in the range in the range 30 to 150 $m^2/g$ such as in the range 40 to 120 $m^2/g$, even more preferably the support have a surface area (BET) in the range 60 to 120 $m^2/g$ such as in the range 60 to 100 $m^2/g$.

The pore density of the support structure for the heterogeneous catalyst in as measured by $N_2$ adsorption at 77K is typically in the range 0.3 to 0.9 cc/g such as in the range 0.4 to 0.85 cc/g, preferably the pore density is in the range 0.4 to 0.65 cc/g such as in the range 0.45 to 0.6 cc/g.

The heterogeneous catalyst(-s) in the first and the second reaction zone may according to many aspects of the invention comprise substantially the same heterogeneous catalyst(-s) operating a different operating conditions (e.g. different temperature and/or pressure). However, in many aspects of invention the heterogeneous catalysts in the first and second reaction zone comprise different heterogeneous catalysts.

The temperature, pressure, catalyst and liquid hourly space velocity of the first reaction zone is often selected so as to substantially reduce the oxygen content of the low sulphur oxygen containing renewable oil, while reducing other parameters such as the amount of residue (e.g. compounds having a boiling point above 550° C., the boiling point curve and/or the total acid number (TAN) and/or the viscosity and/or the density and/or the amount of unsaturated compounds such as olefins and/or the amount of aromatics, while avoiding turning too much of the lower boiling compounds into an undesired gas products that reduces the yield of desired liquid hydrocarbon products such as upgraded hydrocarbons having a boiling point in the jet fuel and diesel range.

The operating pressure in the first reaction zone may be at least 20 bar such as an operating pressure in the first reaction zone of at least 50 bar; Preferably the operating pressure in the first reaction zone is at least 60 bar such as an operating pressure in the first reaction zone of at least 80 bar; Advantageously the operating pressure of the first reaction zone is at least 100 bar such as an operating pressure of at least 110 bar.

Further according to a preferred embodiment of the invention the operating pressure in the first reaction zone may be below 200 bar such as an operating pressure in the first reaction zone below 180 bar; Preferably the operating pressure of the first and/or second reaction zone is below 150 bar such as below 120 bar.

Depending on the specific configuration of the step of providing the low sulphur oxygen containing renewable oil, such oil may comprise more or less reactive species such as aldehydes and/or ketones and/or other oxygenates and/or unsaturated and/or aromatic compounds and/or ash compounds or metals including K, Na, Ca, Mg, P, Si, Fe, Ni, Co, Cr, Al. Such reactive species may react such as by polymerization and/or by coking and/or inorganic elements may foul heat exchangers and/or poison and/or plug the pores the catalyst in the downstream reactors, and shorten the lifespan and reduce the cost effectiveness of catalysts. Hence, in certain preferred embodiments of the present invention, it is desirable to remove and/or reduce such reactive species and inorganic elements prior to the further subsequent catalytic reactors.

Hence, an advantageous embodiment of the present invention is where the first reaction zone comprises a stabilization zone for reducing and/or eliminating the amount of reactive species such as aldehydes and/or ketones and/or other oxygenates and/or unsaturated compounds and/or aromatic compounds and/or inorganic elements such as metal compounds thereby reducing polymerization and/or coking and/or fouling during heat up and thereby protecting down stream catalysts from clogging and poisoning. Thereby the down time is reduced, and catalyst lifetime extended, and hence a more effective and economical process is provided.

In many aspects of the invention the stabilization zone may be the first part of the first reaction zone. The stabilization zone may be the entrance zone in a first reactor in the first reaction zone, but may according to a preferred embodiment the present invention also comprise a separate reactor and/or comprise all of first reaction zone.

The temperature at the inlet of the first reaction zone is depending on the specific catalyst(-s) and hydrogen pressure used in the first reaction zone. The lower limit of the inlet temperature to the first reaction zone is generally selected for the desired reactions to proceed with a reasonable rate without depleting the hydrogen on the surface, which may lead to coking, whereas the upper limit is selected so as to avoid excessive coking.

The upper limit of the inlet temperature to said first reactor of reaction zone 1 is typically selected to avoid excessive coking. Hence in many embodiments the inlet temperature to the first reaction zone is below 410° C. such as below 400° C., preferably below 390° C. such as below 380° C. Even more preferably the inlet temperature to the first reaction zone is below 370° C. such as below 360° C. Advantageously the inlet temperature to the first reaction zone may below 350° C. such as below 340° C. Further according to other preferred embodiments the inlet temperature to the first reaction zone is below 320° C. such as below 300° C.

The lower limit for the inlet temperature to said first reactor of reaction zone 1 may according to the invention be above 180° C. such as an inlet temperature to the first reaction zone 1 of at least 220° C.; preferably the inlet temperature to the first reaction zone is at least 250° C. such as an inlet temperature to the first reaction zone in the range 250 to 320° C.

The heterogeneous catalyst for said stabilization zone in the first reaction zone is often selected to have an open pore structure e.g. a high pore volume with many pores in the macro and mesoporous size range to ensure accessibility of the oil composition along with a large metal and metalloid storage capacity.

The hydrogenation reactions occurring during said upgrading are highly exothermic i.e. heat is generated by said reactions. Hence, the outlet temperature from the reactors is higher than the inlet temperature, and at least part of the heat for heating of the low sulphur renewable oil to the desired reaction temperatures in reaction zone 1 is generated by the reactions in the stabilization reactor.

Often the low sulphur oxygen containing renewable crude oil in the first reaction zone often is very reactive due to the relatively high oxygen content. Too high activity of heterogeneous catalyst in the first reaction zone is typically also not desired as the surface of the catalyst may be depleted and may lead to deposits. Further too high activity of the heterogeneous catalyst in the first reactive zone may lead to deactivation of the catalyst/loss of surface area due to generation of hot spots from the exothermic reaction occurring during said upgrading process in the first reaction zone.

Hence, according to aspects of the present invention the activity of the heterogeneous catalysts in the first reaction zone are selected so as to have a relatively low activity initially in the stabilization zone and gradually be increased through the first reaction zone. Hereby, the control of reaction rate and temperature profile is improved and hot spots are avoided.

Hence, the catalyst in the stabilization zone is often selected to be less active than in the subsequent catalytic reactor so as to obtain a controlled pre-reaction and temperature profiles.

In a preferred embodiment the heterogeneous catalyst the stabilization zone of first reaction zone is a spent catalyst from the more active catalysts in the subsequent reactors in the first and/or second reaction zone.

In another preferred embodiment a lower activity may be obtained by diluting the catalyst with an inert material such as carborundum.

The average reactor temperature in the first reactor of reaction zone 1 is according to the invention typically below 410° C. such as below 390° C., preferably below 380° C. such as below 370° C. Even more preferably the average temperature to the first reactor in reaction zone 1 is below 360° C. such as below 350° C. Advantageously the inlet temperature to the first reaction zone may below 340° C. such as below 330° C. Further according to other preferred embodiments the inlet temperature to the first reaction zone is below 320° C. such as below 300° C. in the stabilization zone.

The liquid space velocity in said stabilization zone is according to many aspects of the invention in the range 0.5 to 3 hours$^{-1}$ such as 0.5 to 2.5 hours$^{-1}$. Preferably the liquid space velocity in the stabilization zone is in the range from about 0.7 to 2 hours$^{-1}$.

Typically the oxygen content of the low sulphur oxygen containing renewable crude oil is reduced by 20 to 60% such as 25 to 50% during the passage of said stabilization zone.

Further in preferred embodiments of the present invention the aromatic content of the low sulphur oxygen containing renewable crude oil is reduced during the passage of the stabilization zone of the first reaction zone. According to many aspects of the invention the aromatic content is reduced by 20 to 75% during the passage of said stabilization zone of the first reaction zone such as a reduction of the aromatic content of 30 to 60% during the passage of the first reaction zone.

In an advantageous embodiment of the invention, the first reaction zone comprises two or more reactors. Hence, according to such advantageous embodiments of the invention, the effluent from the stabilization zone or the stabilization reactor of the first reaction zone enters into a second reactor of the first reaction zone typically having a higher average reactor temperature and more active catalyst than used in the stabilization zone. Further, in such embodiments a first reactor in the first reaction zone may be a graded bed comprising heterogeneous catalysis with increasing activity.

The effluent from the stabilization zone of the first reaction zone may according to preferred embodiments of the invention be fed to the second reactor of the first reaction zone at the substantially the same temperature as the outlet temperature from the stabilization zone or may be further heated prior to entering the second reactor of the first reaction zone. Advantageously the inlet temperature to the second reactor is selected so as to obtain a desired average temperature in the second reactor of the first reaction zone.

The inlet temperature to the second reactor of the first reaction zone is according a preferred embodiment of the present invention of the inlet temperature below 380° C. such as below 370° C., preferably below 360° C. such as below 350° C. Even more preferably the inlet temperature to the first reaction zone is below 340° C. such as below 330° C. Advantageously the inlet temperature to the first reaction zone may below 320° C. such as below 300° C. Further according to other advantageous embodiments the inlet temperature to the first reaction zone is in the range from about 280° C. to about 320° C.

In many aspects of the present invention the pre-reacted low sulphur renewable oil from the stabilization zone of the first reaction zone is not fully mixable with the partially upgraded oil from reaction zone 2, and conventional temperature control by for example cooling and recycling of the partially upgraded oil from the first reaction zone to the inlet of the second reactor of the first reaction zone is in such embodiments not possible. Hence, in an advantageous embodiment of the invention the second reactor subsequent the stabilization zone may divided in multiple reactors such as two or more with intercooling of the oil in between so as to control the maximum temperature in the individual reactors.

In an advantageous embodiment the average temperature in the subsequent reactors of the first reaction zone is controlled to be in the range 320 to about 410° C. such as an average temperature in the range 330 to 400° C. Preferably the average temperature in the subsequent reactors in the first reaction zone is in the range 340 to about 390° C. such as an average temperature in the range 350 to 380° C.

In advantageous embodiment the liquid hourly space velocity (LHSV) in the individual subsequent reactors of the first reaction zone is selected so as to obtain a specific conversion and temperature increase in the individual subsequent reactors in the first reaction zone. In an advantageous embodiment according to the invention the liquid hourly space velocity in the subsequent reactors in the first reaction zone is in the range 0.05 to 5 hours$^{-1}$ such as a liquid hourly space velocity in the individual subsequent reactors in the first reaction zone is in the range 0.1 to 3 hours$^{-1}$. Preferably the liquid hourly space velocity in the individual subsequent reactors in the first reaction zone is in the range 0.2 to 2 hours$^{-1}$ such as in the range 0.5 to 1.5 hours$^{-1}$.

The weight based space velocity (WHSV) in the first reaction zone is according to a preferred embodiment in the range 0.05 to 5 hours$^{-1}$ such as in the range 0.1 to 3.0 hours$^{-1}$, preferably the weight based hourly space velocity (WHSV) is in the range 0.2 to 2 hours$^{-1}$ such as in the range 0.5 to 1.5 hours$^{-1}$.

The average reactor temperature in the first reactor of reaction zone 1 is according to the invention typically below 410° C. such as below 400° C., preferably below 390° C. such as below 380° C. Even more preferably the average temperature to the first reactor in reaction zone 1 is below 370° C. such as below 360° C. Advantageously the inlet temperature to the first reaction zone may below 350° C. such as below 340° C. Further according to other preferred embodiments the inlet temperature to the first reaction zone is below 320° C. such as below 300° C.

The partially upgraded oil produced from said first reaction zone contains lower oxygen than the crude low sulphur oxygen containing renewable crude oil e.g. an oxygen content below 4.0 wt % after said first reaction zone such as an oxygen content below 3.0 wt %. Often the oxygen content of the partially upgraded oil after said first reaction zone is below 2.5 wt % such as below 2.0 wt %. In certain applications, the oxygen content of the partially upgraded oil after said first reaction zone is below 2.0 wt % such as below 1.5 wt %. In some advantageous embodiments, the oxygen content of the partially upgraded oil after the first reaction zone is below 1.0 wt % such as below 0.5 wt %.

The partially upgraded oil produced from said first reaction zone contains lower sulphur than the crude low sulphur oxygen containing renewable crude oil e.g. a sulphur content below 0.5 wt % after said first reaction zone such as a sulphur content below 0.25 wt %. Often the sulphur content of the partially upgraded oil after said first reaction zone is below 0.1 wt % such as below 0.05 wt %. In some advantageous embodiments, the sulphur content of the partially upgraded oil after the first reaction zone is below 0.025 wt % such as below 0.01 wt %.

The partially upgraded oil produced from said first reaction zone has lower TAN than the crude low sulphur oxygen containing renewable crude oil e.g. a TAN below 20 mg KOH/g oil after said first reaction zone such as a TAN below 10 mg KOH/g oil. Often the TAN of the partially upgraded oil after said first reaction zone is below 5 mg KOH/g oil such as below 2.5 mg KOH/g oil. In some advantageous embodiments, the TAN of the partially upgraded oil after the first reaction zone is below 1 mg KOH/g oil such as 0.1 mg KOH/g oil.

The partially upgraded oil produced from said first reaction zone has lower dynamic viscosity than the crude low sulphur oxygen containing renewable crude oil e.g. a dynamic viscosity (at 40° C.) below 1000 cP after said first reaction zone such as a dynamic viscosity (at 40° C.) below 100 cP. In some advantageous embodiments, the dynamic viscosity (at 40° C.) of the partially upgraded oil after the first reaction zone is below 50 cP.

The partially upgraded oil produced from said first reaction zone has lower density than the crude low sulphur oxygen containing renewable crude oil e.g. a density (at 15° C.) below 1050 kg/m$^3$ after said first reaction zone such as a density (at 15° C.) below 1000 kg/m$^3$. In some advantageous embodiments the density (at 15° C.) of the partially upgraded oil after the first reaction zone is in the range 0.80 to 1000 kg/m$^3$ such as in the range 0.90 to 0.95 kg/m$^3$.

The partially upgraded oil produced from said first reaction zone has higher energy content than the crude low sulphur oxygen containing renewable crude oil e.g. a High Heating Value (HHV) on a dry ash free basis above 38 MJ/kg after said first reaction zone such as an HHV above 40 MJ/kg. In some advantageous embodiments, the HHV of the partially upgraded oil on a dry ash free basis after the first reaction zone is above 41 MJ/kg such as above 42 MJ/kg. In some advantageous embodiments, the HHV of the partially upgraded oil after the first reaction zone is above 44 MJ/kg such as above 46 MJ/kg.

The partially upgraded oil produced from said first reaction zone has higher hydrogen to carbon ratio (H/C) than the crude low sulphur oxygen containing renewable crude oil e.g. a H/C above 1.3 after said first reaction zone such as an H/C above 1.4. In some advantageous embodiments, the H/C of the partially upgraded oil after the first reaction zone is above 1.45 such as above 1.5. In certain advantageous embodiments, the H/C of the partially upgraded oil after the first reaction zone is above 1.65 such as above 1.7.

In many aspects of the invention, the catalyst(-s) and process conditions in the second reaction zone is selected so as to perform hydrogenation reactions such as de-aromatization by saturation of aromatics and/or saturation of double bonds of the partially upgraded low sulphur oxygen containing renewable crude oil from the first reaction zone. Hereby the density of the low sulphur renewable oil is also significantly reduced.

The catalyst(-s) in the second reaction zone may comprise one or more heterogeneous catalyst(-s) and may in many applications of the invention be substantially the same as used in said first reaction zone, but operating at a lower temperature to obtain a favourable equilibrium for de-aromatization.

Hence, a preferred embodiment of the invention is where the inlet temperature to the second reaction zone is selected to be lower than in the first reaction zone and the product effluent from the first reaction zone is cooled in a heat exchanger before entering the second reaction zone. Advantageously the temperature of the partly upgraded renewable oil at the inlet to the second reaction zone is controlled to be in the range 250-350° C., such as a temperature of the partly upgrade in the range 250-320° C. such as in the range 250-300° C.

Advantageous embodiments include further adding and mixing hydrogen with the low sulphur oxygen containing renewable oil between the first reaction zone and the second reaction zone.

The liquid hourly space velocity in said second reaction zone may according to an embodiment of the present invention be in the range 0.05 to 5 hours$^{-1}$ such as in the range 0.2 to 3.0 hours$^{-1}$, preferably the liquid hourly space velocity in said second reaction zone is in the range 0.5 to 2.0 hours$^{-1}$ such as in the range 0.5 to 1.5 hours$^{-1}$.

The weight based space velocity may according to an embodiment of the present invention be in the range in the range 0.05 to 5 hours$^{-1}$ such as in the range 0.2 to 3.0 hours$^{-1}$, preferably the liquid hourly space velocity in said second reaction zone is in the range 0.5 to 2.0 hours$^{-1}$ such as in the range 0.5 to 1.5 hours$^{-1}$.

The effluent from the first reaction zone comprises a partially upgraded oil as well gas and water. According to a preferred embodiment of the invention the partially upgraded oil is separated from the gas and water prior to entering the second reaction zone.

An advantageous embodiment of the present invention is where steam is injected into the partially upgraded renewable oil after it is separated from the gas and water and prior to entering the second reaction zone, and where the second reaction zone comprises a reactor containing a heterogeneous catalyst comprises a water splitting functionality for performing a catalytic steam conversion and/or catalytic steam cracking of said partly upgraded low sulphur renewable oil. The catalytic steam conversion and/or catalytic steam cracking use steam as source of hydrogen, and generates excess hydrogen which may be recovered, compressed and recycled to the first reaction zone after separation from the upgraded low sulphur renewable oil. Without wishing to be bound to a specific theory it is believed that said catalytic steam conversion and/or catalytic steam cracking is due to oxygen deficiencies and/or vacancies at the surface of the heterogeneous catalyst(-s). The partly upgraded low sulphur oxygen containing renewable oil may be adsorbed to the surface of the heterogeneous catalyst and may react with oxygen on the surface of the heterogeneous catalyst thereby forming $CO_2$ and an oxygen vacancy. Water may be adsorbed and dissociated to/at the oxygen vacancy at the surface of the heterogeneous catalyst thereby renewing the oxygen on the surface, while producing hydrogen. Depending on the specific catalyst and operating conditions the hydrogen may further react with the low sulphur oxygen containing renewable oil or may be recovered from said gas phase after separation and introduced for the reactions in the first reaction zone, thereby reducing the amount of external hydrogen required for the process and thereby resulting in a more efficient and economic process with a lower carbon footprint than the prior art.

The amount of water or steam added or mixed with the low sulphur oxygen containing renewable oil is often in the range 5.0 to 35% by weight of the low sulphur oxygen containing renewable oil such as in the range 5.0 to 30% by weight of the low sulphur oxygen containing renewable oil, preferably the amount of water or steam added or mixed with the low sulphur oxygen containing renewable oil is in the range 5.0 to 25% by weight of the low sulphur oxygen containing renewable oil such as in the range 5.0 to 20% by weight of the low sulphur oxygen containing renewable oil. Even more preferably the amount of water or steam added or mixed with the low sulphur oxygen containing renewable oil is in the range 5.0 to 15% by weight of the low sulphur oxygen containing renewable oil such as in the range 5.0 to 10% by weight of the low sulphur oxygen containing renewable oil.

The heterogeneous catalyst for performing a catalytic steam conversion and/or catalytic steam cracking of said partly upgraded low sulphur renewable oil in the second reaction zone is according to a particularly preferred embodiment of the present invention a bimetallic or trimetallic catalyst supported on a supporting structure, and where said catalyst and/or catalyst elements comprises
  a. One or two transition metals selected from the group VIIIB of the periodic table of elements such as one or two metals selected from Fe, Co, Ni, Ru, Rh, Pd, Os, Ir, Pt.
  b. One or more catalyst(-s) or catalyst(-s) selected from the group VIB of the periodic table of elements such as an element selected from Cr, Mo, W
  c. A supporting structure for said catalyst(-s) or catalyst elements selected from the group of consisting of alumina such as γ-alumina or δ-alumina, Si-stabilized γ-alumina, silica, silicate and alumosilicate such as MCM-41, silicoaluminophosphates (SAPO), aerogirine, kaolin, silica gel, zirconia, titania, ceria, hydrotalcite, scandium, yttrium, ytterbium, carbon such as activated carbon or pet coke, red mud, zeolites or a combination thereof.

A further preferred embodiment of the heterogeneous catalyst for performing a catalytic steam conversion and/or catalytic steam cracking in the second reaction zone according to the present invention, is where said heterogeneous catalyst in the second reaction zone comprises or further comprises one or more elements selected from the group of Ce, Ti; Zr, B, Ga, Cu, B, Bi, Na, K, Mg.

According to many embodiments of the present invention said one or more elements or further elements may be present in a concentration from about to about such a concentration of said element in the range 1.0 wt % to about 25.0 wt % such as a concentration of said further catalyst element(s) is in the range from about 2.0 wt % to about 25.0 wt %. Preferably, said element or further element(-s) is present in the range from about 5 wt % to about 20 wt % such as in the range from about 10 wt % to about 20 wt %.

In other embodiments according to the present invention, the concentration of said one or more elements or further element(-s) may be in the range from about 0.5 wt % to about 10 wt % such as in the range from about 1.0 to about 7.0 wt %. Preferably, said further element(-s) is in the range from about 1.5 wt % to about 5 wt %.

Advantageously said supporting oxide or hydroxide structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mo and/or Mn and/or Cr and/or Al and/or Fe and/or Ce or a combination thereof. A particularly preferred embodiment according to the present invention is where said heterogeneous catalyst and/or supporting structure has the empirical formula $M(II)_6M(III)_2(OH)_{16}.CO_3.4H_2O$, where
  M(II) is a divalent metal ion comprising one or two elements selected from the group of Mg, Ca, Ni, Co, Cu, Mn, Zn, Fe and
  M(III) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16}.CO_3.4H_2O$, where x: 1.0-2.0, y: 4.0-5.0, z: 0.0-1.0, w: 0.0-1.0, q: 1.0-2.0 such as $Mg_{4.3}$ Ni 1.70 $CeAl(OH)_{16}.CO_3.4H_2O$.

A further preferred embodiment according to the invention is where the heterogeneous catalyst of the supporting structure comprises $Mg_{4.3}$ $Ni_{1.70}$ $CeAl(OH)_{16}.CO_3.4H_2O$.

According to a preferred embodiment said bimetallic or trimetallic catalyst is preferably on a nonsulphide form such as on a carbide, phosphide, phosphate form, nitride, boride form, oxide form, hydroxide form and/or carbonate form or a combination of these.

The temperature at the inlet to the second reaction zone for performing a catalytic steam conversion and/or catalytic steam cracking according to the invention is in many applications of the present invention in the range 300° C. to 410° C., such as in the range 320° C. to 410° C.; preferably the temperature at the inlet of said further catalytic reactor is in the range 350° C. to 400° C., such as in the range 360° C. to 390° C.

The operating pressure in the second reaction zone may be at least 20 bar such as an operating pressure in the second reaction zone of at least 50 bar; Preferably the operating pressure in the second reaction zone is at least 60 bar such as an operating pressure in the second reaction zone of at least 80 bar; Advantageously the operating pressure of the second reaction zone is at least 100 bar such as an operating pressure of at least 110 bar.

Further according to a preferred embodiment of the invention the operating pressure in the second reaction zone may be below 200 bar such as an operating pressure in the second reaction zone below 180 bar; Preferably the operating pressure of the second reaction zone is below 150 bar such as below 120 bar.

The liquid hourly space velocity in said further catalytic reactor upstream the first reaction zone is typically in the range 0.1 to 5 hours$^{-1}$ such as in the range 0.2 to 3.0 hours$^{-1}$, preferably the liquid hourly space velocity in said further catalytic reactor upstream the first reaction zone is in the range 0.2 to 2.0 hours such as in the range 0.5 to 1.5 hours$^{-1}$.

The amount of hydrogen consumed by the upgrading process may correspond to 0.01 to 10.0 wt % of the low sulphur renewable oil such as 0.05 to 8.0 wt %, preferably the amount of hydrogen consumed by the upgrading process corresponds to 0.5 to 5.0 wt % of the low sulphur renewable oil such as 1.0 to 4.5 wt %. Even more preferably the amount of hydrogen consumed by the upgrading process corresponds to 2.0 to 4.0 wt % of the low sulphur renewable oil such as 2.5 to 3.5 wt %.

The hydrogen is in many embodiments added in excess of the stoichiometric amount of hydrogen required for the upgrading process. Hence, the amount of hydrogen added and mixed with the low sulphur oxygen containing renewable oil is often up to 10 times higher than the amount of hydrogen consumed by the upgrading process such as up to 5 times higher than the amount of hydrogen consumed by the upgrading process, preferably the amount of hydrogen added and mixed with the low sulphur oxygen containing renewable oil is the range 1.5 to 5 times higher than the amount of hydrogen consumed by the upgrading process such as in the range 2 to 5 higher than the amount of hydrogen consumed by the upgrading process.

The heterogeneous catalyst(-s) in the first reaction and/or second reaction zone may be in any known form or shape such as in the form of tablets, cylinders, hollow cylinders extrudates, powder, beads, monolithic structure or a combination thereof.

The heterogeneous catalyst(-s) in the first reaction and/or second zone may be contained in one or more fixed beds, one or more ebullated beds, one or more slurry beds or a combination thereof.

A preferred embodiment according to the present invention comprises one or more fixed beds, where each of the reactors is fed from the top.

Figure 6:
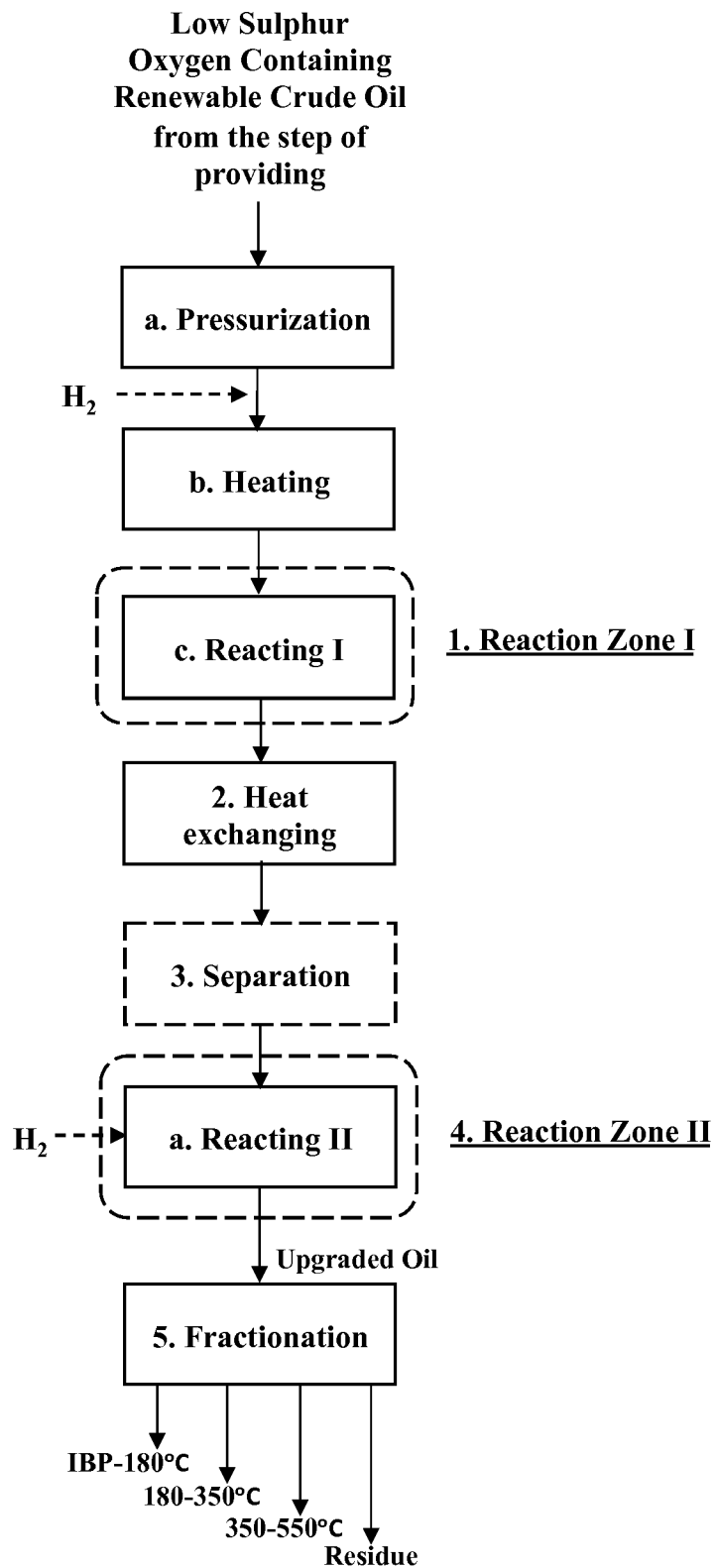
FIG. 6 shows another preferred embodiment of an upgrading process according to the present invention including a fractionation step for separating the oil into different products with different boiling points.

FIG. 6 shows a preferred embodiment of the present invention further comprising a fractionation of the upgraded oil after the second reaction zone, where the upgraded low sulphur renewable oil is being fractionated into a naphtha/jet fuel fraction with a boiling point of up to 180° C., a diesel fraction a gas oil fraction with a boiling point in the range 350-550° C. and a residue fraction with a boiling point above 550° C.

Figure 7:
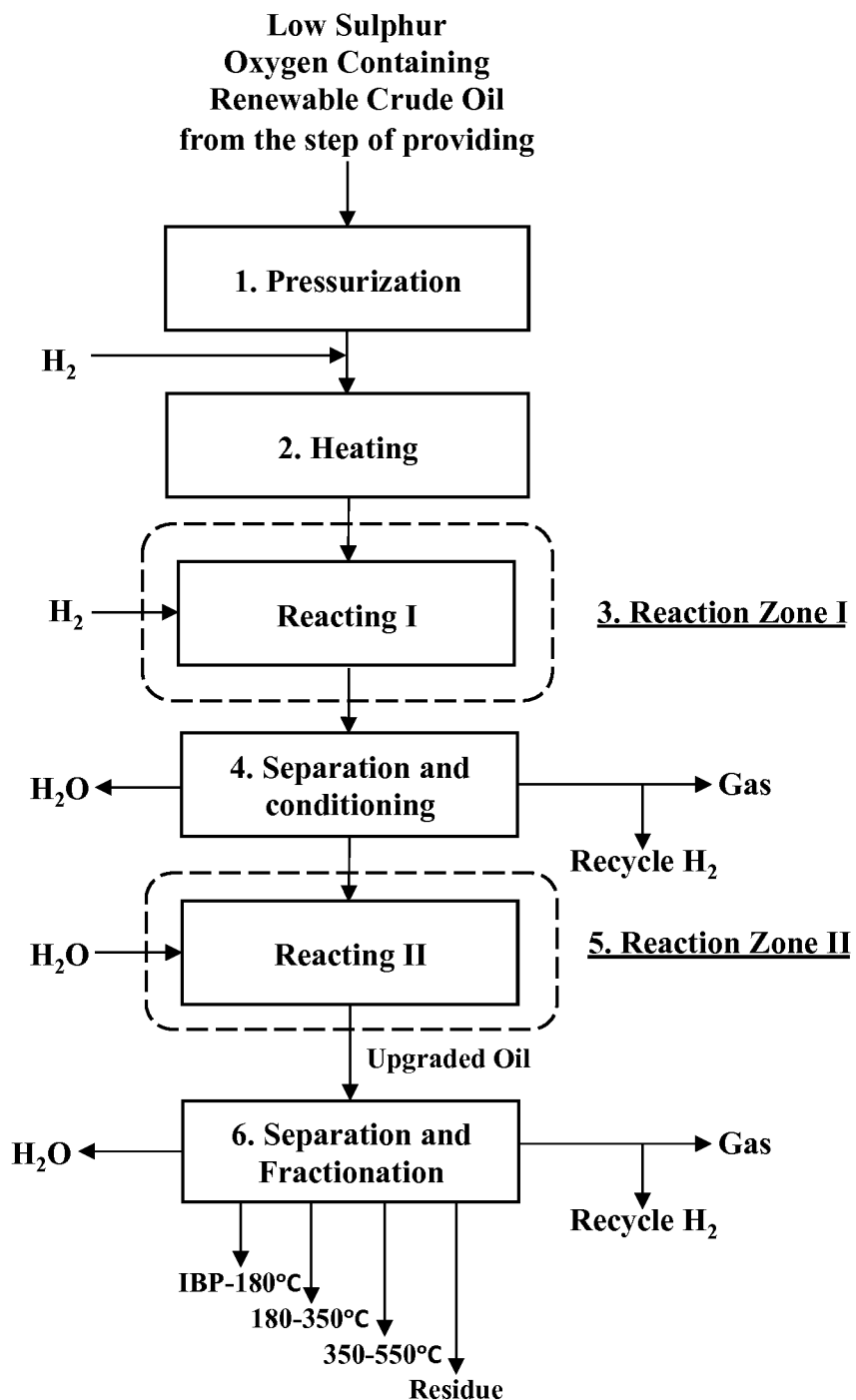
FIG. 7 shows an advantageous embodiment of the present invention where the second reactor zone comprises catalytic steam conversion.

FIG. 7 shows an advantageous embodiment of the present invention where the second reaction zone comprises a catalytic steam conversion and/or a catalytic steam cracking of the partly low sulphur oxygen containing renewable crude oil.

This advantageous embodiment of the present invention further comprises separating gas and water from the partially upgraded low sulphur oxygen renewable oil from the first reaction zone, and adding water in the form of steam to the partially upgraded low sulphur oxygen containing renewable oil prior to entering the second reaction zone.

The amount of water or steam added or mixed with the low sulphur oxygen containing renewable oil is often in the range 5.0 to 35% by weight of the low sulphur oxygen containing renewable oil such as in the range 5.0 to 30% by weight of the low sulphur oxygen containing renewable oil, preferably the amount of water or steam added or mixed with the partially upgraded low sulphur oxygen containing renewable oil is in the range 5.0 to 25% by weight of the low sulphur oxygen containing renewable oil such as in the range 5.0 to 20% by weight of the low sulphur oxygen containing renewable oil. Even more preferably the amount of water or steam added or mixed with the partially upgraded low sulphur renewable oil is in the range 5.0 to 15% by weight of the low sulphur oxygen containing renewable oil such as in the range 5.0 to 10% by weight of the low sulphur oxygen containing renewable oil.

The second reaction zone comprises a reactor comprising heterogeneous catalyst for performing a catalytic steam conversion and/or catalytic steam cracking of said low sulphur renewable oil. The heterogeneous catalyst have a water splitting capacity and uses steam as a source of hydrogen for performing a catalytic steam conversion and/or catalytic steam cracking of the low sulphur renewable oil, and generates excess hydrogen that may be recovered, recompressed and recycled to e.g. the first reaction zone after separation from low sulphur renewable oil as indicated in the figure. Without wishing to be bound to a specific theory it is believed that said catalytic steam conversion and/or catalytic steam cracking is due to oxygen deficiencies and/or vacancies at the surface of the heterogeneous catalyst(-s). The partially upgraded low sulphur oxygen containing renewable crude oil may be adsorbed to the surface of the heterogeneous catalyst and may react with oxygen on the surface of the heterogeneous catalyst thereby forming $CO_2$. Water may be adsorbed and dissociated to/at the oxygen vacancy at the surface of the heterogeneous catalyst thereby renewing the oxygen on the surface, while producing hydrogen. Depending on the specific catalyst and operating conditions the hydrogen may further react with the low sulphur oxygen containing crude oil or may be recovered from said gas phase after separation and introduced for the reactions in the first reaction zone, thereby reducing the amount of external hydrogen required for the process and thereby resulting in a more efficient and economic process with a lower carbon footprint than the prior art.

The heterogeneous catalyst in catalytic steam conversion reactor in the second reaction zone is according to a particularly preferred embodiment of the present invention a bimetallic or trimetallic catalyst supported on a supporting structure, and where said catalyst and/or catalyst elements comprises a. One or two transition metals selected from the group VIIIB of the periodic table of elements such as one or two metals selected from Fe, Co, Ni, Ru, Rh, Pd, Os, Ir, Pt.

b. One or more catalyst(-s) or catalyst(-s) selected from the group VIB of the periodic table of elements such as an element selected from Cr, Mo, W c. A supporting structure for said catalyst(-s) or catalysts elements selected from the group consisting of alumina such as γ-alumina, Si stabilized alumina, hydrotalcite, kaolin, silica, zirconia, titania, ceria, scandium, yttrium, carbon such as activated carbon or pet coke, hydrotalcites, red mud, zeolites or a combination thereof.

A further preferred embodiment according to the present invention is where said catalyst in the second reaction zone comprises or further comprises one or more elements selected from the group of Ce, Ti; Zr, B, Ga, Cu, B, Bi, Na, K, Mg.

According to many embodiments of the present invention said one or more elements or further elements may be present in a concentration from about to about such a concentration of said element in the range 1.0 wt % to about 25.0 wt % such as a concentration of said further catalyst element(s) is in the range from about 2.0 wt % to about 25.0 wt %. Preferably, said element or further element(-s) is present in the range from about 5 wt % to about 20 wt % such as in the range from about 10 wt % to about 20 wt %.

In other embodiments according to the present invention, the concentration of said one or more elements or further element(-s) may be in the range from about 0.5 wt % to about 10 wt % such as in the range from about 1.0 to about 7.0 wt %. Preferably, said further element(-s) is in the range from about 1.5 wt % to about 5 wt %.

Advantageously the supporting structure comprises Ce, Zr, Al, Sc, Yt, Yb, Mg, Ni, Fe and/or Pt or a combination thereof.

A particular advantageous supporting structure comprises a layered double hydroxide such as a hydrotalcite.

The hydrotalcite may comprise Mg and/or Ca and/or Ni and/or Co and/or Mn and/or Mo and/or Cr and/or Al and/or Fe and/or Ce or a combination thereof.

A particularly preferred embodiment according to the present invention is where said heterogeneous catalyst and/or supporting structure has the empirical formula $M(II)_6M(III)_2(OH)_{16}.CO_3.4H_2O$, where
M(I) is a divalent metal ion comprising one or two elements selected from the group of Mg, Ca, Ni, Co, Cu, Mn, Zn, Fe and
M(II) is a trivalent metal ion comprising one or two elements selected from the group of Al, Fe, Co, Ni, Cr, Bi, Mn, Ce, Ga.

Further, a preferred embodiment is where said heterogeneous catalyst and/or supporting structure has empirical formula $Mg_xNi_yFe_zCe_wAl_q(OH)_{16}.CO_3.4H_2O$, where x: 1.0-2.0, y: 4.0-5.0, z: 0.0-1.0, w: 0.0-1.0, q: 1.0-2.0 such as $Mg_{4.3}Ni_{1.70}CeAl(OH)_{16}.CO_3.4H_2O$.

According to a preferred embodiment said bimetallic or trimetallic catalyst is preferably on a nonsulphide form such as on a carbide, carbonate, phosphide, phorphate, nitride, boride, oxide and/or hydroxide and/or sulphate form or a combination of these.

The catalyst may according to the invention be in any known form including cylinder extrudates, hollow cylinder extrudates, powders, beads, monolithic structures or a combination thereof.

The catalytic steam conversion reactor may according to the invention be contained in one or more fixed beds, one or more ebulated beds and/or one or more slurry beds or a combination thereof.

The temperature at the inlet of catalytic steam conversion reactor in the second reaction zone is in many applications of the present invention in the range 300° C. to 410° C., such as in the range 320° C. to 400° C.; preferably the temperature at the inlet of said further catalytic reactor is in the range 350° C. to 390° C., such as in the range 360° C. to 380° C.

The pressure in the catalytic steam conversion reactor in the second reaction zone is typically in the range from 20 to 200 bar such as in the range from 50 to 150 bar; preferably the pressure in the catalytic steam conversion reactor is the range from 80 to 140 bar such as in the range 100 to 130 bar.

The liquid hourly space velocity in the catalytic steam conversion reactor in the second reaction zone is typically in the range 0.1 to 5 hours$^{-1}$ such as in the range 0.2 to 3.0 hours$^{-1}$, preferably the liquid hourly space velocity in said further catalytic steam conversion reactor in the second reaction zone is in the range 0.2 to 2.0 hours$^{-1}$ such as in the range 0.5 to 1.5 hours$^{-1}$.

The second reaction zone may according to a preferred embodiment optionally further comprise a dearomatization and/or saturation reactor downstream the catalytic steam conversion reactor for performing a final adjustment of the aromatic content and/or density of the oil. In this embodiment gas and water is separated from the partly upgraded low sulphur renewable crude oil from the catalytic steam conversion reactor prior to entering the dearomatization and/or saturation reactor. Typically inlet temperature to the dearomatization and saturation reactor is in the range from 250 to 350° C., such as an inlet temperature of 280 to 320° C.

The effluent from the second reaction zone is further separated and fractionated in 6. Separation and Fractionation, typically into gas fraction, a water fraction, and the upgraded oil is separated into a fraction with a boiling point below 180° C., a fraction with a boiling point in the range from 180 to about 350° C., a fraction with a boiling point in the range 350 to about 550° C., and a residue fraction as shown in the figure.

In an advantageous embodiment of the invention this is performed by first separating subjecting the effluent from the second reaction zone to a hot high pressure flash separator where gas, most lights (e.g compound with a boiling point up to 350° C.) and water is separated from the heavier fraction. Often the hot high pressure separator is operating at a temperature in the range from about 270 to 370° C. such as a temperature in the hot high pressure separator of 300 to 330° C. The pressure in the hot high pressure separator is according to many aspects of the present invention typically in the range 50 to 130 bar such as in the range 60 to 100 bar. The gas and water is separated from the lights e.g. by gravimetrical separation. The separated water may be fed to the recovery unit of the step of providing the low sulphur oxygen containing renewable crude oil, where it may be further purified to a dischargeable water quality. The gas may in many aspects of the invention be subjected to a hydrogen separation and purification step for recovery of hydrogen from said gas. The recovered hydrogen is recompressed and used to at least partly supply the hydrogen required for the upgrading in reaction zone 1 and/or reaction zone 2. The heavy fraction from the hot low pressure is further treated in a hot low pressure separator operating at a pressure of 1 to 6 bar such as 1.5 to 5 bar and a temperature of 270 to 370° C. such as a temperature in the hot high pressure separator of 300 to 330° C. The upgraded light and heavy fraction may according to a preferred embodiment of the present invention be further fractionated in a series of distillation columns to into specific boiling point fraction such as a fraction having a boiling point below 180° C., a fraction with a boiling point in the range from 180 to about 350° C., a fraction with a boiling point in the range 350 to about 550° C., and a residue fraction as shown in the figure.

Figure 8:
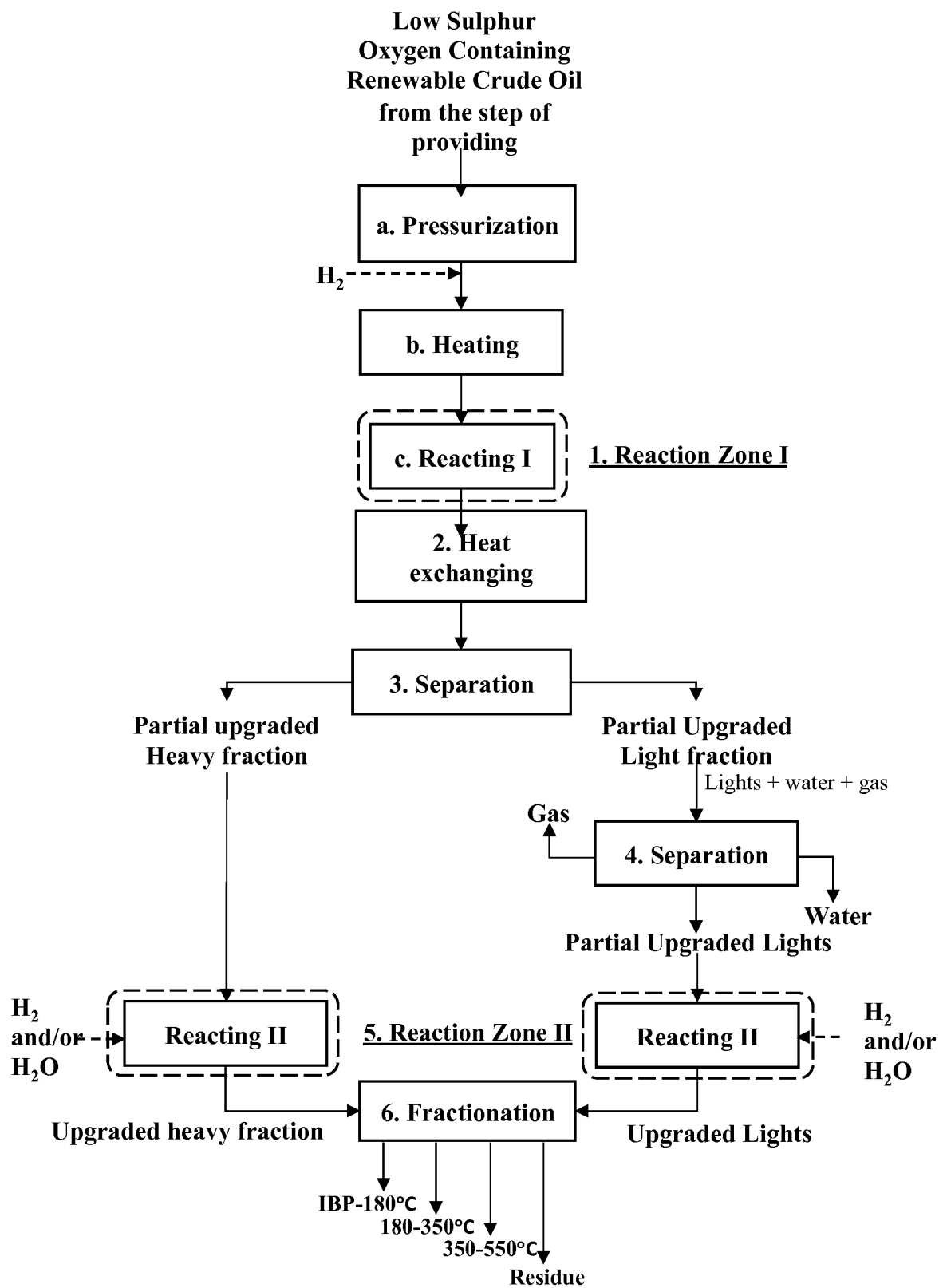
FIG. 8 shows a preferred embodiment of the present invention where the partially upgraded low sulphur renewable oil is separated into a light and heavy fraction after the first reaction zone and are further reacted separately in the second reaction zone.

FIG. 8 shows a preferred embodiment of the present invention where the partially upgraded low sulphur renewable oil from the first reaction zone is first separated into a partially upgraded heavy fraction and a fraction comprising a partially upgraded light fraction ("lights"), water and gas.

As shown in the figure, the separation may comprise two or more separation steps such as a first flash separation step separating the product from said further catalytic reactor into a partially upgraded heavy oil stream and a phase comprising partially upgraded light oil, gas and water, where the partial upgraded light oil, gas and water are separated in a second separation step such as a flash and/or gravimetric phase separator.

The cut point of said separation may according to certain preferred embodiments be selected so as to produce a partial upgraded light oil fraction having a boiling point of up to 280° C. such as a boiling point up to 300° C. Preferably, said partial upgraded light fraction has a boiling point of up to 320° C. such as up to 350° C. A preferred embodiment of the present invention include where the separation comprises one or more flash separation step(-s).

Advantageously at least the partial upgraded light fraction is further treated in the second reaction zone according to the present invention. In another advantageous embodiment said partial upgraded heavy fraction is also further treated in the second reaction zone, but often in one or more separate reactors and often at different operating conditions and/or using a different heterogeneous catalyst than for said lighter fraction. Hereby it is obtained that the light fraction are not getting too light at the more severe conditions typically selected for conversion of the heavy fraction e.g. that the lights is converted all the way to gas, and the overall yield of e.g. compounds having a boiling point e.g. in the range 180 to about 350° C. is maximized. Hereby a more efficient, economical and environmentally sustainable process is provided.

The partially upgraded heavy oil fraction or residual oil fraction from said separation may alternatively be recycled to the step of providing said low sulphur oxygen containing renewable crude oil. Hence, a preferred embodiment according to the present invention comprises recycling the heavy oil fraction or residual oil fraction from said separation to the pre-treatment step in FIG. 3. In another preferred embodiment the heavy oil fraction from said separation is mixed with the low sulphur oxygen containing renewable oil before pressurization.

Hydrogen may according to an advantageous embodiment of the present invention be extracted from said gas and used to supply hydrogen to the upgrading process as further shown in FIG. 3.

The upgraded fractions may further undergo a fractionation such as fractionation into a fraction with a boiling point below 180° C., a fraction with a boiling point in the range from 180 to about 350° C., a fraction with a boiling point in the range 350 to about 550° C., and a residue fraction as indicated in FIG. 8.

EXAMPLES

Example 1: Providing Low Sulphur Oxygen Containing Renewable Crude Oil According to a Preferred Embodiment of the Present Invention A low sulphur oxygen containing renewable crude oil was produced from a 50/50 mixture on a dry weight basis of fresh spruce and fresh pine using the pilot plant in FIG. 2. The analysis of the wood chips as received is shown in Table 1 below.

TABLE 1

Composition of carbonaceous material on a dry ash free basis.

| ELEMENT | SPRUCE wt %, dry | PINE wt %, dry | 50/50 MIXTURE |
|---|---|---|---|
| C, wt % | 50.4 | 50.2 | 50.3 |
| H, wt % | 6.1 | 6.2 | 6.15 |
| O, wt % | 43.1 | 43.4 | 43.25 |
| S, wt % | 0 | 0 | 0 |
| N, wt % | 0.2 | 0.1 | 0.15 |
| Cl, wt % | 0.008 | 0.007 | 0.0074 |
| HHV, MJ/kg | 20.2 | 20.1 | 20.15 |

Feed Preparation

The wood chips were sized reduced to wood flour in a Hammermill system and mixed with recycled water (inclusive dissolved salts and water-soluble organics), recycled oil, catalysts to produce a homogeneous and pumpable feed mixture. Potassium carbonate was used as catalyst and sodium hydroxide was used for pH adjustment. It was attempted to keep the potassium concentration constant during the runs i.e. the potassium concentration in the water phase was measured and the required make-up catalyst concentration was determined on this basis. Sodium hydroxide was added in amounts sufficient to maintain the outlet pH of the separated water phase in the range 8.0-8.5. Further CMC (Carboxy Methyl Cellulose, $M_w$=30000) in a concentration of 0.8 wt % was added to the feed slurry as a texturing agent to avoid sedimentation in the feed barrel and improve pumpability.

As neither water nor oil phases was available for the first cycle (batch), crude tall oil was used as start-up oil and 5.0 wt % ethanol and pure water (Reversed Osmosis water, RO water) was used to emulate the water phase in the first cycle. Multiple cycles (batches) are required before the process can be considered in steady state and representative for oil and water phases are produced. The number of cycles required to produce oil with less than 10% concentration of the start-up oil is shown in Table 2. The numbers are valid for a feed composed of 20% dry wood by weight, an Oil Yield of dry ash free oil of 45.3% by weight, and an oil/wood ratio of 1 for the first three cycles and 0.8 for the subsequent cycles:

TABLE 2

Estimation of number of cycles needed for producing oil with more than 90 wt % wood derived from the produced oil.

| CYCLE No. | BIOMASS kg | RECIRCULATED OIL kg Total | RECIRCULATED OIL kg Crude Tall Oil | PRODUCED BIO OIL kg | CRUDE TALL OIL IN OIL PRODUCT % |
|---|---|---|---|---|---|
| 1 | 20 | 20 | 20 | 9.1 | $\frac{20}{29.1} \times 100 = 68.7\%$ |
| 2 | 20 | 20 | 20 × 68.7% = 13.7 | 9.1 | $\frac{13.7}{29.1} \times 100 = 47.2\%$ |

TABLE 2-continued

Estimation of number of cycles needed for producing oil with more than 90 wt % wood derived from the produced oil.

| CYCLE No. | BIOMASS kg | RECIRCULATED OIL kg Total | RECIRCULATED OIL kg Crude Tall Oil | PRODUCED BIO OIL kg | CRUDE TALL OIL IN OIL PRODUCT % |
|---|---|---|---|---|---|
| 3 | 20 | 20 | 20 × 47.2% = 9.4 | 9.1 | $\frac{9.4}{29.1} \times 100 = 36.5\%$ |
| 4 | 20 | 16.6 | 16.6 × 32.3% = 5.4 | 9.1 | $\frac{5.4}{25.7} \times 100 = 20.8\%$ |
| 5 | 20 | 16.4 | 16.4 × 20.8% = 3.4 | 9.1 | $\frac{3.4}{25.5} \times 100 = 13.3\%$ |
| 6 | 20 | 16.4 | 16.4 × 13.3% = 2.2 | 9.1 | $\frac{2.2}{25.5} \times 100 = 8.6\%$ |
| 7 | 20 | 16.4 | 16.4 × 0.086% = 1.4 | 9.1 | $\frac{1.4}{25.5} \times 100 = 5.6\%$ |

As seen in the table, approximately 6 cycles are required to produce a representative oil with less than 10% of the start-up oil. Hence, 6 cycles performed where the oil and water phase produced from the previous cycled was added to the feed mixture for the subsequent cycle. The feed composition for the 6 cycle run is shown in Table 3 below:

TABLE 3

Feed mixture composition for 6$^{th}$ cycle run.

| Pine wt % dry | Spruce wt % dry | CMC wt % dry | Recirc. oil from 5$^{th}$ cycle wt % dry | Water contained in wood and recycled oil wt % | Recirc. water phase from 5th cycle wt % | K wt % | NaOH wt % | Total wt % |
|---|---|---|---|---|---|---|---|---|
| 11.1 | 11.1 | 0.8 | 18.2 | 9.8 | 45.2 | 2.3 | 1.5 | 100.0 |

The feed mixture in Table 3 were all processed at a pressure of about 320 bar and a temperature around 400° C. The de-gassed product was collected as separate mass balance samples (MB) in barrels from the start of each test, and numbered M1B1, MB32, MB 3, etc. The collected products were weighed, and the oil and water phases were gravimetrically separated and weighed. Data was logged both electronic and manually for each batch.

Total Mass Balance

The Total mass balance ($MB_{Tot}$) is the ratio between the total mass leaving the unit and the total mass entering the unit during a specific time. The total mass balance may also be seen as a quality parameter of the data generated. The average value is 100.8% with a standard deviation of Oil Yield from Biomass (OY)

The Oil Yield from Biomass (OY) expresses the fraction of incoming dry biomass that is converted to dry ash free oil. It's defined as the mass of dry ash free Oil produced from dry biomass during a specific time divided by the mass of dry biomass entering the unit during the same time. The recirculated oil is not included in the balance; it's subtracted from the total amount of oil recovered when calculating the oil yield from biomass. The average oil yield (OY) was found to be 45.3 wt % with a standard deviation of 4.1 wt % i.e. 45.3% of the mass of dry biomass (wood+CMC) in the feed is converted to dry ash free Oil.

Detailed Oil Analysis

Data measured for the oil is presented in Table 4.

TABLE 4

Data for 6$^{th}$ cycle oil

| PARAMETER | UNIT | WHOLE OIL, (DEHYDRATED) | LIGHT FRACTIONS (180-260° C.) | LIGHT FRACTIONS (260-344° C.) | HEAVY FRACTION (344° C.) |
|---|---|---|---|---|---|
| Yield on Crude, wt % | | | 11.6 | 21.1 | |
| C | wt % (daf) | 81.9 | 80.3 | 82.3 | 84.8 |
| H | wt % (daf) | 8.7 | 10.3 | 9.5 | 8.0 |
| N | wt % (daf) | 0.09 | n.a | n.a | <0.75 |
| S | wt % (daf) | 0.008 | n.a | n.a | n.a |

TABLE 4-continued

Data for 6$^{th}$ cycle oil

| PARAMETER | UNIT | WHOLE OIL, (DEHYDRATED) | LIGHT FRACTIONS (180-260° C.) (260-344° C.) | | HEAVY FRACTION (344° C.) |
|---|---|---|---|---|---|
| O | wt % (daf) | 10.1 | 9.4 | 8.2 | 8.2 |
| Density, 15° C. (Whole Oil, a.r) | kg/l | 1.0729 | | | |
| Density, 15° C. | kg/l | n.a | 0.9425 | 1.0236 | 1.1541 |
| Density, 40° C. | kg/l | 1.0572 | | | |
| Density, 50° C. | kg/l | 1.0503 | | | |
| Density, 60° C. | kg/l | 1.0435 | | | |
| Density, 70° C. | kg/l | 1.0368 | | | |
| HHV (daf) | MJ/kg | 38.6 | 38.5 | 37.5 | 37.7 |
| Kinematic Viscosity, 40° C. | mm$^2$/s | 17360 | 2.996 | | 9812 (150° C.) |
| Kinematic Viscosity, 60° C. | mm$^2$/s | 1545 | | | 1298 (175° C.) |
| Total Acid Number | mg KOH/g | 8.8 | 3.75 | 8.2 | 8.2 |
| Strong Acid Number | mg KOH/g | <0.01 | | | |
| Pour point (maximum) | ° C. | 24 | −60 | −15 | 140 |
| Flash point | ° C. | 59 | 90 | 146 | |
| Moisture content | wt % | 0.88 | | | |

Figure 9:
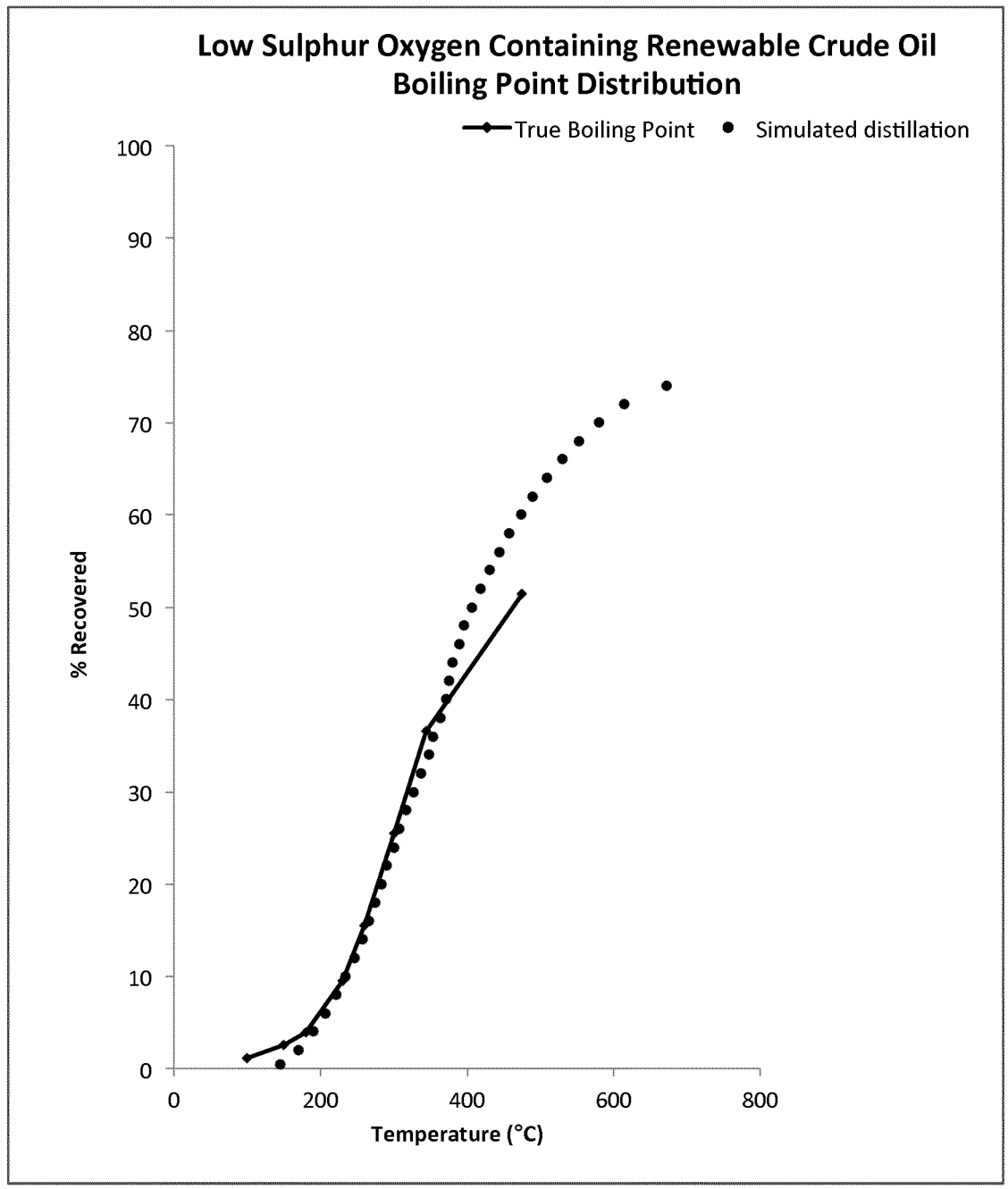
FIG. 9 shows simulated and true distillation curve of a low sulphur oxygen containing renewable crude oil produced from softwood in said step of providing according to the present invention.
Figure 10:
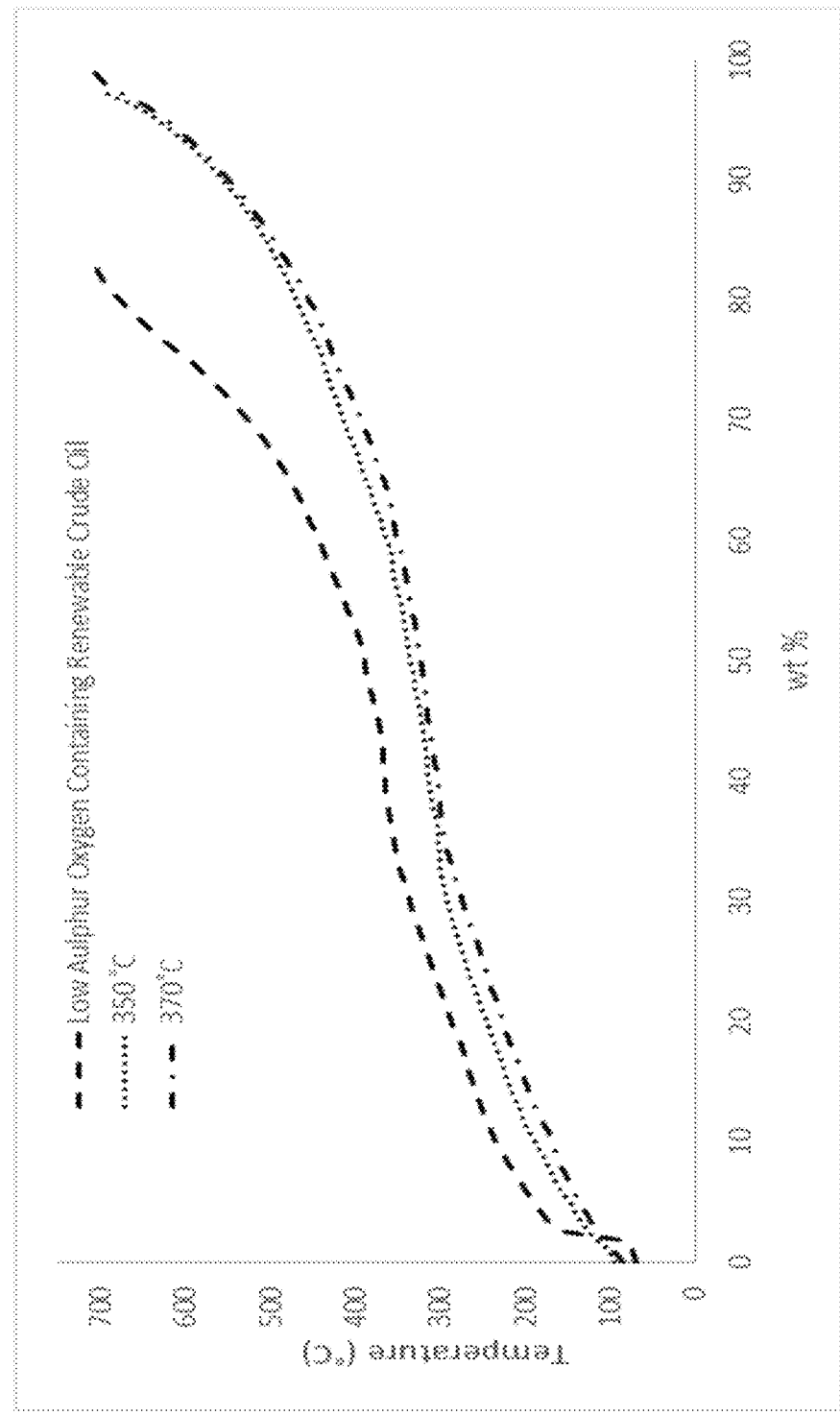
FIG. 10 shows boiling point curves for a low sulphur oxygen containing renewable crude oil and upgraded low sulphur renewable oil using a sulphided nickel molybdenum catalyst at 350° C. and 370° C.

Simulated distillation results for whole oil and compared with true distillation results in FIG. 9.

Energy Recovery in the produced Loe Sulphur Containing Oxygen Renewable Crude Oil The Energy Recovery (ER$_{oil}$) expresses how much of the chemical energy in the fed wood that is recovered in the oil. It does not take into account the energy required for heating nor the electrical energy supplied to the unit. For the calculations of recoveries, a High Heating Value (HHV) for the oil of 38.6 MJ/kg, respectively. The resulting oil yield for the 6$^{th}$ cycle oil were 85.7% with a standard deviation of 7.7 i.e 85.6% of the (chemical) energy in wood fed to the plant is recovered in the produced Oil.

Gas Production and Gas Analyses

Gas is produced in the process of converting biomass into Hydrofaction Oil. The yield of gas produced from dry wood in the feed is 41.2 wt % as is shown in the table 8 (oxygen balance). The gas is composed of mainly $CO_2$, $CH_4$ and other short hydrocarbons ($C_2$-$C_4$), $H_2$ and some lower alcohols. Gas was sampled and analyzed by Sveriges Tekniska Forskningsinstitut (SP) in Sweden. The analysis of 6$^{th}$ cycle gas is shown in Table 6 along with heating values of the gas estimated from the gas composition. Since a HTL process runs at reductive conditions, it's assumed that the gas is oxygen ($O_2$) free and the detected oxygen in the gas origin from air leaking into the sample bags when filled with gas sample. The gas composition is corrected for the oxygen (and nitrogen). The calculated elemental composition of the gas is shown in Table 6.

TABLE 6

Gas composition for the gas produced in the process.

| COMPONENT | vol %, A.R | vol %, AIR FREE* | wt %, AIR FREE | HHV, MJ/kg | LHV, MJ/kg |
|---|---|---|---|---|---|
| H$_2$ | 24.00 | 25.79 | 1.69 | 2.40 | 2.02 |
| O$_2$* | 0.40 | 0.0 | 0.0 | 0.0 | 0.0 |
| N$_2$ | 1.50 | 0.02 | 0.01 | 0.00 | 0.00 |
| CO$_2$ | 56.90 | 61.14 | 87.27 | 0.00 | 0.00 |
| CO | 0.30 | 0.32 | 0.29 | 0.03 | 0.03 |
| CH$_4$ | 6.70 | 7.20 | 3.75 | 2.08 | 1.87 |
| Ethene | 0.16 | 0.17 | 0.16 | 0.08 | 0.07 |
| Ethane | 2.20 | 2.36 | 2.31 | 1.20 | 1.10 |
| Propene | 0.27 | 0.29 | 0.40 | 0.19 | 0.18 |
| Propane | 0.95 | 1.02 | 1.46 | 0.74 | 0.68 |
| Sum C$_4$ | 0.63 | 0.68 | 1.25 | 0.62 | 0.57 |
| Methanol | 0.41 | 0.44 | 0.46 | 0.10 | 0.09 |
| Ethanol | 0.27 | 0.29 | 0.43 | 0.13 | 0.12 |
| Acetone | 0.26 | 0.28 | 0.53 | 0.17 | 0.15 |
| Total | 94.95 | 100 | 100 | 7.73 | 6.89 |

*Oxygen ($O_2$) in the as received gas (a.r) is assumed to origin from air contamination of the gas when filling the sample bag. The produced gas composition is assumed air (Oxygen) free.

TABLE 7

Elemental as composition.

| ELEMENT | wt % |
|---|---|
| C | 32.0 |
| H | 3.8 |
| N | 0.0 |
| O | 64.1 |
| Total | 100 |

Oxygen & Water Balance

The main oxygen removal paths in the process is believed to be via two main routes:

1. de-carboxylation with $CO_2$ as product
2. dehydration/hydrogenation with water as product.

As presented in table 8, about ⅔ of the oxygen removal is due to de-carboxylation and ⅓ due to dehydration/hydrogenation.

TABLE 8

Oxygen balance

| | COMPONENT | MASS, kg |
|---|---|---|
| Oxygen in dry wood (daf), wt % | kg O in wood/1000 kg in wood | 432.7 |
| Oxygen in dry oil (daf), wt % | kg O in oil/1000 kg wood | 45.6 |
| Carbon in gas | C (gas) | 132 |
| Mass total gas | m (Tot gas), kg/1000 kg wood | 412 (41.2% gas yield) |
| Total O in gas + produced water | O, kg/1000 kg | 387.3 |
| $CO_2$ (in gas), per 1000 kg dry wood | m ($CO_2$), kg | 360 |
| | m (O), kg | 261 (67.5% of total O removed) |
| CO (in gas), per 1000 kg dry wood | m (CO), kg | 1.2 |
| | m (O), kg | 0.7 |
| Methanol (in gas), per 1000 kg dry wood | m (MeOH), kg | 1.9 |
| | m (O), kg | 0.9 |
| Ethanol (in gas), per 1000 kg dry wood | m (EtOH), kg | 1.8 |
| | m (O), kg | 0.6 |
| Acetone (in gas), per 1000 kg dry wood | m (Ac), kg | 2.2 |
| | m (O), kg | 0.6 |
| Total O in gas, kg per 1000 kg dry wood. Sum (O in all components) | m (O), kg | 264.3 |
| Produced $H_2O$ from excess O, per 1000 kg dry feed. | m (O), kg (387.3-264.3) | 123 (31.7 % of total O removed) |
| | m(Prod. $H_2O$), kg | 138 |
| m (total oxygen in gas), per 1000 kg dry feed | m (total oxygen in gas), kg | 264.3 |
| m (oxygen in oil), per 1000 kg dry feed | m (oxygen in oil), kg | 45.6 |
| m (oxygen in produced water), per 1000 kg dry feed | m (oxygen in produced water), kg | 123 |
| m (oxygen in feed), per 1000 kg dry feed | m (oxygen in feed), kg | 432.7 |
| O Balance | m($O_{out}$)/m($O_{in}$) | 100% |

Example 2: Upgrading of Oil Using Conventional Sulfided NiMo Catalyst

Upgrading of the oil produced similarly as to the oil in example 1 was performed to obtain advance drop-in biofuels and value-added chemicals by adaptation of conventional hydrotreating techniques. A series of experiments included parametric screening in a continuous plug flow tubular reactor were performed to evaluate a commercial sulphided Ni—Mo catalyst from Criterion DN3630 with a focus on deoxygenation and TAN reduction, saturation of aromatics, distillate recovery, catalyst stability and mass balance establishment.

About 40 g of NiMo*S on alumina (commercial catalyst) was placed in a stainless steel up-flow tubular reactor having a ¾ inch outer diameter (OD), a length of about 51 cm and an empty volume of 100 cc. The reactor was equipped with a 10-sensing point thermocouple profile probe (Omega). The catalyst resided in the middle of the reactor and both ends of the reactor were packed with about 20 g of carborundum (CSi). This allowed efficient preheating of the oil in the carborundum zone before the oil reaches the catalyst zone. The reaction temperatures were controlled by 3 temperature controllers.

The catalyst bed was first dried in nitrogen atmosphere at a flow rate of about 15 L/hr at atmospheric pressure at 120° C. for 1 h. Subsequently, the catalyst was activated by a pre-sulfiding process using sulphur-spiked vacuum gas oil with 3.67 wt % of DMDS and hydrogen flow rate of 13.6 L/hr at 41.4 bar at temperature range between 35 to 343° C. (ramp of 35° C./hr) for 16 hours. The catalyst was then contacted with the feed at about 0.3 cc/min (WHSV of about 0.5 $h^{-1}$) and a flow of hydrogen at about 900 scc/cc at a pressure about 900 psig. The reaction temperatures of the tests were in the range of about 350° C. and 370° C. and the total pressure in the reactor were 60 bar.

The resulting upgraded oils were evaluated using Simdist, density, viscosity, TAN, oxygen content, H/C ratio and liquid product distribution. Process metrics such as yields and temperature/pressure stability were also evaluated, and process gas composition analysis was performed by gas chromatography.

Figure 11:
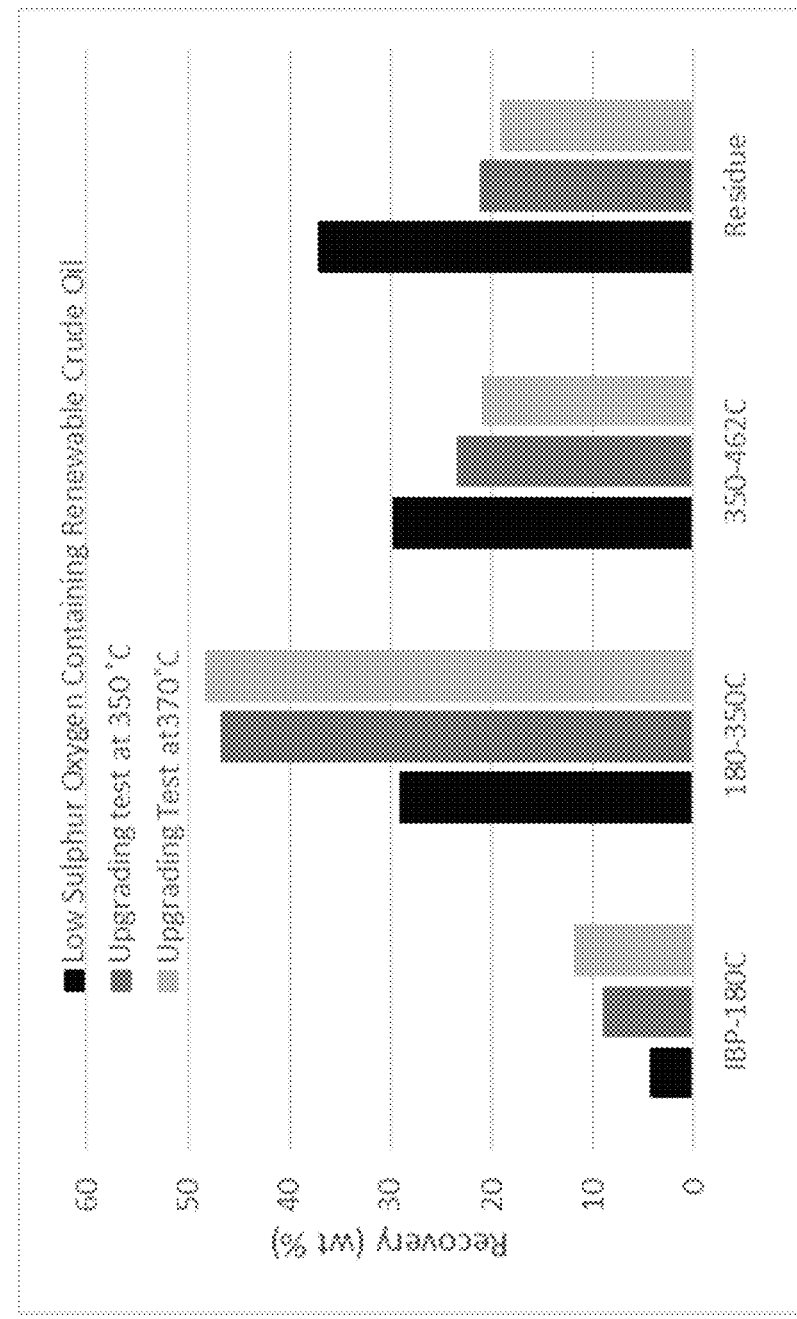
FIG. 11 shows the liquid product distribution for upgraded low sulphur renewable crude oil using a sulphided nickel molybdenum catalyst at 350° C. and 370° C.
Figure 12A:
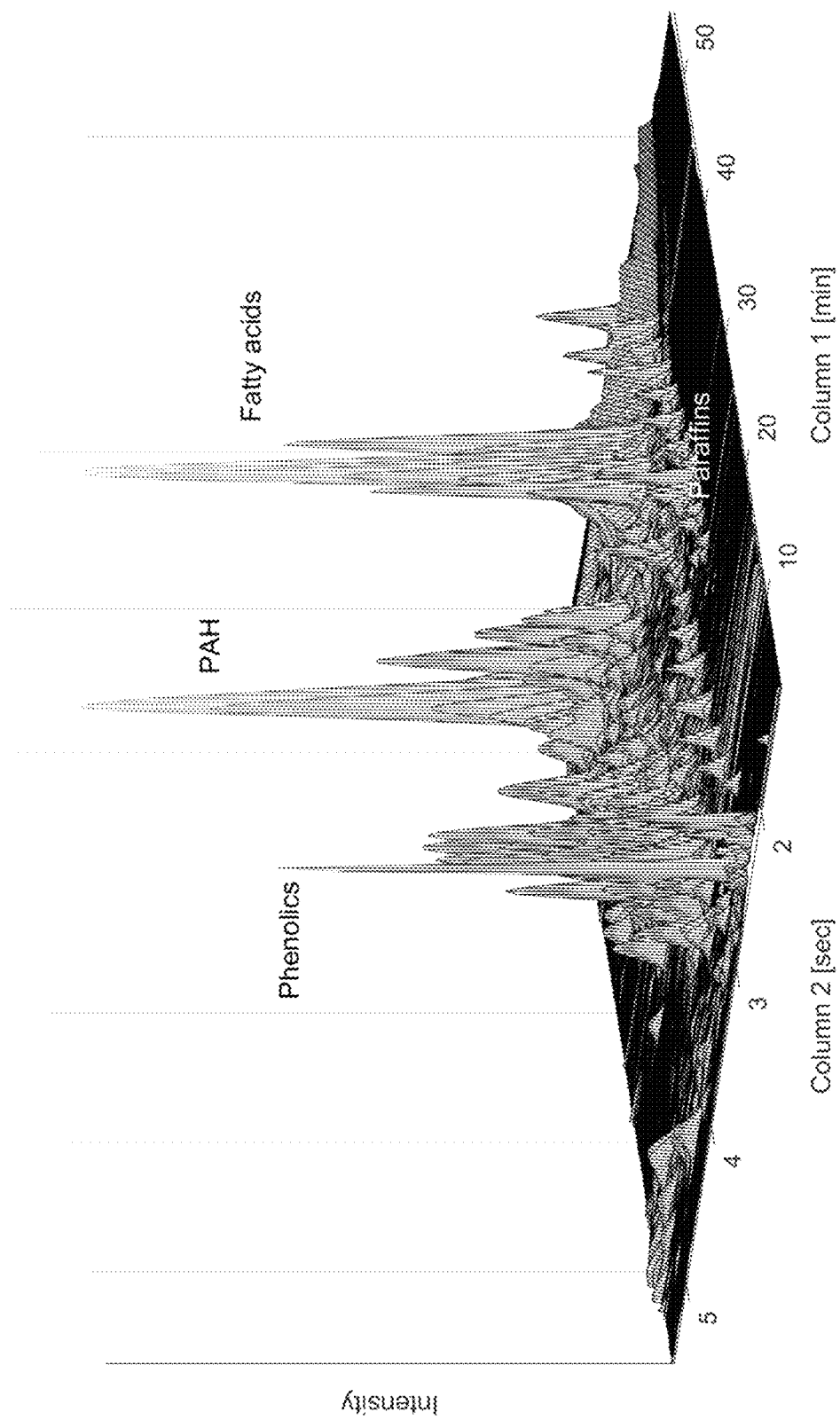
FIG. 12*a*-12*c* shows pyro GCxGC-MS of the chemical composition of low sulphur oxygen containing renewable crude oil before (12*a*) and after upgrading (12*b*) and the distribution of products (12*c*) using a sulphided nickel molybdenum catalyst at 350° C.

Both upgrading experiments improved the oil's distillation profiles as shown in FIG. 12 and reduced the oxygen content as well as the density, viscosity and acid number of the oil as shown in Table 9. For example, at the catalyst screening test at 370° C. and 900 scc/cc produced an upgraded oil with significantly lower viscosity than the crude feed oil (80432 cP to 47 cP at 20° C.) and density (1103 Kg/$m^3$ to 991 Kg/$m^3$); Total Acid Number-TAN was eliminated, and the oxygen content dropped from about 10 to 2 wt %. Moreover, the distillable fraction (IBP-350° C.) increased from 33 wt % to 60 wt % while the residue (550+° C.) have decreased from 28 wt % to 10 wt % as shown in FIG. 11. Combining the mass yield and density reduction results in a volume yield above 100 vol %.

TABLE 9

| | | | | Oil | | $H_2$ | | | |
|---|---|---|---|---|---|---|---|---|---|
| Sample | TAN mg KOH/g | Viscosity cP | Density kg/m³ | Yield wt % | Gas wt % | cons. wt % | HHV MJ/kg | Oxygen wt % | H/C |
| Biocrude | 55.7 | 80432 | 1103 | | | | 36.8 | 10.9 | 1.37 |
| 350° C. screening | 0.0 | 89 | 969 | 86 | 4.6 | 2.9 | 42.58 | 2.6 | 1.55 |
| 370° C. screening | 0.0 | 47 | 991 | 83 | 6.1 | 2.5 | 42.66 | 2.1 | 1.55 |

Table 10 shows the gas composition of catalytic screening tests. The gas composition shows that both decarboxylation and deoxygenation occurs. Therefore, $CO_2$ and $CH_4$ where produced.

TABLE 10

Gas composition of catalytic screening tests

| Sample | 350° C. screening | 370° C. screening |
|---|---|---|
| $H_2$ | 93.50 | 92.97 |
| $H_2S$ | 1.21 | 1.03 |
| $C_1$ | 1.71 | 2.33 |
| $C_2$ | 0.49 | 0.84 |
| $C_3$ | 0.22 | 0.40 |
| $C_4$ | 1.30 | 0.98 |
| $C_5$ | 0.03 | 0.03 |

TABLE 10-continued

Gas composition of catalytic screening tests

| Sample | 350° C. screening | 370° C. screening |
|---|---|---|
| $CO_2$ | 1.54 | 1.44 |
| CO | 0.00 | 0.00 |

Figure 12B:
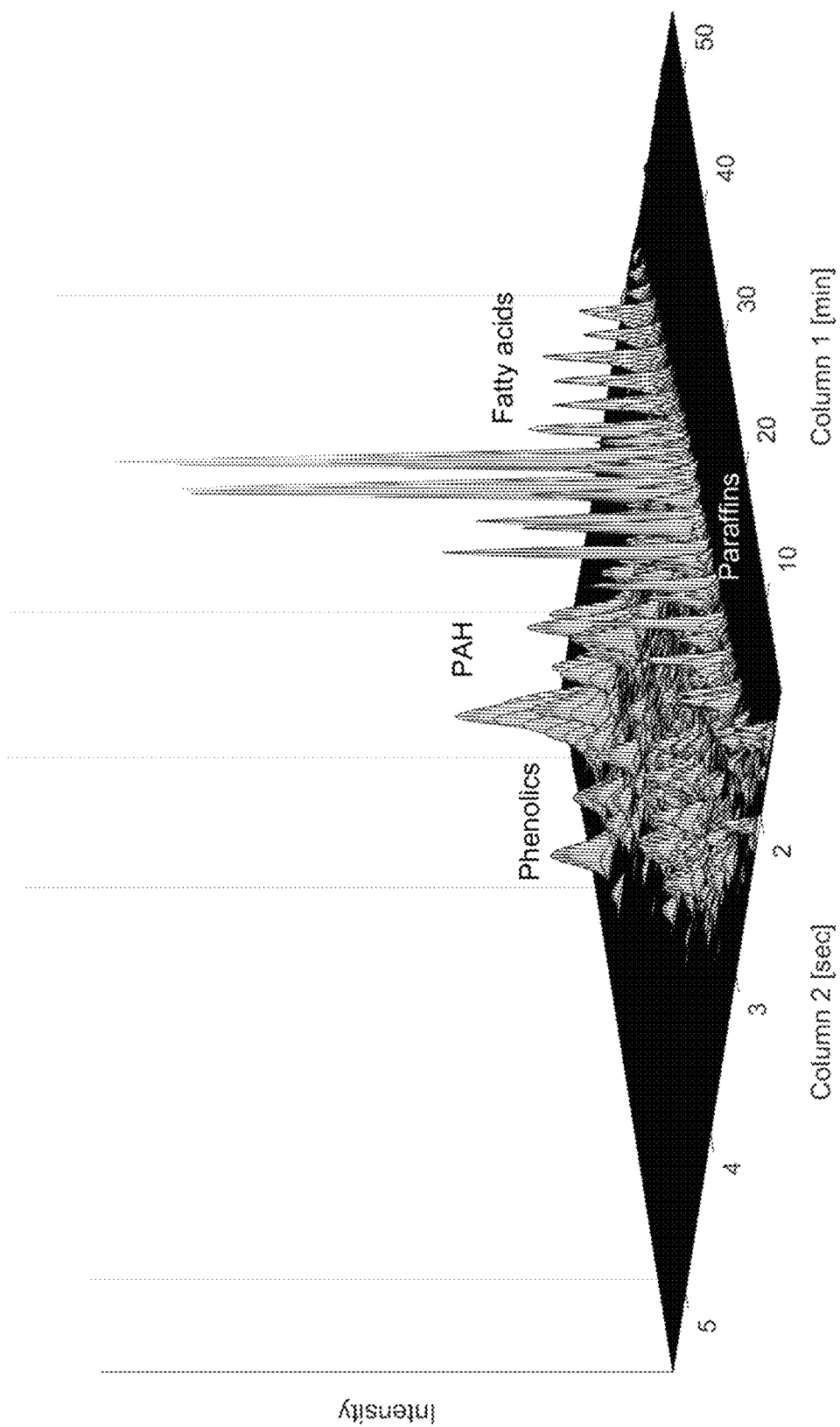
Figure 12C:
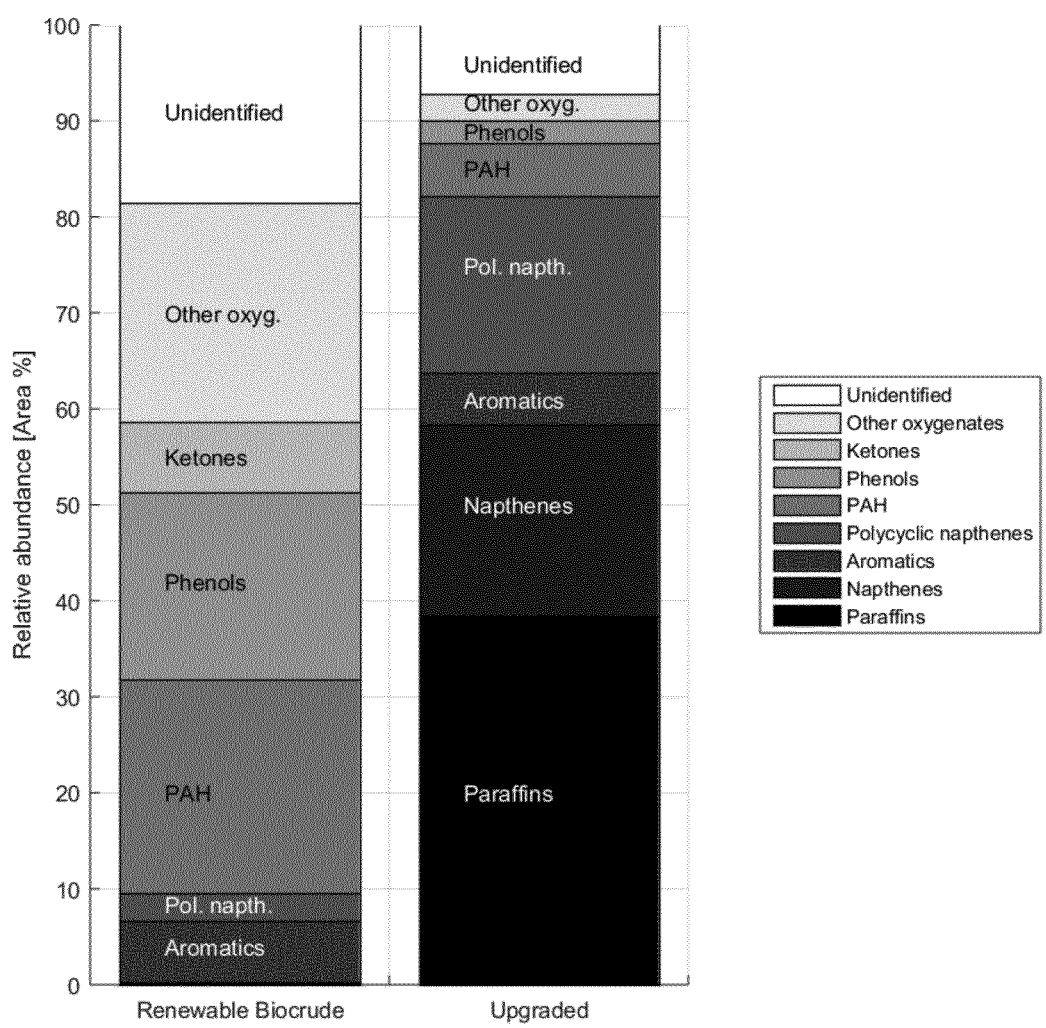

Product analysis by Py-GCxGC-MS showed how renewable crude oil complexity (FIGS. 12a and 12c) is reduced significantly during hydrotreating (FIGS. 12b and 12c). This analysis also reveals high deoxygenation and significant reduction of renewable crude oil polarity and aromaticity. The relative abundance of pure hydrocarbons is improved from 32 to 88%. Polyaromatic (PAH) hydrocarbons, fatty acids, and phenolics are reduced to naphthenes, paraffins and aromatics.

Example 3: Stability of Conventional Sulfided NiMo Catalyst

A longer stability test was performed subsequent to the screening tests described in example 2 for evaluation of the stability and eventual deactivation of the catalyst. The test was performed at the same conditions as for the screening tests i.e. the first 200 hours was performed at a reaction temperature of 350° C., where after the reaction temperature was increased to 370° C. for another 150 hours.

Figure 13:
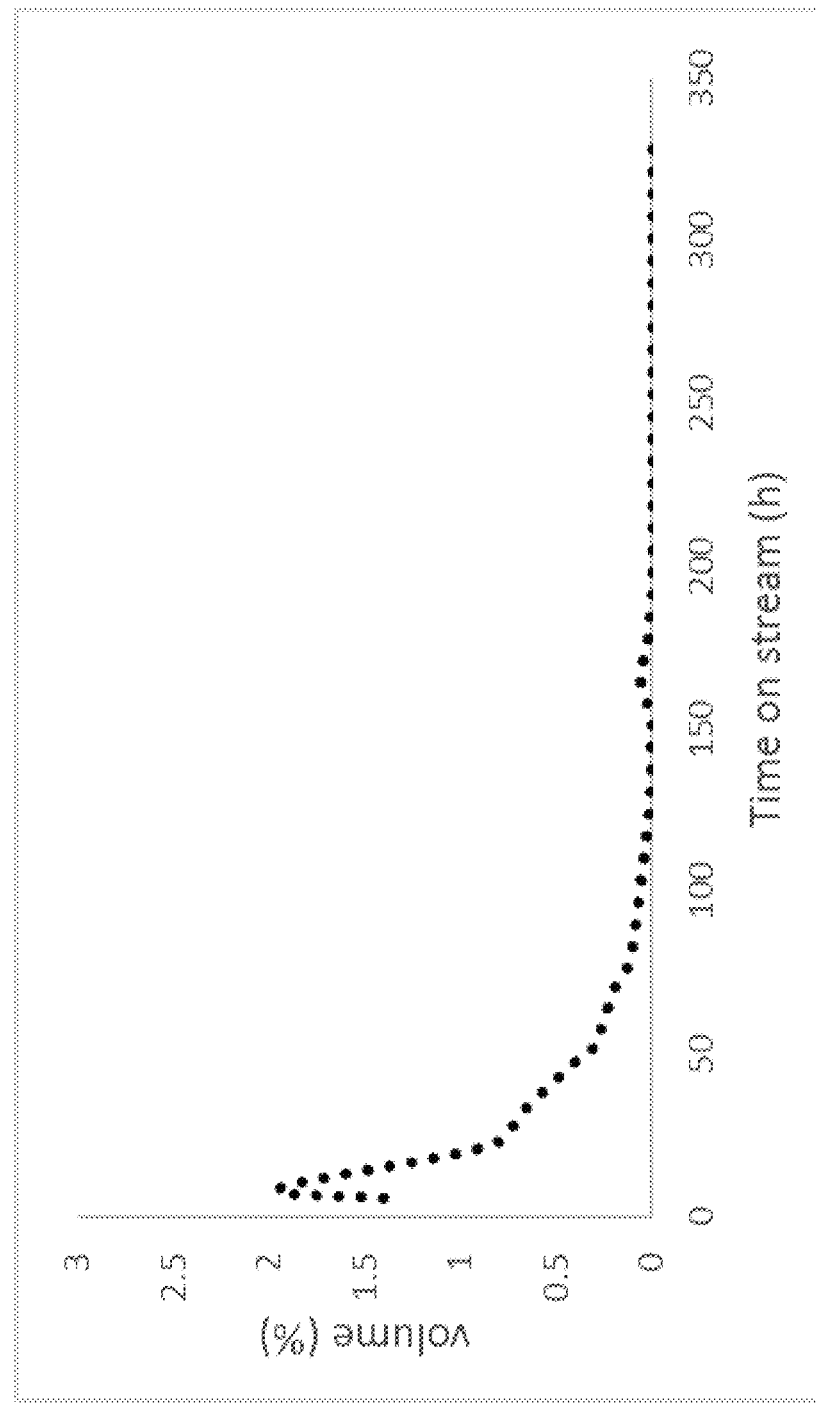
FIG. 13 shows $H_2S$ concentration in the off-gas from reaction zone 1 comprising sulphided Nickel Molydenum on an alumina support versus time.

The stability test showed strong signs of catalyst deactivation during this longer term stability test as indicated by the $H_2S$ concentration in the gas as shown in FIG. 13.

As seen from FIG. 13, the $H_2S$ concentration in the process gas was nearly depleted by the 100th hour. This suggest deactivation of the catalyst associated with the loss of sulphur that came from the transformation of the catalyst from sulphide to oxide form.

This is further supported by inferior oil characteristics for the oil compared to the results from the screening run at same reaction conditions as shown below in Table 11.

TABLE 11

| | | | | Liquid | | $H_2$ | |
|---|---|---|---|---|---|---|---|
| Sample | TAN mg KOH/g | Viscosity cP | Density kg/m³ | Yield wt % | Gas wt % | cons. wt % | HHV MJ/kg |
| Biocrude | 55.7 | 80432 | 1103 | | | | 36.8 |
| 370° C. | 0.0 | 504 | 991 | 83 | 6.0 | 2.8 | 42.18 |

Hence, there are a need for improved catalysts and processes that do not suffer from the stability problems of the current conventional hydrotreating catalysts developed for sulphur containing fossil oils.

Example 4: Reactivation of Conventional Sulfided NiMo Catalyst

The catalyst in example 3 was reactivated by repeating the activation procedure described in example 2. It was found that it was possible to reactivate the catalyst and obtain oil characteristics similar to the screening tests.

Hence, it may be possible to design a process where the sulphide catalyst is periodically reactivated or co-feeding a sulphur agent to the system for regeneration of sulphide sites and stabilization of the catalyst.

However, this technique is undesirable as it may result in sulphur contamination of the low sulphur renewable oil, while also requiring additional $H_2S$ handling associated with health & safety issues.

Example 5: Upgrading of Low Sulphur Oxygen Containing Renewable Crude Oil Using Non-Sulfided NiW/$Al_2O_3$ Catalyst A non-sulphided NiW/$Al_2O_3$(HC-26 Regenerated; 1.3 mm provided by Dynacat) is a candidate catalyst for use in the first reaction zone according to the present invention. A serie of upgrading tests were performed in a micro batch reactor set up with focus on deoxygenation, saturation and TAN elimination.

The catalyst was activated ex-situ by reduction in $H_2$ at 600° C. The reduction procedure of 10 g of catalyst was carried out as follows. Heating from ambient to 120° C. at a rate of 50° C./h in $N_2$ flow. Drying at 120° C. for 1 hour in $N_2$ flow. Heating from 120° C. to 600° C. at a rate of 50° C./h in $H_2$ flow. Dwelling at 600° C. for 8 hours in $H_2$ flow before cooling to ambient in $H_2$ flow. After cooling the system was flushed with $N_2$, before a stabilization was carried out at ambient temperature for 5 hours in 1% $O_2$ in $N_2$. The gas flow rate was 15 l/h and the pressure was below 1 bar gauge during all steps.

The upgrading experiments were carried out in 25 ml micro batch reactors with low sulphur oxygen containing renewable crude oil as produced in example 1. At a reaction time of 4 hours, the effect of different catalyst to oil mass ratios, which correlate to the WHSV in a continuous reactor, was tested. Hydrogen was purged to 80 bar at ambient temperature, which corresponds to a hydrogen availability of around 500 NL/L oil. All upgrading experiments on the $NiW/Al_2O_3$ catalyst were carried out in repeats, and at 360° C. The products were centrifuged for 20 min at 3800 g upon separation.

Figure 14:
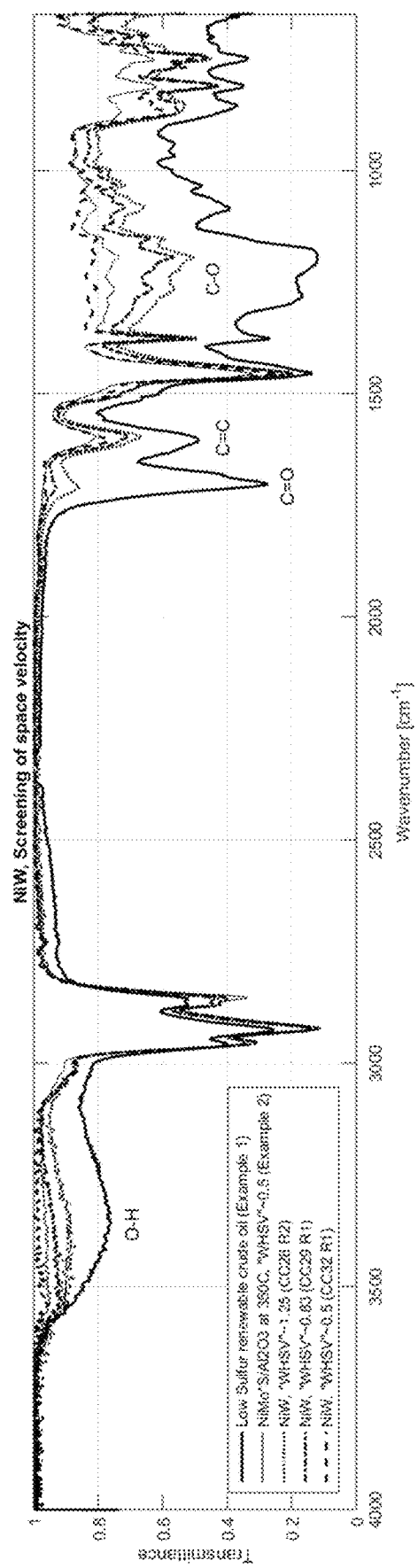
FIG. 14 shows the FTIR spectra of upgrading using nonsulphided NiW heterogeneous in the first reaction zone at various weight based hourly space velocities compared with the low sulphur oxygen containing renewable crude oil and results for sulphide NiMo heterogeneous catalyst in reaction zone 1.
Figure 15:
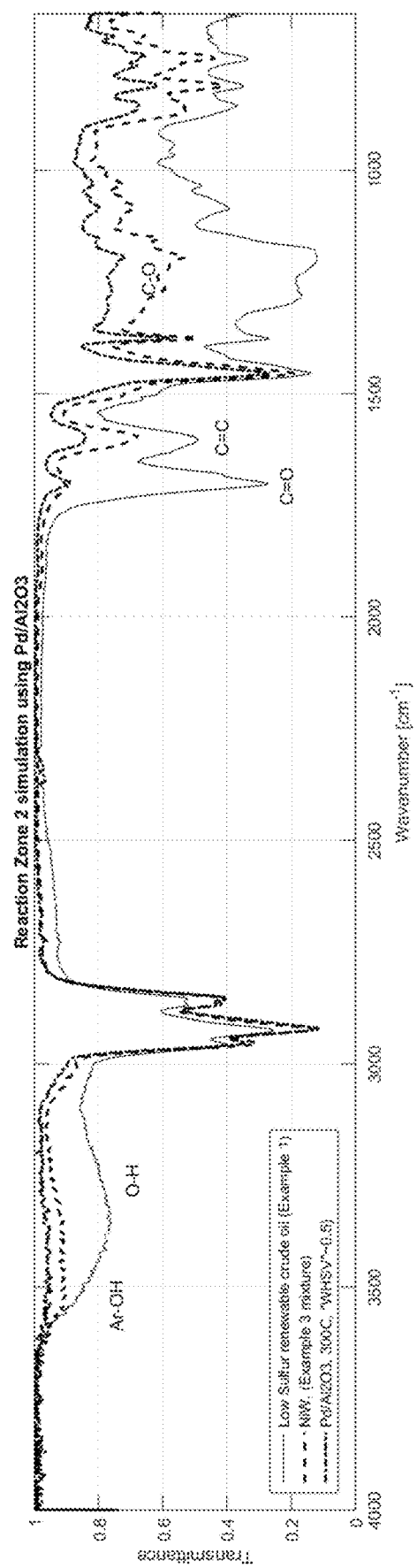
FIG. 15 shows the FTIR spectra of upgrading using nonsulphided NiW heterogeneous in the second reaction zone at various weight based hourly space velocities compared with the low sulphur oxygen containing renewable crude oil and results for nonsulphided NiW heterogeneous catalyst in reaction zone 1.

FIG. 15 depicts the FT-IR spectra of the organic phase after centrifugation. The FT-IR spectra of the low sulphur oxygen containing renewable crude oil from example 1 is given for comparison. Similarly, the product of example 2 describing upgrading on sulphided NiMo*S/$Al_2O_3$ at 350° C. is also depicted in FIG. 14.

The results show that the reduced $NiW/Al_2O_3$ catalyst at conditions corresponding to a WHSV of 0.5 $h^{-1}$ show similar deoxygenation activity as that obtained in example 2. FT-IR absorption in the range of carboxylic acids is not present after upgrading, and thus TAN is significantly reduced or eliminated. It is further seen that oxygenates in general is significantly reduced or eliminated, whereas aromatics though reduced are still present in significant amounts (peaks at 1600 $cm^{-1}$ and 7-900 $cm^{-1}$).

Hence, the results suggest the reduced $NiW/Al_2O_3$ as a suitable catalyst for use in reaction zone 1, but a further reaction step is required to reduce the aromatic content further.

Example 6: Upgrading of Low Sulphur Oxygen Containing Renewable Crude Oil Using Non-Sulfided $Pd/Al_2O_3$ Catalyst A non-sulphided $Pd/Al_2O_3$ (Dynacat 550, LRA-204, Regenerated; 4×8 mesh) is a candidate catalyst for use in the second reaction zone according to the present invention. A serie of upgrading tests were performed in a micro batch reactor set up with focus on simulating the saturation of aromatics in reaction zone 2.

The catalyst was activated ex-situ by reduction in $H_2$ at 300° C. The reduction procedure of 10 g of catalyst was carried out as follows. Heating from ambient to 120° C. at a rate of 50° C./h in $N_2$ flow. Drying at 120° C. for 1 hour in $N_2$ flow. Heating from 120° C. to 300° C. at a rate of 50° C./h in $H_2$ flow. Dwelling at 300° C. for 8 hours in $H_2$ flow before cooling to ambient in $H_2$ flow. Then the system was flushed with $N_2$, before a stabilisation was carried out at ambient temperature for 5 hours in 1% $O_2$ in $N_2$. The gas flow rate was 15 l/h and the pressure below 1 bar gauge during all steps.

The upgrading experiments were carried out in 25 ml microbatch reactors with an oil as produced in example 5. This oil was chosen in order to simulate the reaction zone 2, where the effluent from reaction zone 1 will be processed. 2 g of reduced catalyst and 4 g of oil from example 3 was added. The oil from example 3 was a 1:1 mixture by mass of the product obtained at a WHSV equivalent to 0.83 $h^{-1}$ and 1.25 $h^{-1}$. Hydrogen was purged to 80 bar at ambient temperature, which corresponds to a hydrogen availability of around 500 NL/L. The upgrading experiment with $Pd/Al_2O_3$ catalyst was carried out in repeats at 300° C. and with a reaction time of 4 hours. The products were centrifuged for 20 min at 3800 g upon separation, and FIG. 15 depicts the FT-IR spectra of the organic phase after centrifugation. The FT-IR spectra of the oil from example 1 is given for comparison. Similarly, the oil mixture of example 5 used as feed in this experiment is depicted in FIG. 15.

The results show that the reduced $Pd/Al_2O_3$ catalyst at conditions corresponding to a WHSV of 0.5 $h^1$ has good hydrogenation activity, since the absorption around 1600 $cm^{-1}$ and in the 700-900 $cm^{-1}$ range is reduced significantly. As a result, this catalyst is only considered a candidate for reaction zone 2.

The invention claimed is:

1. A process for producing an upgraded renewable oil from a renewable carbonaceous material, the process comprising:
    providing a low sulphur oxygen containing renewable crude oil having a sulphur content of less than 0.5 wt % and an oxygen content of about 2.0 wt % to about 20 wt % by:
        a. providing a carbonaceous material in the form of biomass contained in one or more feedstock;
        b. providing a feed mixture by slurring the carbonaceous material in one or more fluids, at least one of which comprises water;
        c. pressurizing the feed mixture to a pressure in a range from 150 to 400 bar;
        d. heating the pressurized feed to a temperature in a range from about 300° C. to about 450° C.;
        e. maintaining the pressurized and heated feed mixture in a conversion zone for a conversion time in a range from 3 to 30 minutes, thereby causing the carbonaceous material to be converted; and
        f. cooling the converted feed mixture to a temperature in a range from about 25° C. to about 200° C.;
        g. expanding the converted feed mixture to a pressure in a range from 1 to 120 bar, and separating the converted feed mixture into at least a low sulphur oxygen containing renewable crude oil, a gas phase and a water phase comprising water-soluble organics and dissolved salts;
    pressurizing the low sulphur oxygen containing renewable crude oil to an operational pressure in a range from 20 to 200 bar;
    adding and mixing hydrogen to the pressurized low sulphur oxygen containing renewable crude oil;
    heating, after the step of adding and mixing hydrogen, the pressurized low sulphur oxygen containing renewable crew oil to an operational temperature in a range from 180 to 410° C. in one or more steps;
    contacting the heated mixture comprising the pressurized low sulphur oxygen containing renewable crude oil and hydrogen with at least one heterogeneous catalyst contained in a first reaction zone to obtain a partially upgraded renewable oil; and contacting the partially upgraded renewable oil from said first reaction zone with at least one heterogeneous catalyst contained in a second reaction zone to obtain an upgraded renewable oil;

wherein the step of providing the low sulphur oxygen containing renewable crude oil, including the steps a through g, are conducted under hydrothermal or solvothermal conditions, such that the low sulphur oxygen containing renewable crude oil provided is a hydrothermal/solvothermal liquefaction oil, wherein the at least one heterogeneous catalyst in the first reaction zone and/or the at least one heterogeneous catalyst in the second reaction zone is on a non-sulphided form, and wherein the first reaction zone and the second reaction zone operate at different temperature conditions.

2. The process according to claim 1, wherein the hydrogen added is at least partly produced in and extracted from said process of producing an upgraded renewable oil.

3. The process according to claim 2, wherein the amount of hydrogen extracted from said process of producing an upgraded renewable oil comprises at least 50% of the total hydrogen consumed by a portion of said process performed on the low sulphur oxygen containing renewable crude oil provided according to steps a through g.

4. The process according to claim 1, wherein the at least one heterogeneous catalystin the first reaction zone and/or the at least one heterogeneous catalyst in the second reaction zone comprises one or more hydrogenation, hydrotreating, hydrodeoxygenation, hydro-processing, hydrocracking, hydrodearomatization, hydrodemetallization and/or hydroisomerization catalyst and where the at least one heterogeneous catalyst in the first reaction zone and/or the at least one heterogeneous catalyst in the second reaction zone and/or at least one element of the at least one heterogeneous catalyst in the first reaction zone and/or the at least one heterogeneous catalyst in the second reaction zone is/are in a reduced form, a carbide form, a carbonate form, a nitride form, a phosphide form, a boride form, an oxide form, a sulphate form, or a combination thereof.

5. The process according to claim 1, where the at least one heterogeneous catalyst in the first reaction zone and/or the at least one heterogeneous catalyst in the second reaction zone is/are a bi-metallic or trimetallic catalyst supported on a supporting structure and where said at least one heterogeneous catalyst and/or catalyst elements in the first reaction zone and/or said at least one heterogeneous catalyst and/or catalyst elements in the second reaction zone comprises:

a. one or two metals selected from group of Fe, Co, Ni, and Ru of the VIIIB group of the periodic table; and b. one or more metals selected from group Cr, Mo, W of group VIB of the periodic table and optionally one or more elements selected from the group of Ce, Cu, Zr, Ti, B, and Bi and where the supporting structure for said catalyst or catalyst elements is selected from the group of consisting of γ-alumina, δ-alumina, Si-stabilized γ-alumina, silica, silicate, alumosilicate, silicoaluminophosphates (SAPO), aerogirine, kaolin, silica gel, zirconia, titania, ceria, hydrotalcite, scandium, yttrium, ytterbium, activated carbon, pet coke, red mud, and zeolites, where the supporting structure has a surface area (BET) in a range from 20 to 500 m$^2$/g, a pore density in a range from 0.4 to 0.65 cc/g, and an average pore size in a range from 20 to 500 Angstrom.

6. The process according to claim 5, where the supporting structure comprises a layered double hydroxide.

7. The process according to claim 6, where the supporting structure comprises a hydrotalcite and where said at least one heterogeneous catalyst in the first reaction zone and/or said at least one heterogeneous catalyst in the second reaction zone comprises Mg, Ca, Ni, Co, Mo, Mn, Cr, Fe, Ce, or a combination thereof.

8. The process according to claim 7, where said at least one heterogeneous catalyst in the first reaction zone and/or said at least one heterogeneous catalyst in the second reaction zone has the empirical formula $M(II)_6M(III)_2(OH)_{16}.CO_3.4H_2O$, where M(II) is a divalent metal ion comprising one or two elements selected from the group of Mg, Ca, Ni, Co, Cu, Mn, Zn, and Fe, and M(III) is a trivalent metal ion comprising one or two elements selected from the group of Al, Fe, Co, Ni, Cr, Bi, Mn, Ce, and Ga.

9. The process according to claim 7, where said at least one heterogeneous catalyst in the first reaction zone and/or said at least one heterogeneous catalyst in the second reaction zone has the empirical formula $M(II)_6M(III)_2(OH)_{16}.CO_3.4H_2O$, where M(II) is a divalent metal ion comprising one or two elements selected from the group of Mg, Ca, Ni, Co, Cu, Mn, Zn, Fe, W, and Mo, and M(III) is a trivalent metal ion comprising one or two elements selected from the group of Al, Fe, Cr, Bi, Mn, Ce, Ga, Mo, and W.

10. The process according to claim 9, where said at least one heterogeneous catalyst in the first reaction zone and/or said at least one heterogeneous catalyst in the second reaction zone has the empirical formula $Mg_xNi_yFe_zCe_wAl_q(OH)_{16}.CO_3.4H_2O$, where x: 1.0-2.0, y: 4.0-5.0, z: 0.0-1.0, w: 0.0-1.0, and q: 1.0-2.0.

11. The process according to claim 10, wherein the at least one heterogeneous catalyst in the first reaction zone and/or the at least one heterogeneous catalyst in the second reaction zone comprises $Mg_{4.3}Ni_{1.70}CeAl(OH)_{16}.CO_3.4H_2O$.

12. The process according to claim 9, where an effluent from the second reaction zone is cooled.

13. The process according to claim 1, where the first reaction zone comprises two or more reactors, where the first reactor in the first reaction zone is a graded bed comprising heterogeneous catalysts with increasing activity, and where the inlet temperature to the first reactor of the first reaction zone is below 300° C.

14. The process according to claim 13, where a further separation of gases, water, naphtha range hydrocarbons, diesel range hydrocarbons and heavy hydrocarbons with a boiling point higher than 350° C. is performed on the effluent from the second reaction zone by a combination of flash tanks and distillations columns.

15. The process according to claim 1, where a separation of gas and/or water from the partially upgraded low sulphur renewable oil is performed prior to the second reaction zone.

16. The process according to claim 15, where the partially upgraded low sulphur renewable oil is further separated into a light fraction and a heavy fraction, and where the light fraction and the heavy fraction are treated in separate reactors in the second reaction zone, where the liquid hourly space velocity (LHSV) in the separate reactors is in a range from 0.1 to 3 hours$^{-1}$.

17. The process according to claim 1, wherein heat is transferred between the step of providing said low sulphur oxygen containing renewable crude oil and a substance processed by a subsequent step of said process.

18. The process according to claim 1, further comprising separating an effluent from the second reaction zone into a light oil fraction, a heavy oil fraction, a water fraction and a gas fraction,
- wherein the effluent from the second reaction zone is separated in a hot high pressure separator to separate a light fraction and a heavy fraction, the light fraction comprising gas, light components and water,
- wherein the heavy fraction is further treated in a hot low pressure separator to separate residual gas, light components, and water, and
- wherein the temperature of the hot high pressure separator is in a range of 270-370° C. and where the pressure of the hot high pressure separator is in a range of 50-130 bar and where the temperature of the hot low pressure separator is in a range of 270-370° C. and where the pressure of the hot low pressure separator is in a range of 1-6 bar.

19. A process for producing an upgraded renewable oil from a renewable carbonaceous material, the process comprising:
- providing a low sulphur oxygen containing renewable crude oil having a sulphur content of less than 0.5 wt % and an oxygen content of about 2.0 wt % to about 20 wt % by:
  - a. providing a carbonaceous material in the form of biomass contained in one or more feedstock;
  - b. providing a feed mixture by slurring the carbonaceous material in one or more fluids, at least one of which comprises water;
  - c. pressurizing the feed mixture to a pressure in a range from 150 to 400 bar;
  - d. heating the pressurized feed to a temperature in a range from about 300° C. to about 450° C.;
  - e. maintaining the pressurized and heated feed mixture in a conversion zone for a conversion time in a range from 3 to 30 minutes, thereby causing the carbonaceous material to be converted; and
  - f. cooling the converted feed mixture to a temperature in a range from about 25° C. to about 200° C.;
  - g. expanding the converted feed mixture to a pressure in a range from 1 to 120 bar, and separating the converted feed mixture into at least a low sulphur oxygen containing renewable crude oil, a gas phase and a water phase comprising water-soluble organics and dissolved salts;
- pressurizing the low sulphur oxygen containing renewable crude oil to an operational pressure in a range from 20 to 200 bar;
- adding and mixing hydrogen to the pressurized low sulphur oxygen containing renewable crude oil;
- heating, after the step of adding and mixing hydrogen, the pressurized low sulphur oxygen containing renewable crew oil to an operational temperature in a range from 180 to 410° C. in one or more steps;
- contacting the heated mixture comprising the pressurized low sulphur oxygen containing renewable crude oil and hydrogen with at least one heterogeneous catalyst contained in a first reaction zone to obtain a partially upgraded renewable oil; and
- contacting the partially upgraded renewable oil from said first reaction zone with at least one heterogeneous catalyst contained in a second reaction zone to obtain an upgraded renewable oil;
- wherein the at least one heterogeneous catalyst in the first reaction zone and/or the at least one heterogeneous catalyst in the second reaction zone is on a non-sulphided form,
- where the first reaction zone comprises two or more reactors, where the first reactor in the first reaction zone is a graded bed comprising heterogeneous catalysts with increasing activity, and where the inlet temperature to the first reactor of the first reaction zone is below 300° C.,
- where water in the form of steam is added to the partially upgraded low sulphur renewable oil after the first reaction zone and prior to the second reaction zone,
- where the second reaction zone comprises a catalytic steam conversion and/or catalytic steam cracking reactor comprising a heterogeneous catalyst having a water splitting functionality,
- where the heterogeneous catalyst uses steam as a source of hydrogen for a portion of said process performed on the low sulphur oxygen containing renewable crude oil provided according to steps a through g,
- where the inlet temperature to the catalytic steam conversion and/or catalytic steam cracking reactor in the second reaction zone is in a range of 350 to 400° C., and
- where the liquid hourly space velocity of the catalytic steam conversion and/or catalytic steam cracking reactor is in a range from 0.1 to 3 hours$^{-1}$.

* * * * *